(12) United States Patent
Hunter

(10) Patent No.: US 12,379,902 B2
(45) Date of Patent: *Aug. 5, 2025

(54) EVENT-BASED ENTITY SCORING IN DISTRIBUTED SYSTEMS

(71) Applicant: Digital Asset Capital, Inc., Gaithersburg, MD (US)

(72) Inventor: Edward Hunter, Gaithersburg, MD (US)

(73) Assignee: Digital Asset Capital, Inc., Gaithersburg, MD (US)

( * ) Notice: Subject to any disclaimer, the term of this patent is extended or adjusted under 35 U.S.C. 154(b) by 710 days.

This patent is subject to a terminal disclaimer.

(21) Appl. No.: 17/015,071

(22) Filed: Sep. 8, 2020

(65) Prior Publication Data

US 2021/0073289 A1    Mar. 11, 2021

Related U.S. Application Data

(63) Continuation of application No. 16/893,318, filed on Jun. 4, 2020, now Pat. No. 10,915,578, and a
(Continued)

(51) Int. Cl.
*G06F 16/00* (2019.01)
*G06F 8/33* (2018.01)
(Continued)

(52) U.S. Cl.
CPC ................. *G06F 8/33* (2013.01); *G06F 8/65* (2013.01); *G06F 9/547* (2013.01);
(Continued)

(58) Field of Classification Search
CPC .... G06F 16/23; G06F 16/951; G06F 16/9024; G06F 16/1858; G06F 16/212;
(Continued)

(56) References Cited

U.S. PATENT DOCUMENTS

| | | |
|---|---|---|
| 7,512,588 B2 | 3/2009 | Chou |
| 7,634,778 B2 | 12/2009 | Mosier |

(Continued)

FOREIGN PATENT DOCUMENTS

| | | |
|---|---|---|
| JP | 2004-220227 A | 8/2004 |
| KR | 10-2008-0021444 A | 3/2008 |

(Continued)

OTHER PUBLICATIONS

Christian Mayer et al., "ADWISE: Adaptive Window-Based Streaming Edge Partitioning for High-Speed Graph Processing", 2018 IEEE 38th International Conference on Distributed Computing Systems (ICDCS) (pp. 685-695).*

(Continued)

*Primary Examiner* — Srirama Channavajjala
(74) *Attorney, Agent, or Firm* — Pillsbury Winthrop Shaw Pittman LLP

(57) ABSTRACT

A method includes obtaining a directed graph of a self-executing protocol, the directed graph including a set of vertices associated with mutually exclusive category labels, where the self-executing protocol identifies a first entity. The method may include obtaining a first graph portion template that includes a vertex template and an edge template. The vertex template is associated with a category of the mutually exclusive category labels. The method may include determining whether the first graph portion template matches a graph portion in the directed graph and an edge of the directed graph matching the edge template. The method may include determining an outcome score based on the graph portion template matching the graph portion, determining whether the outcome score satisfies an outcome score threshold, and storing a value indicating that the outcome score satisfies the outcome score threshold.

20 Claims, 22 Drawing Sheets

Related U.S. Application Data continuation of application No. 16/893,290, filed on Jun. 4, 2020, now Pat. No. 11,132,403, and a continuation of application No. 16/893,299, filed on Jun. 4, 2020, now Pat. No. 10,990,879, and a continuation of application No. 16/893,295, filed on Jun. 4, 2020, now Pat. No. 10,831,452.

(60) Provisional application No. 63/056,984, filed on Jul. 27, 2020, provisional application No. 63/055,783, filed on Jul. 23, 2020, provisional application No. 63/053,217, filed on Jul. 17, 2020, provisional application No. 63/052,329, filed on Jul. 15, 2020, provisional application No. 63/034,255, filed on Jun. 3, 2020, provisional application No. 63/033,063, filed on Jun. 1, 2020, provisional application No. 63/020,808, filed on May 6, 2020, provisional application No. 62/959,377, filed on Jan. 10, 2020, provisional application No. 62/959,481, filed on Jan. 10, 2020, provisional application No. 62/959,418, filed on Jan. 10, 2020, provisional application No. 62/897,240, filed on Sep. 6, 2019.

(51) Int. Cl.

| | |
|---|---|
| *G06F 8/65* | (2018.01) |
| *G06F 9/54* | (2006.01) |
| *G06F 16/18* | (2019.01) |
| *G06F 16/23* | (2019.01) |
| *G06F 16/901* | (2019.01) |
| *G06F 16/904* | (2019.01) |
| *G06F 16/951* | (2019.01) |
| *G06F 17/18* | (2006.01) |
| *G06N 3/048* | (2023.01) |
| *G06N 3/08* | (2023.01) |
| *G06N 3/086* | (2023.01) |
| *H04L 9/32* | (2006.01) |
| *H04L 67/133* | (2022.01) |
| *H04L 9/00* | (2022.01) |

(52) U.S. Cl.
CPC .......... *G06F 16/1858* (2019.01); *G06F 16/23* (2019.01); *G06F 16/9024* (2019.01); *G06F 16/904* (2019.01); *G06F 16/951* (2019.01); *G06F 17/18* (2013.01); *G06N 3/048* (2023.01); *G06N 3/08* (2013.01); *G06N 3/086* (2013.01); *H04L 9/3263* (2013.01); *H04L 67/133* (2022.05); *H04L 9/50* (2022.05)

(58) Field of Classification Search
CPC .. G06F 16/2452; G06F 16/334; G06F 16/338; G06F 16/904; G06F 21/602; G06F 8/70; G06Q 20/10; G06Q 20/389
See application file for complete search history.

(56) References Cited

U.S. PATENT DOCUMENTS

| | | | |
|---|---|---|---|
| 8,108,241 B2 | 1/2012 | Shukoor | |
| 8,156,134 B2 | 4/2012 | Sun | |
| 8,312,049 B2 | 11/2012 | Chayes | |
| 8,387,000 B2 | 2/2013 | Avadhanula | |
| 8,533,182 B1 | 9/2013 | Charboneau | |
| 8,614,703 B1 | 12/2013 | Fong | |
| 8,732,685 B2 | 5/2014 | Moler | |
| 9,547,728 B2 | 1/2017 | Bornhoevd | |
| 9,836,183 B1 | 12/2017 | Love | |
| 10,169,454 B2 | 1/2019 | Ait-Mokhtar | |
| 10,320,891 B2 | 6/2019 | Agarwal | |
| 10,424,399 B2 | 9/2019 | Clark | |
| 10,496,752 B1 | 12/2019 | Crossley | |
| 10,509,844 B1 | 12/2019 | Mcintyre | |
| 10,509,863 B1 | 12/2019 | Arfa | |
| 10,515,000 B2 | 12/2019 | Moretto | |
| 10,529,137 B1 | 1/2020 | Black | |
| 10,558,759 B1 | 2/2020 | Arfa | |
| 10,558,933 B2 | 2/2020 | Bhowan | |
| 10,700,852 B2* | 6/2020 | Xie | G06Q 20/10 |
| 10,705,939 B2 | 7/2020 | McChord | |
| 10,810,193 B1 | 10/2020 | Subramanya et al. | |
| 10,810,210 B2 | 10/2020 | Choudhury | |
| 11,106,458 B2* | 8/2021 | Adams | G06F 8/70 |
| 11,265,171 B2 | 3/2022 | Struttmann et al. | |
| 11,271,717 B2 | 3/2022 | Shi | |
| 2002/0087275 A1 | 7/2002 | Kim | |
| 2002/0095276 A1 | 7/2002 | Rong | |
| 2004/0019601 A1 | 1/2004 | Gates | |
| 2004/0181361 A1 | 9/2004 | Ikeda | |
| 2005/0036615 A1 | 2/2005 | Jakobsson | |
| 2005/0038533 A1 | 2/2005 | Farrell | |
| 2005/0065955 A1* | 3/2005 | Babikov | G06F 16/289 |
| 2006/0045027 A1 | 3/2006 | Galou | |
| 2006/0161560 A1 | 7/2006 | Khandelwal | |
| 2006/0195747 A1 | 8/2006 | Pramanick | |
| 2007/0239694 A1 | 10/2007 | Singh | |
| 2008/0033777 A1 | 2/2008 | Shukoor | |
| 2008/0052692 A1 | 2/2008 | Chockler | |
| 2008/0079724 A1 | 4/2008 | Isard et al. | |
| 2008/0098375 A1 | 4/2008 | Isard | |
| 2008/0120292 A1 | 5/2008 | Sundaresan | |
| 2008/0126450 A1 | 5/2008 | O'Neill | |
| 2009/0083262 A1 | 3/2009 | Chang et al. | |
| 2010/0153152 A1 | 6/2010 | Kind | |
| 2010/0312545 A1 | 12/2010 | Sites | |
| 2011/0137919 A1 | 6/2011 | Ryu | |
| 2011/0153662 A1 | 6/2011 | Stanfill | |
| 2011/0238409 A1 | 9/2011 | Larcheveque et al. | |
| 2012/0054255 A1 | 3/2012 | Buxbaum et al. | |
| 2012/0143808 A1 | 6/2012 | Karins | |
| 2012/0253793 A1 | 10/2012 | Ghannam et al. | |
| 2012/0303358 A1 | 11/2012 | Ducatel et al. | |
| 2013/0055302 A1 | 2/2013 | De et al. | |
| 2013/0138699 A1 | 5/2013 | Schacher | |
| 2014/0006394 A1 | 1/2014 | Kritt et al. | |
| 2014/0189651 A1 | 7/2014 | Gounares | |
| 2014/0236965 A1 | 8/2014 | Yarmus | |
| 2015/0067644 A1 | 3/2015 | Chakraborty | |
| 2016/0012149 A1* | 1/2016 | Muchinsky | G06F 16/23 707/749 |
| 2016/0105322 A1 | 4/2016 | Pullo | |
| 2016/0203242 A1 | 7/2016 | Henrickson | |
| 2016/0239753 A1 | 8/2016 | Loehlein et al. | |
| 2016/0350662 A1 | 12/2016 | Jin | |
| 2017/0154123 A1 | 6/2017 | Yurchenko | |
| 2017/0161121 A1 | 6/2017 | Feng | |
| 2017/0193390 A1 | 7/2017 | Weston et al. | |
| 2017/0212781 A1 | 7/2017 | Dillenberger | |
| 2017/0230791 A1 | 8/2017 | Jones | |
| 2017/0270100 A1 | 9/2017 | Audhkhasi et al. | |
| 2017/0329868 A1 | 11/2017 | Lindsley | |
| 2017/0364534 A1 | 12/2017 | Zhang | |
| 2018/0075030 A1 | 3/2018 | Gilder | |
| 2018/0129957 A1 | 5/2018 | Saxena | |
| 2018/0189294 A1 | 7/2018 | Anand | |
| 2018/0205552 A1* | 7/2018 | Struttmann | H04L 9/0637 |
| 2018/0267958 A1 | 9/2018 | Danielyan et al. | |
| 2018/0293486 A1 | 10/2018 | Bajic et al. | |
| 2019/0050854 A1 | 2/2019 | Yang et al. | |
| 2019/0095909 A1 | 3/2019 | Wright et al. | |
| 2019/0116047 A1 | 4/2019 | Struttmann | |
| 2019/0129893 A1 | 5/2019 | Baird, III | |
| 2019/0147553 A1 | 5/2019 | Reber | |
| 2019/0164087 A1 | 5/2019 | Ghibril | |
| 2019/0164342 A1 | 5/2019 | Krs | |
| 2019/0166162 A1 | 5/2019 | Anand | |
| 2019/0180386 A1 | 6/2019 | Gandhi | |
| 2019/0188285 A1 | 6/2019 | Scheau | |
| 2019/0197357 A1 | 6/2019 | Anderson | |
| 2019/0220496 A1 | 7/2019 | Ito | |

(56) References Cited

U.S. PATENT DOCUMENTS

| | | | |
|---|---|---|---|
| 2019/0222597 | A1 | 7/2019 | Crabtree |
| 2019/0230092 | A1 | 7/2019 | Patel |
| 2019/0303579 | A1 | 10/2019 | Reddy et al. |
| 2019/0354582 | A1 | 11/2019 | Schafer |
| 2020/0005117 | A1 | 1/2020 | Yuan et al. |
| 2020/0069134 | A1 | 3/2020 | Ebrahimi Afrouzi |
| 2020/0082016 | A1 | 3/2020 | Lassoued et al. |
| 2020/0089769 | A1 | 3/2020 | Crossley |
| 2020/0110619 | A1 | 4/2020 | Rajaram |
| 2020/0110882 | A1 | 4/2020 | Ripolles Mateu |
| 2020/0193286 | A1 | 6/2020 | Byrnes |
| 2020/0210467 | A1 | 7/2020 | Ravindran et al. |
| 2020/0249998 | A1 | 8/2020 | Che |
| 2020/0334545 | A1 | 10/2020 | Sinha |
| 2020/0401931 | A1 | 12/2020 | Duan |
| 2021/0049700 | A1 | 2/2021 | Nguyen |
| 2021/0383070 | A1 | 12/2021 | Hunter |
| 2022/0027496 | A1 | 1/2022 | Struttmann |
| 2022/0171984 | A1 | 6/2022 | Takahashi |

FOREIGN PATENT DOCUMENTS

| | | | |
|---|---|---|---|
| KR | 10-2009-0130854 | A | 12/2009 |
| KR | 10-1565715 | B1 | 11/2015 |
| KR | 10-2018-0120570 | A | 11/2018 |
| KR | 10-2019-0092564 | A | 8/2019 |
| WO | 2004104817 | A2 | 12/2004 |
| WO | 2005022403 | A1 | 3/2005 |
| WO | 2007002658 | A2 | 1/2007 |
| WO | 2009014898 | A2 | 1/2009 |
| WO | 2009081212 | | 7/2009 |
| WO | 2011115679 | A1 | 9/2011 |
| WO | 2013040386 | A2 | 3/2013 |
| WO | 2013044170 | A1 | 3/2013 |
| WO | 2013112628 | A1 | 8/2013 |
| WO | WO2015168251 | A1 * | 11/2015 |
| WO | 2017011601 | A1 | 1/2017 |
| WO | 2017014744 | A1 | 1/2017 |
| WO | 2017191525 | A2 | 11/2017 |
| WO | 2017218986 | A1 | 12/2017 |
| WO | 2018098037 | A1 | 5/2018 |
| WO | 2019-060468 | A1 | 3/2019 |
| WO | 2020092900 | A2 | 5/2020 |
| WO | WO2021046551 | A1 * | 3/2021 |

OTHER PUBLICATIONS

JungHyunKim et al., "PersonalizedPageRankinUncertainGraphswithMutuallyExclusiveEdges", SIGIR'17, Aug. 7-11, 2017, Shinjuku, Tokyo, Japan, pp. 525-534.*

Federico Matteo Benčić et al., "Distributed Ledger Technology: Blockchain Compared to Directed Acyclic Graph", 2018 IEEE 38th International Conference on Distributed Computing Systems (ICDCS), Jul. 2018, pp. 1569-1570.*

International Preliminary Report on Patentability in related international application PCT/US2020/049776 mailed Mar. 17, 2022, pp. 1-6.

International Preliminary Report on Patentability in related international application PCT/US2020/049777 mailed Mar. 17, 2022, pp. 1-6.

International Preliminary Report on Patentability in related international application PCT/US2020/049755 mailed Mar. 17, 2022, pp. 1-5.

International Preliminary Report on Patentability in related international application PCT/US2020/049757 mailed Mar. 17, 2022, pp. 1-6.

Non-Final Office Action in related U.S. Appl. No. 17/015,069 dated May 12, 2022, pp. 1-26.

Phetsouvanh et al., "EGRET: Extortion Graph Exploration Techniques in the Bitcoin Network," 2018 IEEE International Conference on Data Mining Workshops (ICDMW), Nov. 2018, pp. 244-251.

Masood et al., "An Overview of Distributed Ledger Technology and its Applications," International Journal of Computer Sciences and Engineering, vol. 6, Issue 10, Oct. 2018, pp. 422-427.

Notice of Allowance in related U.S. Appl. No. 16/893,290 dated Aug. 11, 2021.

Notice of Allowance in related U.S. Appl. No. 17/337,239 dated Sep. 9, 2021.

International Search Report and Written Opinion in related international application PCT/US2021/035516.

Non-Final Office Action in related U.S. Appl. No. 16/893,299 issued Oct. 21, 2020 (106 pages).

Gordon, Thomas F., Guido Governatori, and Antonino Rotolo. "Rules and norms: Requirements for rule interchange languages in the legal domain." International Workshop on Rules and Rule Markup Languages for the Semantic Web. Springer, Berlin, Heidelberg, 2009. (Year: 2009).

Shen, Yelong, et al. "M-walk: Learning to walk over graphs using monte carlo tree search." Advances in Neural Information Processing Systems. 2018. (Year: 2018).

Chan, Wren, and Aspen Olmsted. "Ethereum transaction graph analysis." 2017 12th International Conference for Internet Technology and Secured Transactions (ICITST). IEEE, 2017. (Year: 2017).

Zinkevich, Martin, et al. "Regret minimization in games with incomplete information." Advances in neural information processing systems. 2008. (Year: 2008).

Silver, David, et al. "Mastering chess and shogi by self-play with a general reinforcement learning algorithm." arXiv preprint arXiv: 1712.01815 (2017). (Year: 2017).

Final Office Action in related U.S. Appl. No. 16/893,290 issued Nov. 13, 2020 (28 pages).

Allowance issued in related U.S. Appl. No. 16/893,318 dated Nov. 20, 2020 (20 pages).

International Search Report and Written Opinion in related international application PCT/US2020/049776 dated Dec. 3, 2020 (10 pages).

Julien M. Hendrickx, Graphs and Networks for the Analysis of Autonomous Agent Systems, Feb. 29, 2008.

International Search Report and Written Opinion in related international application PCT/US2020/049777 dated Dec. 8, 2020 (10 pages).

International Search Report and Written Opinion in related international application PCT/US2020/049755 dated Dec. 15, 2020 (9 pages).

International Search Report and Written Opinion in related international application PCT/US2020/049757 dated Dec. 15, 2020 (10 pages).

Notice of Allowance in related U.S. Appl. No. 16/893,299 dated Feb. 11, 2021.

Non-Final Office Action in related U.S. Appl. No. 16/893,290 dated Mar. 24, 2021.

Non-Final Office Action in related U.S. Appl. No. 17/015,028 dated Jun. 30, 2022, pp. 1-47.

D.R. Bull et al., "The optimisation of multiplier-free directed graphs: an approach using genetic algorithms," 1994 IEEE International Symposium on Circuits and Systems (ISCAS), Jun. 1994, pp. 197-200.

Non-Final Office Action in related U.S. Appl. No. 17/015,038 dated Jul. 11, 2022, pp. 1-46.

Corinna Vehlow et al., "Visualizing edge-edge relations in graphs," 2013 IEEE Pacific Visualization Symposium (PacificVis), Mar. 2013, pp. 1-8.

Non-Final Office Action in related U.S. Appl. No. 17/015,065 dated Jul. 13, 2022, pp. 1-64.

John T. Rickard et al., "Hypercube Graph Representations and Fuzzy Measures of Graph Properties," IEEE Transactions on Fuzzy Systems (vol. 15, Issue: 6, Dec. 2007), pp. 1278-1293.

Non-Final Office Action in related U.S. Appl. No. 17/015,042 dated Jul. 22, 2022, pp. 1-59.

Ali Shahaab et al., "Applicability and Appropriateness of Distributed Ledgers Consensus Protocols in Public and Private Sectors: A Systematic Review," IEEE access, vol. 7, Mar. 2019, pp. 1-15.

Non-Final Office Action in related U.S. Appl. No. 17/015,073 dated Aug. 5, 2022, pp. 1-65.

(56) References Cited

OTHER PUBLICATIONS

Wei Wang et al., "A Novel Subgraph Querying Method on Directed Weighted Graphs," 2018 14th International Conference on Computational Intelligence and Security (CIS) 2018, pp. 150-154.
Ren Liu et al., "Decentralized state estimation and remedial control action for minimum wind curtailment using distributed computing platform," 2016 IEEE Industry Applications Society Annual Meeting, Oct. 2016, pp. 1-9.
Non-Final Office Action in related U.S. Appl. No. 17/015,074 dated Aug. 18, 2022, pp. 1-67.
Pavelexner et al., "Quantum graphs with vertices of a preferred orientation," Physics Letters A, vol. 382, Issue 5, Feb. 6, 2018, pp. 283-287.
Moussa Amrani et al., "SAR-Oriented Visual Saliency Model and Directed Acyclic Graph Suport Vector Metric Based Target Classification," IEEE Journal of Selected Topics in Applied Earth Observations and Remote Sensing, vol. 11, Issue 10, Oct. 2018, pp. 3794-3810.
Non-Final Office Action in related U.S. Appl. No. 17/015,069 dated Sep. 2, 2022, pp. 1-32.
Notice of Allowance in related U.S. Appl. No. 17/121,915 dated Jul. 27, 2022, pp. 1-10.
Final Office Action for related U.S. Appl. No. 17/015,042 issued on Dec. 16, 2023, pp. 1 to 110.
Final Office Action for related U.S. Appl. No. 17/015,028 issued on Dec. 2, 2023, pp. 1 to 44.
Final Office Action for related U.S. Appl. No. 17/015,065 issued on Dec. 9, 2023, pp. 1 to 41.
Final Office Action for related U.S. Appl. No. 17/015,073 issued on Dec. 9, 2023, pp. 1 to 86.
Final Office Action for related U.S. Appl. No. 17/015,074 issued on Dec. 14, 2023, pp. 1 to 40.
Final Office Action for related U.S. Appl. No. 17/015,038 issued on Dec. 9, 2023, pp. 1 to 64.
International Preliminary Report on Patentability for related International Patent Application PCT/US2021/035526 Issued on Dec. 15, 2023, pp. 1 to 8.
Non-Final Office Action for related U.S. Appl. No. 17/015,069 issued on Mar. 14, 2023, 52 pages.
Achille Souili et al., "Natural Language Processing (NLP)—A solution for knowledge extraction from patent unstructured data", World Conference: TRIZ Future, TF 2011-2014, Procedia Engineering 131 (2015) 635-643.
Extended European Search Report for EP application No. 20861163.8 dated Aug. 25, 2023.
Extended European Search Report for EP application No. 20861551.8 dated Aug. 28, 2023.
Extended European Search Report for EP application No. 20861278.8 rec'd Aug. 29, 2023.
Office Action for CA application No. 3150253 dated Nov. 14, 2023.
Office Action for CA application No. 3150262 dated Nov. 21, 2023.
Office Action for CA application No. 3150320 dated Nov. 22, 2023.
Office Action for CA application No. 3150324 dated Dec. 5, 2023.
Office Action for CA application No. 3150262 dated Aug. 26, 2024.
Office Action for CA application No. 3150320 rec'd Aug. 26, 2024.
US Notice of Allowance for U.S. Appl. No. 17/015,028 dated Aug. 22, 2024.
US Notice of Allowance for U.S. Appl. No. 17/015,065 dated Oct. 23, 2024.
Christian Cachin et al: "The Transaction Graph for Modeling Blockchain Semantics", IACR, International Association for Cryptologic Research, vol. 20171110:151455, Nov. 3, 2017 (Nov. 3, 2017), pp. 1-27, XP061034744, Retrieved from the Internet: URL:http://eprint.iacr.org/2017/1070.pdf [retrieved on Nov. 3, 2017].
US Notice of Allowance for U.S. Appl. No. 17/015,028 dated Jan. 10, 2025.

* cited by examiner

EVENT-BASED ENTITY SCORING IN DISTRIBUTED SYSTEMS

CROSS-REFERENCE TO RELATED APPLICATIONS

This patent claims the benefit of U.S. Provisional Patent Application 62/897,240, filed 6 Sep. 2019, titled "SMART DEONTIC DATA SYSTEMS." This patent also claims the benefit of U.S. Provisional Patent Application 62/959,418, filed 10 Jan. 2020, titled "GRAPH-MANIPULATION BASED DOMAIN-SPECIFIC ENVIRONMENT." This patent also claims the benefit of U.S. Provisional Patent Application 62/959,481, filed 10 Jan. 2020, titled "GRAPH OUTCOME DETERMINATION IN DOMAIN-SPECIFIC EXECUTION ENVIRONMENT." This patent also claims the benefit of U.S. Provisional Patent Application 62/959,377, filed 10 Jan. 2020, titled "SMART DEONTIC MODEL AND SYSTEMS." This patent also claims the benefit of U.S. Provisional Patent Application 63/020,808, filed 6 May 2020, titled "GRAPH EXPANSION AND OUTCOME DETERMINATION FOR GRAPH-DEFINED PROGRAM STATES." This patent also claims the benefit of U.S. Provisional Patent Application 63/033,063, filed 1 Jun. 2020, titled "MODIFICATION OF IN-EXECUTION SMART CONTRACT PROGRAMS." This patent also claims the benefit of U.S. Provisional Patent Application 63/034,255, filed 3 Jun. 2020, titled "SEMANTIC CONTRACT MAPS." This patent also claims the benefit of U.S. patent application Ser. No. 16/893,290, filed 4 Jun. 2020, titled "GRAPH-MANIPULATION BASED DOMAIN-SPECIFIC EXECUTION ENVIRONMENT." This patent also claims the benefit of U.S. patent application Ser. No. 16/893,318, filed 4 Jun. 2020, titled "GRAPH OUTCOME DETERMINATION IN DOMAIN-SPECIFIC EXECUTION ENVIRONMENT." This patent also claims the benefit of U.S. patent application Ser. No. 16/893,295, filed 4 Jun. 2020, titled "MODIFICATION OF IN-EXECUTION SMART CONTRACT PROGRAMS." This patent also claims the benefit of U.S. patent application Ser. No. 16/893,299, filed 4 Jun. 2020, titled "GRAPH EXPANSION AND OUTCOME DETERMINATION FOR GRAPH-DEFINED PROGRAM STATES." This patent also claims the benefit of U.S. Provisional Patent Application 63/052,329, filed 15 Jul. 2020, titled "EVENT-BASED ENTITY SCORING IN DISTRIBUTED SYSTEMS." This patent also claims the benefit of U.S. Provisional Patent Application 63/053,217, filed 17 Jul. 2020, titled "CONFIDENTIAL GOVERNANCE VERIFICATION FOR GRAPH-BASED SYSTEM." This patent also claims the benefit of U.S. Provisional Patent Application 63/055,783, filed 23 Jul. 2020, titled "HYBRID DECENTRALIZED COMPUTING ENVIRONMENT FOR GRAPH-BASED EXECUTION ENVIRONMENT." This patent also claims the benefit of U.S. Provisional Patent Application 63/056,984, filed 27 Jul. 2020, titled "MULTI-GRAPH VERIFICATION." The entire content of each aforementioned patent filing is hereby incorporated by reference.

BACKGROUND

1. Field

This disclosure relates generally to computer systems and, more particularly, to graph-manipulation based domain-specific execution environments.

2. Background

Distributed applications operating on a distributed computing platform may be useful in a variety of contexts. Such applications can store program state data on a tamper-evident ledger operating on the distributed computing platform. The use of a tamper-evident ledger or some other data systems distributed over multiple computing devices may increase the security and reliability of distributed applications.

SUMMARY

The following is a non-exhaustive listing of some aspects of the present techniques. These and other aspects are described in the following disclosure.

Some aspects include a process that includes: obtaining, with a computing system, program state of a self-executing protocol, wherein the program state encodes: a set of conditional statements; a set of entities, wherein the set of entities comprises a first entity; a directed graph, the directed graph comprising: a set of vertices, wherein each respective vertex of the set of vertices is associated with a respective category label of a set of mutually exclusive categories; a set of directed edges connecting respective pairs of vertices among the set of vertices; obtaining, with the computing system, an entity profile of the first entity, wherein the entity profile comprises a first graph portion template, wherein the first graph portion template comprises a first vertex template and an edge template, wherein the first vertex template is associated in memory with a first category label of the set of mutually exclusive category labels, and wherein the edge template specifies an edge direction to or from a vertex matching the first vertex template; determining, with the computing system, whether the first graph portion template matches a graph portion in the directed graph based on a first vertex of the directed graph matching the first vertex template and a first directed edge of the directed graph matching the edge template; determining, with the computing system, an outcome score based on the first graph portion template matching the graph portion in the directed graph; determining, with the computing system, whether the outcome score satisfies an outcome score threshold; and in response to the outcome score satisfying the outcome score threshold, storing, with the computing system, a value indicating that the outcome score satisfies the outcome score threshold.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
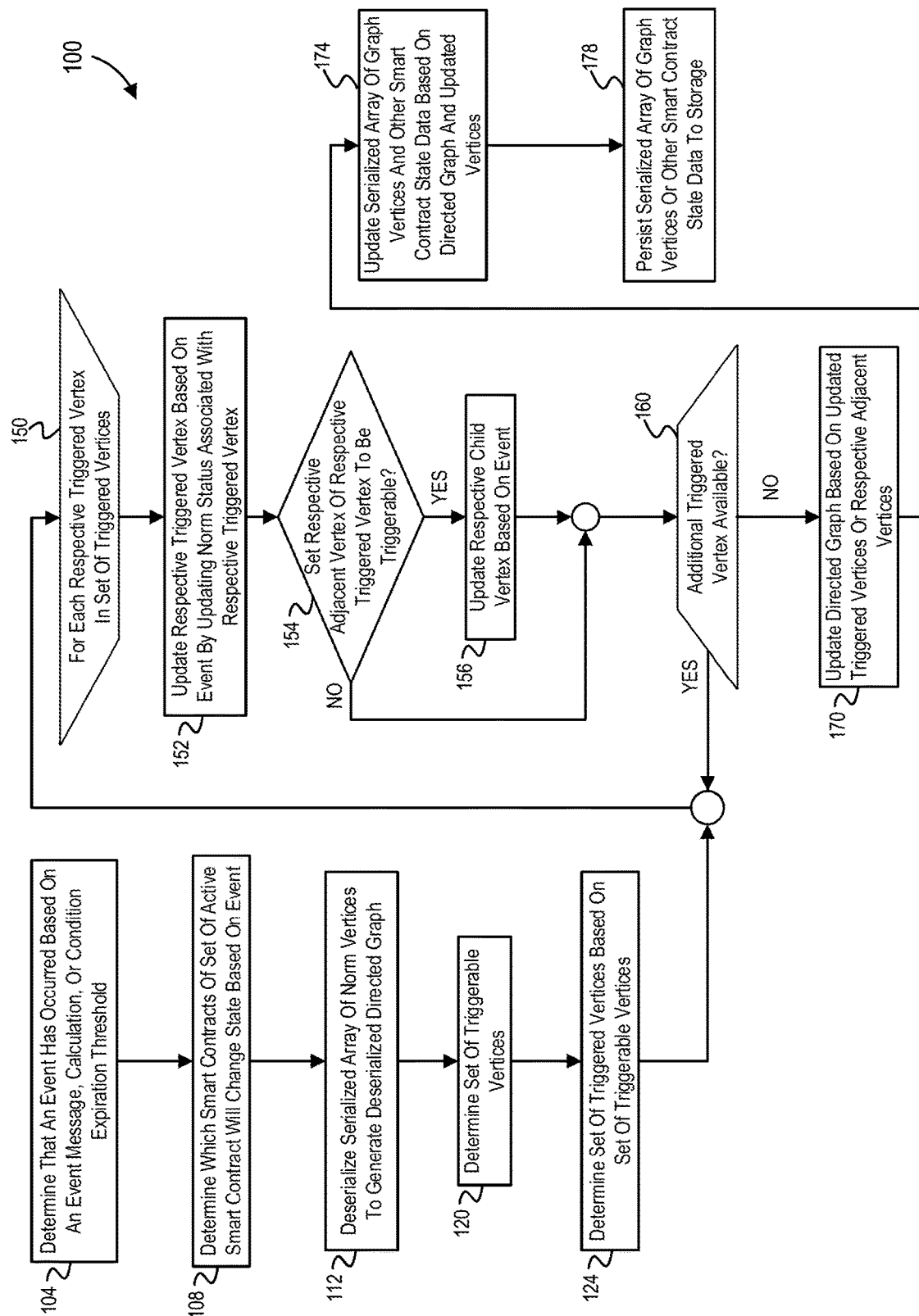
FIG. 1 is a flowchart of an example of a process by which program state data of a program may be deserialized into a directed graph, updated based on an event, and re-serialized, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of program testing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Technology-based self-executing protocols, such as smart contracts and other programs, allow devices, sensors, and program code have seen increased use in recent years. However, some smart contracts and contract information models often rely on program instructions or industry-specific data structures, which may be difficult to generalize, use for comparison analysis, or reuse in similar contexts due to minor differences in contract details. As a result, uses of smart contracts has not extended into areas that are often the domain of natural language documents. Described herein is a process and related system to construct, interpret, enforce, analyze, and reuse terms for a smart contract in a systematic and unambiguous way across a broad range of applicable fields. In contrast, contracts encoded in natural language text often rely on social, financial, and judicial systems to provide the resources and mechanisms to construct, interpret, and enforce terms in the contracts. As contract terms increase in number or a situation within which the contract was formed evolves, such a reliance may lead to a lack of enforcement, ambiguity, and wasted resources spent on the re-interpretation or enforcement of contract terms.

Some embodiments may include smart contracts (or other programs) that include or are otherwise associated with a directed graph representing a state of the smart contract. In some embodiments, vertices of the graph may be associated with (e.g., encode, or otherwise represent) norms (e.g., as norm objects described below) of the smart contract, like formal language statements with a truth condition paired with a conditional statement (sometimes known as a "conditional") that branches program flow (and changes norm state) responsive to the whether the truth condition is satisfied, for instance, "return a null response if and only if an API request includes a reserved character in a data field." In some embodiments, norms of a smart contract may represent terms of a contract being represented by the smart contract, legal conditions of the contract, or other verifiable statements. As used herein, a smart contract may be a self-executing protocol executable as a script, an application, or portion of an application on a distributed computing platform, centralized computing system, or single computing device. Furthermore, as used herein, a graph may be referred to as a same graph after the graph is manipulated. For example, if a graph being referred to as a "first graph" is represented by the serialized array [[1,2], [2,3], [3,4]] is modified to include the extra vertex and graph edge "[1,5]" and become the modified graph represented by the serialized array "[[1,2], [2,3], [3,4], [1,5]]," the term "first graph" may be used to refer to the modified graph. Additionally, it should be understood that a data structure need not be labeled in program code as a graph to constitute a graph for the present purposes, as long as that data structure encodes the relationships between values described herein. For example, a graph may be encoded in a key-value store even if source code does not label the key-value store as a graph.

A self-executing protocol may be a program, like a smart contract. Self-executing protocols may execute responsive to external events, which may include outputs of third-party programs, and human input via a user interface. A self-executing protocol may execute on a computing substrate that involves human intervention to operate, like turning on a computer and launching an event listener.

A norm of a smart contract may be encoded in various formal languages (like programming languages, such as data structures encoding statements in a domain-specific programming language) and may include or otherwise be associated with one or more conditional statements, a set of norm conditions of the one or more conditional statements, a set of outcome subroutines of the one or more conditional statements, a norm status, and a set of consequent norms. In some embodiments, satisfying a norm condition may change a norm status and lead to the creation or activation of the consequent norms based on the actions performed by the system when executing the outcome subroutines corresponding to the satisfied norm condition. In some embodiments, a norm may be triggered (i.e. "activated") when an associated norm condition is satisfied by an event, as further described below. Alternatively, some types of norms may be triggered when a norm condition is not satisfied before a condition expiration threshold is satisfied. As used herein, a triggerable norm (i.e. "active norm") is a norm having associated norm conditions may be satisfied by an event. In contrast, a norm that is set as not triggerable (i.e. "inactive") is a norm is not updated even if its corresponding norm conditions are satisfied. As used herein, deactivating a norm may include setting the norm to not be triggerable.

A smart contract and its norms may incorporate elements of a deontic logic model. A deontic logic model may include a categorization of each of the norms into one of a set of deontic primitive logical categories. A deontic primitive logical category ("logical category") may include a label such as "right," "obligation," or "prohibition." The logical category may indicate a behavior of the norm when the norm is triggered. In addition, a norm of the smart contract may have an associated norm status such as "true," "false," or "unrealized," where an event may trigger a triggerable norm by satisfying a norm condition (and thus "realizing" the norm). These events may be collected into a knowledge list. The knowledge list may include an associative array of norms, their associated states, an initial norm status during the initial instantiation of the associated smart contract, their norm observation times (e.g., when a norm status was changed, when an event message was received, or the like), or other information associated with the norms. The smart contract may also include a set of consequent actions, where a consequent action may include an association between a triggered norm and any respective consequent norms of the smart contract. As further discussed below, the set of consequent actions may be updated as events occur and the smart contract state is updated, which may result in the formation of a history of previous consequent actions. It should be understood that the term "norm" is used for illustrative purposes and that this term may have different names in other references and contexts. The labeling of norms may also be used for symbolic artificial intelligence (AI) systems. As described further below, the use of these symbolic AI systems in the context of a smart contract may allow for sophisticated verification and predictive techniques that may be impractical for pure neural network systems which do not use symbolic AI systems. It should be understood that, while the term "logical category" is used in some embodiments, other the terms may be used for categories or types of categories without loss of generality. For example, some embodiments may refer to the use of a "category label" instead of a logical category.

Some embodiments may store a portion of the smart contract state in a data serialization format ("serialized smart contract state data"). For example, as further described below, some embodiments may store a vertices of a directed graph (or both vertices and edges) in a data serialization format. In response to determining that an event has occurred, some embodiments may deserialize the serialized smart contract state data into a deserialized directed graph. In some embodiments, a vertex (a term used interchangeably with the term node) of the directed graph may be associated with a norm from a set of norms of the smart contract and is described herein as a "norm vertex," among other terms, where a norm vertex may be connected one or more other norm vertices via graph edges of the directed graph. Some embodiments may then update the directed graph based on a set of consequent norms and their associated consequent norm vertices, where each of the consequent norms are determined based on which norms were triggered by the event and what norm conditions are associated with those active norms. The updated directed graph may then be reserialized to update the smart contract. In some embodiments, a norm vertex may not have any associated conditions. In some embodiments, the amount of memory used to store the serialized smart contract state data may be significantly less than the memory used by deserialized smart contract state data. During or after the operation to update the smart contract, some embodiments may send a message to entities listed in a list of entities (such as an associative array of entities) to inform the entities that the smart contract has been updated, where the smart contract includes or is otherwise associated with the list of entities. Furthermore, it should be understood in this disclosure that a vertex may include (or comprise) a condition by being associated with the condition. For example, a norm vertex may include a first norm condition by including a reference pointer to the first norm condition.

In some embodiments, generating the smart contract may include using an integrated development environment (IDE) and may include importing libraries of provisions re-used across agreements. Furthermore, some embodiments may generate a smart contract based on the use of natural language processing (NLP), as further described below. For example, some embodiments may apply NLP operations to convert an existing prose document into a smart contract using operations similar to those described for patent application 63/034,255, titled "Semantic Contract Maps," which is herein incorporated by reference. For example, some embodiments may apply a set of linear combinations of feature observations and cross observations across first order and second orders in feature space to determine a smart contract program or other symbolic AI program. Alternatively, or in addition, some embodiments may include constructing a smart contract from a user interface or text editor without using an existing prose document. In some embodiments, the smart contract may be encoded in various forms, such as source code, bytecode, or machine code encodings. In some embodiments, a smart code may be generated or modified in one type of encoding and be converted to another type of encoding before the smart code is used. For example, a smart contract may be edited in a source code encoding, and the smart contract may be executed by converting the smart contract into a bytecode encoding executing on a distributed computing platform. As used herein, a smart contract may be referred to as a same smart contract between different encodings of the smart contract. For example, a smart contract may be written in source code and then converted to a machine code encoding, may be referred to as a same smart contract.

Furthermore, as used herein, the sets of items of a smart contract data model may be encoded in various formats. A set of items be encoded in an associative array, a b-tree, a R-tree, a stack, or various other types of data structures. As used herein, the sets of items in the data model may be determined based on their relationships with each other. For example, a set of entities may be encoded as an associative array of entities or may be encoded as an entities b-tree, and elements of a knowledge list may include references to an entity in the set of entities for either type of encoding. In some embodiments, sets of items in their respective data models may be based on the underlying relationships and references between the items in the sets of items, and embodiments should not be construed as limited to specific encoding formats. For example, while some embodiments may refer to an associative array of norms, it should be understood that other embodiments may use a b-tree to represent some or all of the set of norms.

A smart contract may be stored on different levels of a memory hierarchy. A memory hierarchy of may include (in order of fastest to slowest with respect to memory access speed) processor registers, Level 0 micro operations cache, Level 1 instructions cache, Level 2 shared cache, Level 3 shared cache, Level 4 shared cache, random access memory (RAM), a persistent flash memory, hard drives, and magnetic tapes. For example, a Level 1 cache of a computing device may be faster than a RAM of the computing device, which in turn may be faster than a persistent flash memory of the computing device. In some embodiments, the memory of a computing device at a first layer of the memory hierarchy may have a lower memory capacity than a memory of the computing device at a slower layer of the memory hierarchy. For example, a Level 0 cache may memory capacity of 6 kibibytes (KiB), whereas a Level 4 cache may have a memory capacity of 128 mebibytes (MiB).

In some embodiments, memory may be further distinguished between persistent storage and non-persistent storage (i.e. "non-persistent memory"), where persistent storage is computer memory that may retain the values stored in it without an active power source. For example, persistent storage may include persistent flash memory, hard drives, or magnetic tape, and non-persistent memory may include processor registers, cache memory, or dynamic RAM. In some embodiments, a smart contract may be stored on memory at different levels of the memory hierarchy to increase storage efficiency of the smart contract. For example, serialized smart contract state data of the smart contract may be stored on RAM of a computing device while the deserialized smart contract state data may be stored on a cache of the computing device.

In some embodiments, the smart contract may update infrequently, such as less than once per hour, less than once day, less than once per month, or the like. The relative infrequency of the updates can mean that the relative computing resources required to deserialize and reserialize data be significantly less than the computing resources required to maintain deserialized data in higher-speed memory. In some embodiments, the dynamic program state By serializing a portion of the smart contract data and persisting the serialized data instead of the corresponding deserialized data to a persistent storage, a computing system may use reduce the memory requirements of storing and executing the smart contract. In addition, the computing system may also increase the number of smart contracts being executed concurrently by a distributed computing platform or single computing device. Furthermore, as used herein, updating a value may include changing the value or generating the value.

As described herein, some embodiments may store smart contract data in other forms. For example, while some embodiments may temporarily store a directed graph in non-persistent storage, some embodiments may store the directed graph on a persistent storage. In some embodiments, various other types of information such as norm statuses (e.g. "triggered," "failed," "satisfied," etc.) or logical categories (e.g. "rights," "obligation," "prohibition," etc.) may be included in or otherwise associated with some or all of the vertices of the directed graph. Furthermore, some embodiments may generate visual display representing of the program state data to show the directed graph and its associated statuses, categories, or other information. For example, as further described below, some embodiments may display the directed graph as a hierarchical visual element such as a hierarchy tree in a web application.

A smart contract may be implemented in various ways. For example, some embodiments may construct, enforce, or terminate the smart contract using a distributed ledger or distributed computing system. Alternatively, some embodiments may implement the smart contract using a request-response system over a public or private internet protocol (IP) network. Use of the methods described herein may increase the efficiency of smart contract enforcement by advancing the state of complex multi-entity agreements in a fast and unambiguous way. Furthermore, implementing and using smart contracts with the embodiments described herein may allow for the comparison, quantification, and reuse of smart contracts in a way that would be inapplicable to custom-coded smart contracts.

In some embodiments, the smart contract may be stored in a tamper-evident data-store. As discussed below, tamper-evident data stores (e.g., repositories rendering data tamper-evident with one or more tamper-evident data structures)

afford desirable properties, including making it relatively easy to detect tampering with entries in the data store and making it relatively difficult or impossible to tailor entries to avoid such detection. Furthermore, various smart contracts may be operating across one or more nodes of the tamper-evident data store, reducing the susceptibility of the smart contract to regional disturbances.

None of the preceding should be taken to suggest that any technique is disclaimed or that the approaches described herein may not be used in conjunction with other approaches having these or other described disadvantages, for instance, some embodiments may use a custom-written smart-contract that includes one or more of the norms, data structures, or graphs described herein. Or some embodiments may store a directed graph without serialization or deserialization operations. Or some embodiments may be implemented on a centralized server without storing smart contract state data on a distributed computing system such as a decentralized computing system. Further, it should be emphasized that the data structures, concepts, and instructions described herein may bear labels different from those applied here in program code, e.g., a data structure need not be labeled as a "node" or a "graph" in program code to qualify as such, provided that the essential characteristics of such items are embodied.

In some embodiments, the processes and functionality described herein may be implemented as computer code stored on a tangible, non-transitory, machine-readable medium, such that when instructions of the code are executed by one or more processors, the described functionality may be effectuated. For example, the processes 100 of FIG. 1 (or any of the other processes described in this disclosure) may be implemented as computer code stored on a non-transitory machine-readable medium. like Instructions may be distributed on multiple physical instances of memory, e.g., in different computing devices, or in a single device or a single physical instance of memory (e.g., non-persistent memory or persistent storage), all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

FIG. 1 is a flowchart of an example of a process by which program state data of a program may be deserialized into a directed graph, updated based on an event, and re-serialized, in accordance with some embodiments of the present techniques. In some embodiments, the process 100, like the other processes and functionality described herein, may be implemented by a system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described. For example, while the process 100 may be described as performing the operations of block 112 before block 124, the operations of block 124 may be performed before the operations of block 112. As another example, while the process 3600 may be described as performing operations of block 3602 before performing operations of block 3604, the operations of block 3604 may be performed before the operations of block 3602. Some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 100 includes determining that an event has occurred based on an event message, a calculation, or a condition expiration threshold, as indicated by block 104. In some embodiments, the system may determine that an event has occurred after receiving an event message at an API of the system indicating that the event has occurred. As used herein, an event message may be transmitted across or more packets over a wired or wireless connection, where a system may continuously, periodically, or be activated to listen for an event message. In some embodiments, as described further below, an event message may be transmitted over a public or private IP network. Alternatively, or in addition, the event message may be transmitted via the channels of a distributed computing system. For example, the event message may be transmitted from a first node of a distributed computing system (e.g., a blockchain platform) to a second node of the distributed computing system, where the first node and second node may be at different geographic locations (e.g., different nodes executing on different computing devices) or share a same geographic location (e.g., different nodes executing on a same computing device). Furthermore, an event message may be sent by a first smart contract executing on a first computing distributed platform to a second smart contract executing on a same or different distributed computing platform. In some embodiments, determining than event has occurred does not require verification that the event has occurred. For example, in some embodiments, receiving an event message indicating an event has occurred may be sufficient for the system to determine that the event occurred. Furthermore, in some embodiments, a norm vertex may be triggered based on an event satisfying a subset of its associated norm conditions. Alternatively, a norm vertex may be triggered only after an event satisfies all of its associated norm conditions.

In some embodiments, the event may include satisfying a condition expiration threshold associated with a triggerable norm vertex (herein "triggerable vertex") without satisfying a norm condition associated with the triggerable vertex, where a norm condition may be various types of conditions implemented in a computer-readable form to return a value (e.g., "True," "False," set of multiple binary values, or the like). For example, a norm condition may include an "if" statement to test whether a payload containing a set of values was delivered to an API of the system by a specific date, where a condition expiration threshold is associated with the norm condition. After the specific date is reached, the system may determine that the condition expiration threshold is satisfied and determine whether the associated norm condition is satisfied. In response to a determination that the norm condition is not satisfied, the system may determine that an event has occurred, where the event indicates that a condition expiration threshold associated with a triggered norm vertex (herein "triggered vertex") is satisfied and that an associated norm condition of the triggered vertex is not satisfied. As further stated below, such an event may trigger the associated norm vertex and result in the activation of a set of norms, where the activation of the set of norms may be represented by the generation or association of an adjacent vertex to the triggered vertex, where the adjacent vertex may be updated to be triggerable. As used in this disclosure, it should be understood that satisfying the condition expiration threshold of a triggerable vertex does satisfy a condition associated with the triggerable vertex.

In some embodiments, the event message may include a publisher identifier to characterize a publisher of the event message. As used herein, a publisher may be an entity and may include various sources of an event message. For example, a publisher may include a publisher in a publisher-subscriber messaging model or a sender of a response or request in a response-request messaging model. In some embodiments, the publisher identifier may be an entity identifier that is a specific name unique to a source of the event message. For example, a publisher identified by the publisher identifier "BLMBRG" may be transmitted in the event message, where "BLMBRG" is unique to a single publisher. Alternatively, or in addition, a publisher identifier may include or be otherwise associated with an identifier corresponding to an entity type that may be assigned to one or more sources of event messages. For example, the publisher identifier may include or otherwise be associated with an entity type such as "TRUSTED-VENDOR," "ADMIN", or the like.

After receiving a publisher identifier, the system may determine whether the publisher identifier is associated with one of a set of authorized publishers with respect to the event indicated by the event message. In some embodiments, the system may refer to a set of authorized publishers corresponding to the event indicated by the event message. For example, the event message may indicate that an event associated with the event message "PAY DELIVERED" has occurred. In in response, the system may determine that the event satisfies an condition threshold, where satisfying the condition threshold may include a determination that the event satisfies one or more norm conditions in an associative array of conditions and that the associated publisher is authorized to deliver the message. The associative array of conditions may include a list of norm conditions that, if satisfied, may result in triggering at least one triggerable vertex of the smart contract. For example, the system may determine that the event "PAY DELIVERED" is a direct match with the norm condition "if(PAY DELIVERED)" of the associative array of conditions. In some embodiments, the system may then refer to the set of authorized publishers associated with the event "PAY DELIVERED." The system may then determine whether the publisher identifier is in the set of authorized publishers or otherwise associated with the set of authorized publishers, such as by having an entity type representing the set of authorized publishers. In some embodiments, if the system determines that the event message is not authorized, the event message may be rejected as not authorized.

In some embodiments, the operation to authorize the event may include a operations represented by Statement 1 or Statement 2 below, where "prop" may be a string value including an event and "pub" may be a string value representing a publisher identifier or entity type. In some embodiments, Statement 1 below may represent an authorization operation that includes the arrival of an event E[pub] from publisher pub. The system may then compare the publisher "P[E[pub]]" of the event "E[pub]" with each of a set of authorized publishers "D[E[prop]][pub]", where each of the set of authorized publishers is authorized to publish the event "E[prop]". In some embodiments, the set of entities may include or otherwise be associated with the set of authorized publishers. Statement 2 may represent the situation which a plurality of entities may publish a valid event and the systems authorizes a message based on the entity type "P[E[pub]][role]" being in the set of authorized publishers "D[E[prop]][pub]," where the set of authorized publishers "D[E[prop]][pub]" may include authorized publisher type:

$$D[E[\text{prop}]][\text{pub}]==P[E[\text{pub}]] \tag{1}$$

$$D[E[\text{prop}]][\text{pub}]==P[E[\text{pub}]][\text{role}] \tag{2}$$

In some embodiments, the set of authorized publishers may include a set of publisher identifiers, and the publisher identifier may in the set of publisher identifiers. For example, if the publisher identifier is "BLMBRG" and the set of authorized publishers include "BLMBRG," the system may determine that an event message including the publisher identifier "BLMBRG" is authorized. Alternatively, or in addition, the set of authorized publishers may include one or more authorized entity types and a respective publisher may be an authorized publisher if the respective publisher identifier is associated with the authorized entity type. For example, if the publisher identifier is "BLMBRG," and if the set of authorized publishers include the entity type "AUTH_PROVIDERS," and if "BLMBRG" is associated with "AUTH_PROVIDERS" via an associative array, then the system may determine that the publisher identifier is associated with the set of authorized publishers. In response, the system may determine that the event message including the publisher identifier "BLMBRG" is authorized. In some embodiments, the system may determine that one or more events indicated by the event message has occurred only after determining that the event message is authorized.

In some embodiments, the event message may include a signature value usable by the system to compute a cryptographic hash value. Furthermore, some event messages may include the event payload with the signature value (e.g., via string concatenation) to compute the cryptographic hash value. The system may use various cryptographic hashing algorithms such as SHA-2, Bcrypt, Scrypt, or the like may be used to generate a cryptographic hash value. In some embodiments, the system may use salting operations or peppering operations to increase protection for publisher information. In some embodiments, the system may retrieve a cryptographic certificate based on a publisher identifier as described above and authenticate the event message after determining that on the cryptographic hash value satisfies one or more criteria based on the cryptographic certificate. A cryptographic certificate may include a cryptographic public key used to compare with the cryptographic hash value, as further discussed below. In addition, the cryptographic certificate may also include one or more second cryptographic values indicating a certificate issuer, certificate authority private key, other certificate metadata, or the like.

In some embodiments, a smart contract may include or be associated with a plurality of cryptographic certificates. The system may determine of which cryptographic certificate to use may be based on a map of entities of the smart contract. In some embodiments, the operation to authenticate the event may include a statement represented by Statement 3 below, where "v" may represent a signature verification algorithm, E[sig] may represent a signature value of an event object "E," "P[E[pub]]" may represent a data structure that includes the entity that had published the event E, and P[E[pub]][cert] may represent a cryptographic certificate value such as cryptographic public key:

$$v(E[\text{sig}],P[E[\text{pub}]][\text{cert}])==\text{True} \tag{3}$$

Various signature verification algorithms may be used to authenticate an event message based on a signature value of the event message. For example, the system may determine that the cryptographic hash value is equal to the cryptographic certificate, and, in response, authenticate the event message. In some embodiments, the system may determine that one or more events indicated by the event message has occurred only after authenticating the event message.

In some embodiments, the system may determine that an event has occurred based on a determination that a condition expiration threshold has been reached. One or more norms represented by norm vertices in the smart contract may include a condition expiration threshold such as an obligation that must be fulfilled by a first date or a right that expires after a second date. For example, a smart contract instance executing on the system may include a set of condition expiration thresholds, where the set of condition expiration thresholds may include specific dates, specific datetimes, durations from a starting point, other measurements of time, other measurements of time intervals, or the like. The system may check the set of condition expiration thresholds to determine if any of the condition expiration thresholds have been satisfied.

An event message may be transmitted under one of various types of messaging architecture. In some embodiments, the architecture may be based on a representational state transfer (REST) system, where the event message may be a request or response. For example, a system may receive a request that includes the event message, where the request includes a method identifier indicating that the event message is stored in the request. As an example, the system may receive a request that includes a "POST" method indicator, which indicates that data is in the request message. In addition, the request my include a host identifier, where the host identifier indicates a host of the smart contract being executed by the system. For example, the host identifier may indicate a specific computing device, a web address, an IP address, a virtual server executing on a distribute computing platform, a specific node of a decentralized computing system, or the like.

In some embodiments, the architecture may be based on a publisher-subscriber architecture such as the architecture of the advanced message queuing protocol (AMQP), where the event message may be a either a publisher message or subscriber message. For example, using the AMQP, a client publisher application may send an event message over a TCP layer to an AMQP server. The event message may include a routing key, and the AMQP server may act as a protocol broker that distributes the event message to the system based on the routing key after storing the event message in a queue. In some embodiments, the system may be a subscriber to the client publisher application that sent the event message.

In some embodiments, the process 100 includes determining which smart contracts of a set of active smart contracts that will change state based on the event, as indicated by block 108. As discussed above, in some embodiments, the system may determine that the event satisfies one or more norm conditions, and, in response, determine that the instance of the smart contract will change state. For example, as further discussed below, the system may determine that the event indicated "PAYLOAD 0105 PROVIDED" satisfies the norm condition represented by the condition "IF DELI VERED(PAYLOAD)," In response, the system may determine that the smart contract will change state. Alternatively, or in addition, as discussed above, the system may determine that the event does not satisfy one or more norm conditions but does satisfy a condition expiration threshold. In response, the system may determine that the instance of the smart contract will change state based on the event not satisfying one or more norm conditions while having satisfied the condition expiration threshold. Furthermore, while this disclosure may recite the specific use of a smart contract program in certain sections, some embodiments may use, modify, or generate other symbolic AI programs in place of a smart contract, where symbolic AI programs are further discussed below.

In some embodiments, the system may include or otherwise have access to a plurality of smart contracts or smart contract instances. The system may perform a lookup operation to select which of the smart contracts to access in response to determining that an event has occurred. In some operations, the smart contract may compare an event to the associative array of conditions corresponding to each of a set of smart contracts to select of the set of smart contracts should be updated and filter out smart contracts that would not change state based on the event. The system may then update each of the smart contract instances associated with a changed norm status, as discussed further below. Furthermore, the system may then update the respective associative array of conditions corresponding to the set of smart contracts. In some embodiments, an associative array of conditions may include only a subset of norm conditions associated with a smart contract, where each the subset of norm conditions is associated with a triggerable vertex of the smart contract. In some embodiments, the system may first deduplicate the norm conditions before performing a lookup operation to increase performance efficiency. For example, after determining that an event has occurred, some embodiments may search through a deduplicated array of norm conditions. For each norm condition that the event would trigger, the system may then update the one or more smart contracts associated with the norm condition in the deduplicated array of norm conditions. By selecting smart contracts from a plurality of smart contracts based on an array of norm conditions instead of applying the event to the norm conditions associated with the norm vertices of each of the set of smart contracts, the system may reduce computations required to update a set of smart contracts.

The smart contract or associated smart contract state data may be stored on various types of computing systems. In some embodiments, the smart contract state data may be stored in a centralized computing system and the associated smart contract may be executed by the centralized computing system. Alternatively, or in addition, the smart contract or associated smart contract state data may be stored on a distributed computing system (like a decentralized computing system) and the associated smart contract may be executed using a decentralized application. Fore example, the smart contract may be stored on and executed by a Turing-complete decentralized computing system operating on a set of peer nodes, as further described below.

In some embodiments, the smart contract data may include or be otherwise associated with a set of entities, such as a set of entities encoded as an associative array of entities. The associative array of entities that may include one or more entities that may interact with or view at least a portion of the data associated with the smart contract. In some embodiments, the associative array of entities may include a first associative array, where keys of the first associative array may indicate specific smart contract entities (e.g. data observers, publishers, or the like), and where each of the keys may correspond with a submap containing entity data such as a full legal name, a legal identifier such as a ISIN/CUSIP and an entity type of the entity such as "LENDER," "BORROWER", "AGENT," "REGULATOR," or the like. In some embodiments, one or more entities of the associative array of entities may include or be associated with a cryptographic certificate such as a cryptographic public key. As described above, the cryptographic certificate may be used to authenticate an event message or other message. By including authorization or authentication operations, the system may reduce the risk that an unauthorized publisher sends an event message or that the event message from a publisher is tampered without the system determining that tampering had occurred. In addition, authorization or authentication operations increase the non-repudiation of event messages, reducing the risk that a publisher may later disclaim responsibility for transmitting an event message.

In some embodiments, the smart contract may also include or otherwise be associated a set of conditions, such as a set of conditions encoded as an associative array of conditions. In some embodiments, the associative array of conditions may include a set of norm conditions and associated norm information. In some embodiments, the set of norm conditions may be represented by an associative array, where a respective key of the associative array may be a respective norm condition or norm condition identifier. The corresponding values of the associative array may include a natural language description of the corresponding condition and one or more publisher identifiers allowed to indicate that an event satisfying the respective norm condition has occurred. In some embodiments, the publisher identifier may indicate a specific entity key or an entity type. Furthermore, the smart contract may also include or otherwise be associated with a set of norm vertices or a set of graph edges connecting the vertices, as further described below.

In some embodiments, the process 100 includes deserializing a serialized array of norm vertices to generate a deserialized directed graph, as indicated by block 112. In some embodiments, the smart contract may include or otherwise be associated with a set of norm vertices encoded as a serialized graph in various data serialization formats, where the smart contract may encode a part or all the norm vertices by encoding the graph edges connecting the norm vertices The serialized graph may include a representation of an array of subarrays. A data serialization format may include non-hierarchical formats or flat-file formats, and may be stored in a persistent storage. In some embodiments, a serialized array of norm vertices may include numeral values, strings, strings of bytes, or the like. For example, the array of norm vertices (or other data structures in program state) may be stored in a data serialization format such as JSON, XML, YAML, XDR, property list format, HDF, netCDF, or the like. For example, an array may be decomposed into lists or dictionaries in JSON amenable to serialization. Each subarray of an array of subarrays may include a pair of norm vertices representing a directed graph edge. For example, a subarray may include a first value and a second value, where the first value may represent a tail vertex of a directed graph edge, and where the second value may represent a head vertex of the directed graph edge. For example, a subarray may include the value "[1,5]" where the first value "1" represents a tail vertex indicated by the index value "1" and "5" represents a head vertex indicated by the index value "5." While in serialized form, the array of norm vertices may reduce memory requirements during data storage operations and bandwidth requirements during data transfer operations.

In some embodiments, the serialized array of norm vertices may be used to construct an adjacency matrix or an index-free adjacency list to represent a deserialized directed graph during a deserialization operation. In some embodiments, an adjacency matrix or adjacency list may increase efficient graph rendering or computation operations. In some embodiments, the deserialized directed graph may be stored in a faster layer of memory relative to the serialized graph, such as in a non-persistent memory layer. For example, the system may deserialize a serialized array of vertices stored in flash memory to a deserialized directed graph stored in Level 3 cache. In some embodiments, as further described below, instead of forming a directed graph that includes all of the norm vertices included in the serialized array of norm vertices, the system may instead form a directed graph from a subset of the serialized array of norm vertices. As described above, each norm vertex may have an associated norm status indicating whether the norm vertex is triggerable. In response, the system may form a directed graph of the triggerable vertices without rendering or otherwise processing one or more norm vertices not indicated to be triggerable. Using this method, a vertex that is included in the serialized array of vertices may be absent in the directed graph stored in non-persistent memory. By reducing the number of number of vertices in a deserialized directed graph, the efficiency of querying and updating operations of the smart contract may be increased.

In some embodiments, the system may include an initial set of norm vertices that is distinct from the array of norm vertices. For example, some embodiments may determine that the smart contract had made a first determination that an event had occurred. In some embodiments, the system may search the data associated with the smart contract to find an initial set of norm vertices representing an initial state of the smart contract. The system may then deserialize the initial set of norm vertices when executing the smart contract and perform the operations further described below. The system may then deserialize a different array of norm vertices during subsequent deserialization operations.

In some embodiments, the process 100 includes determining a set of triggerable vertices based on the directed graph, as indicated by block 120. In some embodiments, the system may determine the set of triggerable vertices based on the directed graph stored in non-persistent memory by searching through the vertices of the directed graph for each of the head vertices of the directed graph and assigning these vertices as a set of head vertices. The system may then search through the set of head vertices and filter out all head vertices that are also tail vertices of the directed graph, where the remaining vertices may be the set of leaf vertices of the directed graph, where each of the leaf vertices represent a triggerable vertex. Thus, the set of leaf vertices determined may be used as the set of triggerable vertices.

Alternatively, in some embodiments, a vertex of the set of norm vertices may include or otherwise be associated with a norm status indicating whether the vertex is triggerable or not. In some embodiments, the system may search through the directed graph for vertices that have an associated norm status indicating that the respective vertex is triggerable. Alternatively, or in addition, the system may search through a list of norm statuses associated with the vertices of the serialized array of norm vertices to determine which of the vertices is triggerable and determine the set of triggerable vertices. For example, in some embodiments, each norm vertex of a smart contract may have an associated norm status indicating whether the vertex is triggerable or not triggerable, where the vertices and their associated statuses may be collected into a map of vertex trigger states. The system may then perform operations to traverse the map of vertex trigger states and determine the set of triggerable vertices by collecting the vertices associated with a norm status indicating that the vertex is triggerable (e.g. with a boolean value, a numeric value, a string, or the like). For example, the system may perform operations represented by Statement 4 below, where G may represent a graph and may be an array of subarrays g, where each subarray g may represent a norm vertex and may include a set of values that include the value assigned to the subarray element g[4], where the subarray element g[4] indicates a norm status, and "Active" indicates that the norm vertex associated with subarray g is triggerable, and A is the set of triggerable vertices:

$$A \leftarrow \{g \in G | g[4] = \text{"Active"}\} \quad (4)$$

In some embodiments, the process 100 includes determining a set of triggered vertices based on the set of triggerable vertices, as indicated by block 124. In some embodiments, the system may compare determine the set of triggered vertices based on which the norm conditions associated with the vertices of the directed graph are satisfied by the event. In some embodiments, a norm condition may directly include satisfying event. For example, a norm condition may include "IF DELIVERED(PAYMENT)," where the function "DELIVERED" returns a boolean value indicating whether a payment represented by the variable "PAYMENT" is true or false. The system may then determine that the norm condition is satisfied if "DELIVERED (PAYMENT)" returns the boolean value "True." The system may then add the vertex associated with the norm condition to the set of triggered vertices. For example, the system may perform operations represented by Statement 5 below, where "A" is the set of triggerable vertices determined above, and where each subarray "a" may represent a triggerable vertex and may include a set of values that include the value assigned to the subarray element a[1], where the subarray element a[1] indicates a condition, and "U" is the set of triggered vertices, and "N" is an associative array that describes the possible graph nodes that may be triggered, such that, for an event prop, N[prop] may return a structure that contains defining details of the vertices associated with the event prop:

$$U \leftarrow \{a \in A | N[a[1]][\text{prop}] = E[\text{prop}]\} \quad (5)$$

In some embodiments, the determination that an event satisfies a norm condition may be based on a categorization of a norm into logical categories. As further described below in FIG. 5, logical categories may include values such as a "right," "obligation," "prohibition," "permission," or the like. In some embodiments, after a determination that an event triggers a norm condition, the generation of consequent norms or norm status changes associated with a triggered vertex may be based on the logical category.

In some embodiments, a snapshot contract status may be associated with the smart contract and may be used to indicate a general state of the smart contract. The snapshot contract status may indicate whether the obligations of a contract are being fulfilled or if any prohibitions of the contract are being violated. For example, in some embodiments, satisfying an obligation norm condition may result in an increase in the snapshot contract status and triggering a prohibitions norm may result in a negative change to the snapshot contract status.

In some embodiments, the process 100 includes performing one or more operations indicated by blocks 152, 154, 156, and 160 for each of the respective triggered vertex of the set of triggered vertices, as indicated by block 150. In some embodiments, the process 100 includes updating the respective triggered vertex based on an event by updating a norm status associated with the respective triggered vertex, as indicated by block 152. Updating a respective triggered vertex may include updating one or more norm statuses or other status values associated with the respective triggered vertex. For example, a norm status of the respective triggered vertex may be updated to include one of the strings "SATISFIED," "EXERCISED," "FAILED," or "CANCELED," based on the norm conditions associated with the respective triggered vertex having been satisfied, exercised, failed, or canceled, respectively. In some embodiments, the system may update a norm status to indicate that the respective triggered vertex is not triggerable. For example, an obligation norm of a smart contract may be required to be satisfied only once. In response, after determining that the norm condition associated with the obligation has been satisfied by an event, the system may update a first status value associated with the respective triggered vertex to "false," where the first status value indicates whether the respective triggered vertex is triggerable. In some embodiments, the one or more status values may include a valence value indicating the number of connections from the respective triggered vertex to another vertices, the number of connections to the respective triggered vertex from other vertices, or the like. As further described below, in some embodiments, the valence value or other status value associated with the respective triggered vertex may be updated after performing operations associated with the adjacent vertices of the respective triggered vertex.

In some embodiments, the process 100 includes determining whether a respective adjacent vertex of the respective triggered vertex should be set to be triggerable, as indicated by block 154. In some embodiments, the respective triggered vertex may include a pointer to or otherwise be associated with a set of adjacent vertices, where each of the set of adjacent vertices represent a norm of the smart contract that are set to occur after the respective triggered vertex is triggered. In some embodiments, the system may determine whether an adjacent vertex of a respective triggered vertex should be set as triggerable based on specific conditions associated with the adjacent vertex. For example, a respective triggered vertex may include program code instructing that a first set of adjacent vertices should be set to be triggerable if a first set of conditions are satisfied and that a second set of adjacent vertices should be set to be triggerable if a second set of conditions are satisfied, where the first set of adjacent vertices are distinct from the second set of adjacent vertices. Alternatively, or in addition, the respective triggered vertex may include program instructing that a third set of adjacent vertices should be set to be triggerable if the first set of conditions are not satisfied but an associated condition expiration threshold is satisfied.

In some embodiments, the process 100 includes updating the respective adjacent vertex based on the event, as indicated by block 156. Updating the respective adjacent vertex based on the event may include setting one or more norm statuses associated with the adjacent vertex to indicate that the respective adjacent vertex is triggerable. For example, after a determination that a respective adjacent vertex associated with a permission norm is to be set to be triggerable, a norm status associated with the respective adjacent vertex may be updated to the value "triggerable."

In some embodiments, the process 100 includes determining whether any additional triggered vertices are available, as indicated by block 160. In some embodiments, the system may determine that additional triggered vertices are available based on a determination that an iterative loop used to cycle through each the triggered vertices has not reached a termination condition. In response to a determination that additional triggered vertices are available, the process 100 may return to the operations of block 150. Otherwise, operations of the process 100 may proceed to block 164.

In some embodiments, the process 100 includes updating the directed graph based on the updated triggered vertices or the respective adjacent vertices, as indicated by block 170. In some embodiments, updating the directed graph may include updating an adjacency matrix or adjacency list representing the directed based on each of the triggered vertices or their respective adjacent vertices. In some embodiments, instead of looping through each updated vertex and then updating the directed graph, the system may update the directed graph during or after each update cycle. For example, after updating the respective triggered vertex as described in block 156, the system may update the deserialized directed graph.

In some embodiments, the process 100 includes updating the serialized array of norm vertices or other smart contract state data based on the directed graph and updated vertices, as indicated by block 174. In some embodiments, updating the serialized array of norm vertices may include serializing the directed graph into a data serialization format, as described above. In some embodiments, the data serialization format may be the same as the data serialization format used when performing operations described for block 112. For example, the system may implement a depth-first search (DFS) over the deserialized directed graph to record distinct edge pairs and update the serialized array of norm vertices by either modifying or replacing the serialized array of norm vertices.

In some embodiments, the system may update a knowledge set based on the event and smart contract state changes that occurred in response to the event. In some embodiments, the knowledge set may include a set of previous events. The set of previous events may be encoded as a list of previous events. The list of previous events may include a subarray, where each subarray includes an event identifier of a recorded event or information associated with the recorded event. For example, the list of previous events may include a date and time during which an event occurred, an event identifier, one or more norm conditions satisfied by the event, or the like. In some embodiments, a norm condition may be based on the list of previous events. For example, a norm condition may include a determination of whether an event type had occurred twice within a time duration based on the list of previous events. In some embodiments, the knowledge set may include a set of previously-triggered vertices, where the set of previously-triggered vertices may be encoded as an array of previously-triggered vertices. In some embodiments, the system may further update the knowledge set by updating the array of previously-triggered vertices based on the triggered vertices described above. For example, after updating a respective triggered vertex as described above, the system may update the array of previously-triggered vertices to include the respective triggered vertex. The array of previously-triggered vertices may include a vertex identifier associated with the respective triggered vertex, an event identifier associated with the event that triggered the respective triggered vertex, and a set of values identifying the vertices that are set to be triggerable after triggering the respective triggered vertex.

In some embodiments, the process 100 includes persisting the updated serialized array of norm vertices or other smart contract data to storage, as indicated by block 178. In some embodiments, persisting the smart contract data to storage may include updating the memory storage in a single computing device or a computing device of a centralized computing system. Alternatively, or in addition, persisting the smart contract data to storage may include storing the smart contract data to a decentralized tamper-evident data store. In some embodiments, by storing the serialized array of norm vertices in a decentralized tamper-evident data store instead of storing a deserialized directed graph in the decentralized tamper-evident data store, the system may increase the efficiency and performance of the data distribution amongst the nodes of the decentralized tamper-evident data store. Furthermore, in some embodiments, triggering a norm vertex may include triggering a smart contract termination action. When a smart contract termination action is triggered, vertices other than the respective triggered vertex may be updated to set the statuses of each vertex of these other vertices as not triggerable, even if these other vertices are not directly connected to the triggered vertex.

In some embodiments, the system may display a visualization of the smart contract state. For example, the system may display a visualization of smart contract state as a directed graph, such as (though not limited to) those shown in FIGS. 5-10 below, where the vertices may have different colors based on norm status and/or logical category. Alternatively, or in addition, the system may generate other types of visualizations of the smart contract state. For example, the system may display a pie chart representing of a plurality of smart contract types that indicate which type of the smart contracts have the highest amount of associated cost.

In some embodiments, the process 100 or other processes described in this disclosure may execute on a decentralized computing platform capable of persisting state to a decentralized tamper-evident data store. Furthermore, in some embodiments, the decentralized computing platform may be capable of executing various programs, such as smart contracts, on the computing platform in a decentralized, verifiable manner. For example, each of a set of peer nodes of the computing platform may perform the same computations, and a consensus may be reached regarding results of the computation. In some embodiments, various consensus algorithms (e.g., Raft, Paxos, Helix, Hotstuff, Practical Byzantine Fault Tolerance, Honey Badger Byzantine Fault Tolerance, or the like) may be implemented to determine states or computation results of the various programs executed on the decentralized computing platform without requiring that any one computing device be a trusted device (e.g., require an assumption that the computing device's computation results are correct). The one or more consensus algorithms used may be selected or altered to impede an entity from modifying, corrupting, or otherwise altering results of the computation by peer nodes not under the entity's control. Examples of a decentralized tamper-evident data store may include Interplanetary File System, Blockstack, Swarm, or the like. Examples of a decentralized computing platform may include Hyperledger (e.g., Sawtooth, Fabric, or Iroha, or the like), Stellar, Ethereum, EOS, Bitcoin, Corda, Libra, NEO, or Openchain.

Figure 2:
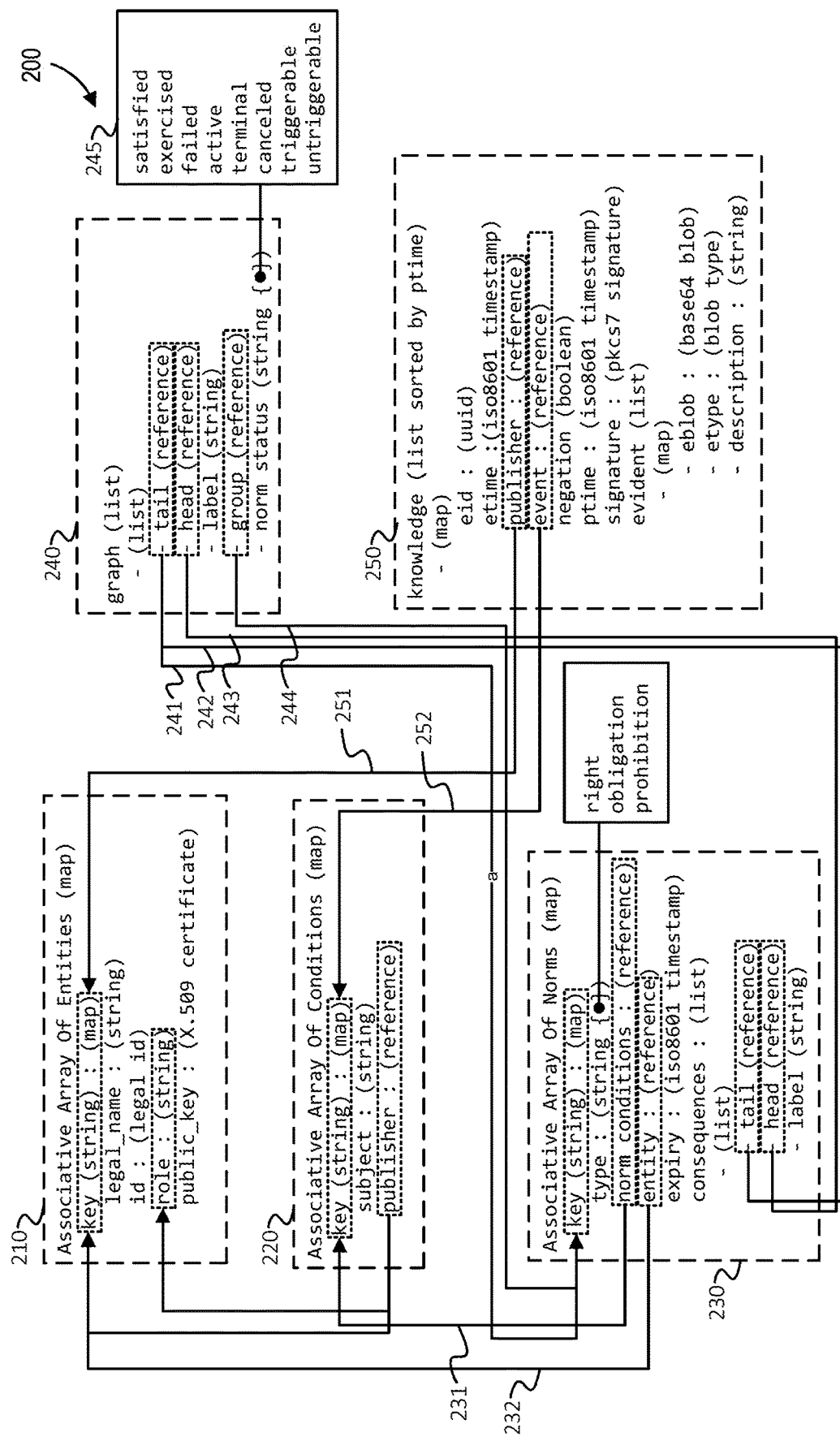
FIG. 2 depicts a data model of program state data, in accordance with some embodiments of the present techniques.

FIG. 2 depicts a data model of program state data, in accordance with some embodiments of the present techniques. In some embodiments, a smart contract may include or otherwise be associated with program state data such as smart contract state data 200. The smart contract state data 200 includes an associative array of entities 210, an associative array of conditions 220, an associative array of norms 230, a graph list 240, and a knowledge list 250. The associative array of entities 210 may include a set of keys, each key representing an entity capable of interacting with or observing smart contract data. For example, a publisher providing an event message to the smart contract may be an entity. The corresponding value of a key of the associative array of entities 210 may include a submap that includes values for a name, a legal identifier value (e.g., a ISIN/CUSIP identifier), an entity type for authorization operations, and a public key for authentication operations (e.g., a cryptographic public key). In some embodiments, the name, identifier value, entity type, or public keys may be used in the authorization and authentication operations discussed for block 104.

The associative array of conditions 220 may include a set of keys, where each key represents an event that may trigger at least one triggerable vertex that would result in a change in norm status, and where a corresponding value of each key includes an events submap. The events submap may include a publisher identifier. As shown by the link 221, the publisher identifier may be used as a reference to the key of the associative array of entities. Alternatively, or in addition, the events submap may include a subject identifier, which may include natural text language to provide a context for the corresponding event.

The associative array of norms 230 may include a set of keys, where each key may represent a norm of the smart contract, which may be associated with as a norm vertex in a graph, norm conditions and consequent norms. In some embodiments, the consequent norms may themselves be associated with their own norm vertices. Each value corresponding to the norm may include a norms submap that includes one or more norm conditions that may be used to trigger the norm by satisfying a norm condition, or by not satisfying the norm condition after satisfying condition expiration threshold associated with the norm. As shown by the link 231, the norm conditions may include a norm identifier that may be used as a reference to a key of the associative array of conditions 220. The norms submap may also include an entity identifier, where the entity identifier may be used as reference to a key of the associative array of entities 210, as shown by the link 232. The norm may also include a condition expiration threshold, which may be represented by the "expiry" field shown in the associative array of norms 230. As discussed above, some embodiments may result in a norm status change or trigger other updates to a vertex if a norm condition is not satisfied but the condition expiration threshold is satisfied. The norm submap may also include a consequences list, where the consequences list may include set of sublists that includes a tail vertex representing a consequent norm that become triggerable, a head vertex of the new norm (which may be the triggered norm), and a label.

In some embodiments, a smart contract state may initially construct the graph list 240 in a first iteration based on the associative array of norms 230 and update the graph list 240 based on a previous iteration of the graph list 240. As described above, the graph list may be in a serialized form, such as a serialized array of norm vertices written in the YAML markup language. As discussed above, the graph list 240 may be a list of graph sublists, where each sublist includes a tail vertex value, a head vertex value, a label associated with the graph edge connecting the tail vertex with the head vertex, a group identifier, and a norm status value. In some embodiments, the norm status may include values such as "satisfied," "exercised," "failed," "active," "terminal," "canceled," "triggerable," or "untriggerable." In some embodiments, a norm vertex may be associated with more than one norm status. As shown by link 241, a tail vertex of the graph may be linked to a norm in the associative array of norms 230. Similarly, as shown by the links 242-243, the tail and head vertices of the graph list 240 may be associated with a listed tail norm or head norm in the associative array of norms 230 for a respective norm. Furthermore, as shown by the link 244, the group identifier listed in a graph sublist may also be associated with a value in the associative array of norms 230, such as with a key in the associative array of norms 230.

In some embodiments, a smart contract state may initially construct the knowledge list 250 in a first iteration based on the associative array of norms 230 and update the knowledge list 250 based on smart contract state changes. The knowledge list 250 may be sequentially ordered in time (e.g. a time when a norm status changes, a time when an event is received, or the like). In some embodiments, each entry of the knowledge list 250 may include an identifier "eid," an event time "etime," a publisher identifier associated with an event that triggered a norm vertex, the event that triggered the norm vertex. In addition, the knowledge list 250 may include various other data related to the smart contract state change, such as a field "negation" to indicate whether an event is negated, a field "ptime" in ISO8601 format to represent an sub-event time (e.g. for event that require multiple sub-events to trigger a norm vertex), a field "signature" to provide a signature value that allows authentication against the public key held by a publisher for later data authentication operations or data forensics operations. In some embodiments, the knowledge list 250 may include an evidence list, where the evidence list may include a base64 encoded blob, an evidence type containing a string describing the file type of the decoded evidence, and a field for descriptive purposes. In some embodiments, the evidence list may be used for additional safety or verification during transactions.

As described above, some embodiments may efficiently store or update program state data using a set of serialization or deserialization operations. Some embodiments may assign outcome scores to possible outcomes of an update operation, which may then be used to predict future states of a program. Some embodiments may perform operations, such as those described further below, to predict an outcome score using data encoded in a directed graph with greater efficiency or accuracy.

Graph Outcome Determination in Domain-Specific Execution Environment

In some embodiments, outcomes of symbolic AI models (like the technology-based self-executing protocols discussed in this disclosure, expert systems, and others) may be simulated and characterized in various ways that are useful for understanding complex systems. Examples of symbolic AI systems include systems that may determine a set of outputs from a set of inputs using one or more lookup tables, graphs (e.g. a decision tree), logical systems, or other interpretable AI systems (which may include non-interpretable sub-components or be pipelined with non-interpretable models). The data models, norms, or other elements described in this disclosure constitute an example of a symbolic AI model. Some embodiments may use a symbolic AI model (like a set of smart contracts) in order to predict possible outcomes of the model and determine associated probability distributions for the set of possible outcomes (or various population statistics). Features of a symbolic AI model that incorporates elements of data model described in this disclosure may increase the efficiency of smart contract searches. In addition, the use of logical categories (e.g., "right," "permission," "obligation") describing the relationships between conditional statements (or other logical units) of a smart contract may allow the accurate prediction of (or sampling of) outcomes across a population of differently-structured smart contracts without requiring a time-consuming analysis of each of the contexts of individual smart contracts from the population of differently-structured smart contracts. Furthermore, the operations of a symbolic AI model may be used to predict outcomes (e.g., of a smart contract, or call graph of such smart contracts) and may be tracked to logical units (like conditional statements, such as rules of a smart contract). These predicted outcomes may be explainable to an external observer in the context of the terms of the logical units of symbolic AI models, which may be useful in medical fields, legal fields, robotics, dev ops, financial fields, or other fields of industry or research.

In some embodiments, the symbolic AI model may include the use of scores for a single smart contract or a plurality of smart contracts, where the score may represent various values, like a range of movement along a degree of freedom of an industrial robot, an amount of computer memory to be allocated, an amount of processing time that a first entity owes a second entity, an amount to be changed between two entities, a total amount stored by an entity, or the like. A symbolic AI model may include scores of different type. Changes in scores of different type may occur concurrently when modeling an interaction between different entities. For example, a first score type may represent an amount of computer memory to be stored within a first duration and a second score type may represent an amount of computer memory to stored within a second duration that occurs after the first duration. A smart contract may be used to allocate computer memory across two different entities to optimize memory use across the entity domains. Possible outcomes and with respect to memory allocation across the two domains may be simulated. Alternatively, or in addition, exchanges in other computing resources of the same type or different types may be simulated with scores in a symbolic AI model. For example, a symbolic AI model may include a first score and as second score, where the first score may represent an amount of bandwidth available for communication between a first entity or second entity and a third entity, and where the second score may represent an amount of memory available for use by the first or second entity. The outcome of an exchange negotiated via a smart contract between the first and second entity for bandwidth and memory allocation may then be simulated to predict wireless computing resource distribution during operations of a distributed data structure across a wireless network or other computing operations.

In some embodiments, simulating outcomes of may include processing one or more norm vertices representing one or more norms of a smart contract as described in this disclosure. For example, the symbolic AI model may include an object representing a norm vertex, where the object includes a first score representing an amount owed to a first entity and a second score representing an amount that would be automatically transferred to the first entity (e.g., as a down payment). In some embodiments, the symbolic AI model may incorporate the entirety of a smart contract and its associated data model when performing simulations based on the smart contract. For example, a symbolic AI model may include one or more directed graphs of to represent the state of a data model. Alternatively, or in addition, some embodiments may include more data than the smart contract being simulated or less data than the smart contract be simulated.

In some embodiments, the symbolic AI system (a term used interchangeably with symbolic AI model) may process the conditional statements (or other logical units) associated with each of the norms of a smart contract to increase simulation efficiency by extracting only quantitative changes and making simplifying assumptions about score changes. For example, a system may collect the norm conditions and associated outcome subroutines associated with each of a set of norm vertices and extract only the changes in an amount of currency owed as a first score and changes in an amount of currency transferred as a seconds score when incorporating this information into the conditions of the symbolic AI model. In some embodiments, the information reduction may increase computation efficiency by removing information from the analysis of a smart contract determined to be not pertinent to a selected score. Some embodiments simulate outcomes across a plurality of smart contracts using a standardized search and simulation heuristic, and the system described herein may provide a population of scores, where the population of scores may be the plurality of outcome scores determined from a simulation of each of the smart contracts or values computed from the plurality of outcome scores. For example, values determined based on the population of scores may include parameters of a probability distribution of the scores, a total score value, a measure of central tendency (e.g. median score value, mean score value, etc.), or the like.

In some embodiments, the symbolic AI model may be an un-instantiated smart contract or may be a transformation thereof, e.g., approximating the smart contract. For example, as further described below, the system may instantiate a program instance that includes a symbolic AI model based on a selected smart contract that is not yet instantiated. Alternatively, a symbolic AI model may be determined based on an instantiated smart contract. For example, the system may select an instantiated smart contract with a program state that has already changed from its initial program state in order to determine future possible outcomes in the context of the existing changes. The system may then copy or otherwise use a simulated version of the changed program state when simulating the instantiated smart contract. For example, the system may select an instantiated smart contract for simulation with a symbolic AI system and deserialize a directed graph of the instantiated smart contract. The symbolic AI system may copy the deserialized directed graph to generate a simulation of the directed graph, where the nodes of the simulated directed graph are associated with simplified conditional statements that convert quantifiable changes into scores and are stripped of non-quantifiable changes in comparison to the conditional statements of the smart contract.

Figure 3:
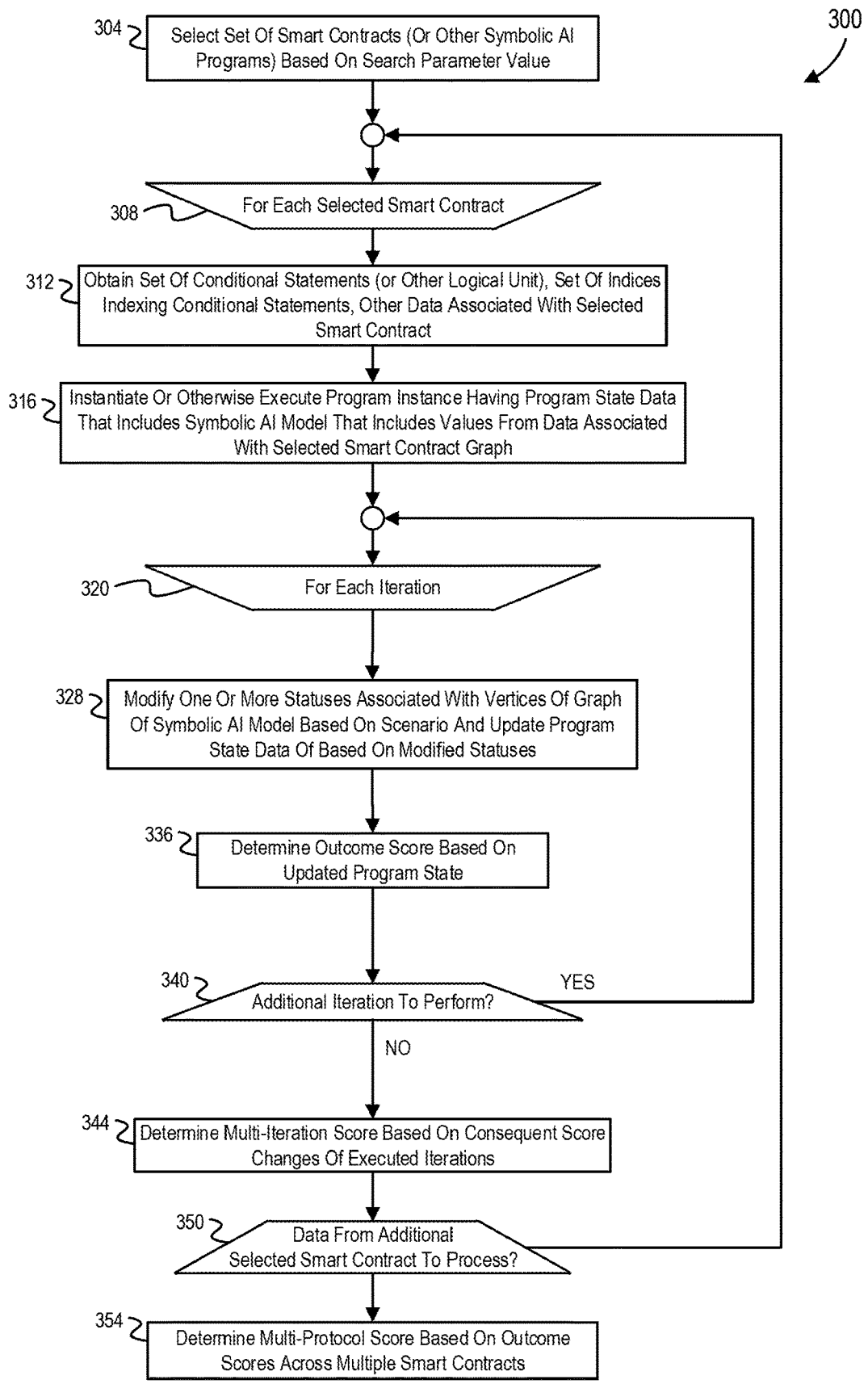
FIG. 3 is flowchart of an example of a process by which a program may simulate outcomes or outcome scores of symbolic AI models, in accordance with some embodiments of the present techniques.

FIG. 3 is flowchart of an example of a process by which a program may simulate outcomes or outcome scores of symbolic AI models, in accordance with some embodiments of the present techniques. In some embodiments, a process 300 includes selecting a set of smart contracts (or other symbolic AI models) based on a search parameter, as indicated by block 304. In some embodiments, a system may include or otherwise have access to a plurality of smart contracts or smart contract instances, and the system may select a set of smart contracts from the plurality based on a specific search parameter, such as an entity, entity type, event, event type, or keyword. For example, the system may perform a lookup operation to select which of the smart contracts to access based an event. During the lookup operation, the system may compare an event to the associative arrays of conditions corresponding to each of a plurality of smart contracts and select a set of smart contracts based on which of the smart contracts would change state in response to receiving the event. Some embodiments may crawl a call graph (of calls between smart contracts, or other symbolic AI models) to select additional smart contracts.

In addition, or alternatively, the system may perform a lookup operation to select which of the smart contracts to access based on an entity or entity type. For example, the system may compare an entity to the associative arrays of entities corresponding to each of a plurality of smart contracts and select a set of smart contracts based on which of the corresponding arrays of entities include the entity. An entity identifier may be in an array of entities or some other set of entities if an entity type associated with the entity identifier is in the array of entities. For example, if the entity "BLMBRG" has an associated entity type of "trusted publisher," some embodiments may determine that "BLMBRG" is in the set of entities of a smart contract if the entity type "trusted publisher" is listed in the set of entities. Alternatively, some embodiments may require that the exact entity identifier be listed in a set of entities before determining that the entity identifier in the set of entities. For example, some embodiments may determine that "BLMBRG" is in a set of entities of a smart contract only if "BLMBRG" is one of the elements of the set of entities. Furthermore, in some embodiments, the search may include intermediary entities between two different entities, where intermediary smart contract may be a smart contract (other than the first or second smart contract) that has relationships with both the first and second entities. For example, a search for smart contracts relating a first entity and a second entity may return a set smart contracts that include a first smart contract and a second smart contract, where the array of entities of the first smart contract includes the first entity and an intermediary entity, and where the array of entities of the second smart contract includes the second entity and the intermediary entity.

In some embodiments, an intermediary entity for a first entity and a second entity may be found by determining the intersection of entities between a first set of smart contracts associated with the first entity and a second set of smart contracts associated with the second entity. For example, the system may select a first set of smart contracts from a plurality of smart contracts based on which sets of entities associated with plurality of smart contracts include the first entity. Similarly, the system may select a second set of smart contracts from a plurality of smart contracts based on which sets of entities associated with plurality of smart contracts include the second entity. The system may then determine the intersection of entities by searching through the sets of entities of the first and second set of smart contracts to collect the entities that appear in both the first set and second set and determine that these collected entities are intermediary entities. In some embodiments, as further described below, additional methods are possible to determine a set of smart contracts associating a first entity with a second entity in order to quantify a relationship between the first entity and the second entity.

As discussed in this disclosure, some embodiments may crawl a call graph to select additional smart contracts based on possible relationships between a first entity and a second entity. The call graph may be a privity graph, which may track privity relations between the first entity and entities other than the second entity in order to determine or quantify relations between the first entity and the second entity. if For example, some embodiments may crawl through a privity graph of possible score changes across multiple contracts and determine a quantitative score relationship between a first entity and a second entity based on a first transaction between the first entity and a third entity, a second transaction between the third entity and a fourth entity, a third transaction between the fourth entity and a fifth entity, and a fourth transaction between the fifth entity and the second entity.

In some embodiments, the process 300 includes performing one or more operations indicated by blocks 312, 316, 320, 324, 328, 336, 340, 344, and 350 for each of the respective smart contracts or other programs of the selected set of smart contracts or other programs, as indicated by block 308. As further discussed below, the one or more outputs from executing each of the smart contracts may be used to determine a population of scores of multiple smart contracts. As used herein, the population of scores of multiple smart contracts may represent one or more population metric values calculated from scores of the smart contract. For example, the population of scores of multiple smart contracts may include a measure of central tendency, a measure of dispersion, a kurtosis value, a parameter of a statistical distribution, one or more values of histogram, or the like. Furthermore, in some embodiments, the process 300 may include performing one or more operations in parallel using multiple processor cores, where performing multiple operations in parallel may include performing the multiple operations concurrently. For example, some embodiments may perform the operations of the blocks 312, 316, 320, 324, 328, 336, 340, 344, and 350 for a plurality of smart contracts in parallel by using one or more processors for each of the plurality of smart contracts. By performing operations in parallel, computation times may be significantly reduced.

In some embodiments, the process 300 includes acquiring a set of conditional statements (or other logical units), set of entities, set of indices indexing the conditional statements, or other data associated with the selected smart contract, as indicated by block 312. Each of the set of conditional statements may be associated with an index value and may include or be otherwise associated with a respective set of conditions and a respective set of outcome subroutines, where a computing device may execute the respective set of outcome subroutines in response to an event satisfying the respective set of conditions. In some embodiments, the set of conditional statements may form a network, like a tree structure, with respect to each other. For example, an outcome subroutine of one the conditional statements may include a reference to or otherwise use an index value associated with another conditional statement. In some embodiments, the set of conditional statements and set of indices may be acquired from a data model, where the index values may be or otherwise correspond to the identifiers for norm vertices of a directed graph. For example, the set of conditional statements and set of indices may be acquired from the associative array of norms 230, the associative array of conditions 220, and the graph list 240. Alternatively, the system may acquire the conditional statements and indices from data stored using other data models. For example, the system may acquire the conditional statements from an indexed array of objects, where each object may include a method that can take an event as a parameter, test the event based on a condition of the method, and return a set of values or include a reference to another object of the array. The system may use the indices of the indexed array as the indices of the conditional statements and parse the methods to provide the set of conditional statements.

In some embodiments, the process 300 includes instantiating or otherwise executing a program instance having program state data that includes a symbolic AI model that includes values from the data associated with the selected smart contract, as indicated by block 316. In some embodiments, the symbolic AI model may include graph vertices associated with the set of conditional statements described in this disclosure and may also include directed graph edges connecting the graph vertices. In addition, or alternatively, the symbolic AI model may include a set of tables, decision trees, graphs, or logical systems to provide a predicted value as an output based on one or more inputs corresponding to real or simulated events. For example, the system may traverse the directed graph of a symbolic AI model to determine which nodes of the directed graph to visit based on a decision tree of the symbolic AI model. Furthermore, in some embodiments, the symbolic AI system may be re-instantiated or be modified in real-time in response to a particular event message updating a smart contract being simulated. For example, an instantiated smart contract may be executing and concurrently being simulated by a symbolic AI system. In response to the smart contract receiving an event message, the symbolic AI system may determine a new set of events based on the event message and update its own program state such that its new initial state is based on the smart contract program state after the smart contract program state has been updated by the events of the event message.

In some embodiments, the symbolic AI model may include a graph. In some embodiments, the system may generate a graph list such as the graph list 240 using the methods discussed in this disclosure. In some embodiments, the program instance may be a local version of a selected smart contract and have program state data identical to program state data in the selected smart contract. Alternatively, the program instance may include program data not included in the smart contract or exclude data included in the smart contract. In some embodiments, the graph of the symbolic AI model may include a set of graph vertices and a set of directed graph edges connecting the graph vertices, where each of the graph vertices may be identified by an identifier and corresponds to a conditional statement of a smart contract. In some embodiments, the identifier may be the set of index values associated with the conditional statements of the smart contract. Alternatively, the identifier may be different from the set of index values associated with the conditional statements of the smart contract. For example, the system may choose a set of identifiers that are different from the set of index values to increase system efficiency or reduce memory use.

In some embodiments, the directed graph edges may be structured to provide directional information about the graph vertices of a symbolic AI model. For example, a directed graph edge may be represented as an array of identifier pairs. The first element of each of the identifier pairs may be treated as a tail vertex by the symbolic AI system and the second element of the identifier pairs may be treated as a head vertex by the symbolic AI system. In some embodiments, the selected smart contract may already be in the process of being executed and the program state data of the program instance may include the norm statuses and scores of the smart contract state. For example, the program state data may be copied directly from the state data of a selected smart contract, where the changes effected by the outcome subroutines may be treated as scores.

A smart contract score may represent one of various types of values. For example, a smart contract score may represent a reputation score of an entity in a social network, a cryptocurrency value such as an amount of cryptocurrency, an amount of electrical energy, an amount of computing effort such as Ethereum's Gas, an amount of computing memory, or the like. A smart contract score may represent an objective value associated with an entity, such as an available amount of computing memory associated with the entity. Alternatively, a smart contract score may represent an amount by which a stored value is to be changed, such as a credit amount transferred from a first entity to a second entity.

In some embodiments, a program state may keep track of a plurality of scores. For example, a vertex of a directed graph of a symbolic AI model may include or otherwise be associated with a first score representing an amount of possessed by a first entity, a second score representing an amount owed to or owed by the first entity, a third score representing an amount possessed by a second entity, and a fourth score representing an amount owed to or owed by the second entity. In some embodiments, a conditional statement may be parsed to determine outcome scores. For example, an outcome subroutine associated with a vertex of a graph of the symbolic AI model may include instructions that a first entity is obligated provide 30 cryptocurrency units to a second entity and that the second entity is obligated to send a message to the first entity with an electronic receipt, and the system may determine that an associated score of the first vertex is equal to 30 and also determine that no score value is needed for the sending of the message. As further discussed below, by keeping track of scores and score changes, entire populations of smart contracts may be analyzed with greater accuracy without requiring a deep understanding of the specific terms or entity behaviors of any specific contract.

In some embodiments, a symbolic AI model may include statuses corresponding to each of a set of vertices representing the norms of a smart contract. The symbolic AI model statuses may use the same categories as the norm statuses of a smart contract. Furthermore, the symbolic AI model status for a vertex may be identical to or be otherwise based on the status for the corresponding norm vertex being simulated. For example, if a norm status for a first norm vertex of a smart contract is "triggered—satisfied," the symbolic AI model status for a first symbolic AI model vertex corresponding to the first norm vertex may also be "triggered—satisfied." Alternatively, the system may select a different categorical value for a symbolic AI model vertex status that is still based on the corresponding norm status. Similarly, the symbolic AI model may include vertex categories similar to or identical to the logical categories associated with of the set of norm vertices of a smart contract. Furthermore, the symbolic AI model vertex category may be identical to or be otherwise based on the logical for the corresponding norm vertex being simulated. For example, if a logical category for a first norm vertex of a smart contract is "Rights" the symbolic AI model category for a first symbolic AI model vertex ("vertex category") corresponding to the first norm vertex may also be "Rights." Alternatively, the system may select a different categorical value for a vertex category that is still based on the corresponding logical category.

In some embodiments, the instantiated program may be a smart contract that may use or otherwise process events. Alternatively, or in addition, the program instance may be a modeling application and not an instance of the selected smart contract itself. For example, a symbolic AI system may be a modeling application that determines the values of a corresponding symbolic AI model based on the conditional statements of a smart contract without requiring that an event message be sent to an API of the modeling application. In some embodiments, the program instance of the symbolic AI system may change program state without performing one or more operations used by the smart contract that the program instance is based on. For example, the program instance of the symbolic AI system may change its program state data without deserializing serialized smart contract data, even if the smart contract that the program instance is based on includes operations to deserialize serialized smart contract data. In some embodiments, the program state data may be stored using a data model similar to that described in this disclosure for FIG. 2. Alternatively, or in addition, the program state data may be stored in various other ways. For example, instead of storing values in separate arrays, the program instance may store the norm conditions, norm outcome actions, and their relationships to each other as part of a same array.

In some embodiments, the process 300 includes performing one or more iterations of the operations indicated by blocks 320, 324, 328, 332, 336, and 340 for each of the respective smart contracts or other programs of the selected set of smart contracts or other programs, as indicated by block 320. Furthermore, in some embodiments, the process 300 may include performing the one or more iterations in parallel using multiple processor cores. For example, some embodiments may include performing multiple iterations of the operations of the blocks 320, 324, 328, 332, 336, or 340 for multiple iterations in parallel using a plurality of processor cores. By performing the multiple iterations of the operations in parallel, computation times may be significantly reduced.

In some embodiments, the system may perform one or more iterations of operations to modify the statuses of a first set of vertices and then update the program state data based on the modified statuses in order to acquire a plurality of outcomes. The program state data or a portion of the program state data may be in a same state at the start each iteration, where two states of program state data are identical if both states have the same set of values. For example, if a first state of program state data is [1,2,3], and if a second state of program state data is [1,2,4], and if the program state data is reverted to [1,2,3], the reverted program state data may be described as being in the first state. In some embodiments, the system may execute the smart contract or smart contract simulation for a pre-determined number of iterations. Alternatively, or in addition, as further recited below, the smart contract or smart contract simulation may be repeatedly executed until a set of iteration stopping criteria are achieved. As further discussed below, the plurality of outcomes corresponding to the plurality of iterations may be used to provide one or more multi-iteration scores usable for decision-support systems and for determining multi-protocol scores.

In some embodiments, the system may modify one or more statuses associated with the vertices of the graph of the symbolic AI model based on a scenario and update the program state data based on the modified statuses, as indicated by block 328. In some embodiments, the scenario may be a set of inputs based on events. For example, a scenario may include simulated events or simulated event messages that may be testable by the conditions of a conditional statement. In response, a first vertex of the program instance may compare the simulated event to a condition and determine that a second vertex of the symbolic AI model of the should be activated. For example, an input may include an event "entity A transmitted data 0x104ABC to entity C," which may satisfy a condition and change a status associated with a first vertex associated with the conditional statement to "satisfied." As discussed below, the system may then update the symbolic AI model based on the status change by activating an adjacent vertex to the first vertex.

Alternatively, or in addition, an input may include a message to change a program state without including an event that satisfies the norm conditions associated with the norm. For example, the input may include direct instructions interpretable by a symbolic AI system to set a vertex status to indicate that the corresponding vertex is triggered and direct which of a set of outcome subroutines to execute. The system may then update the symbolic AI model by activating one or more adjacent vertices described by the subset of outcome subroutines to execute.

In some embodiments, the scenario may include a single input. Alternatively, the scenario may include a sequence of inputs. For example, the scenario may include a first event, second event, and third event in sequential order. In some embodiments, the set of events may be generated using a Monte Carlo simulator. Some embodiments may randomly determine subsequent states from an initial state based on one or more probability distributions associated with each state of a set of possible subsequent states with respect to a previous state, where the probability distributions may be based on scores and logical categories associated with the set of possible states. For example, the program state may be in a state where only two subsequent possible states are possible, where the first subsequent possible state includes triggering a rights norm and a second subsequent possible state includes triggering an obligations norm.

In some embodiments, one or more inputs of a scenario may be determined using a decision tree. In some embodiments, a decision tree may be used to provide a set of decision based on scores, logical categories, statuses, and other factors associated with the active vertices of a simulated smart contract state. For example, a symbolic AI system may determine that the two possible states for a smart contract may result from either exercising a first rights norm or exercising of a second rights norm. A decision tree may be used to compare the logical categories, the scores associated with each norm, and the other information related to the active norms to determine which rights norm an entity would be most likely to exercise. In some embodiments, the symbolic AI system may compare a first score associated with a possible state represented by a first tree node with a second score of a different possible state represented by a second tree node. In response to the first score being greater than the second score, the symbolic AI system may determine a simulated input that will result in the future state represented by the first tree node. Furthermore, in some embodiments, the decision tree may incorporate probability distributions or other decision-influencing factors to more accurately simulate real-world scenarios.

Alternatively, or in addition, some embodiments may include a Monte Carlo Tree Search (MCTS) method to generate a random sequence of events based on a set of possible events and a probability distribution by which the events may occur. The operations of the simulation may be made more efficient by selecting events that known to satisfy at least one condition of the set of conditional statements of the smart contract being simulated. In some embodiments, a symbolic AI system may determine a set of events for a smart contract simulation by determining a first simulated input based on a set of weighting values assigned to vertices of a graph of a symbolic AI model associated with norms of the smart contract. In some embodiments, the system may further determine a simulated input based on a count of the number of iterations of the simulation performed so far.

The system may then update the symbolic AI model based on the first simulated input, advancing the symbolic AI model to a second state. For example, after changing the status of a first vertex associated with an obligations norm from "unrealized" to "failed," the symbolic AI model may then activate a first adjacent vertex representing a rights norm and a second adjacent vertex representing an prohibitions norm, where both adjacent vertices are adjacent to the first vertex. The symbolic AI system may then determine a second simulated input, wherein the second simulated input may be selected based on weighting value corresponding to each of the first adjacent vertex and second adjacent vertex, where the weighting value may be a score of the smart contract. For example, the weighting value of the first adjacent vertex may be 2/4 and the weighting value of the second adjacent vertex may be 1/6. Some embodiments may then update the symbolic AI model when it is in the second state based on the second simulated input in order to advance the second model to a terminal state, where a terminal state is one that satisfies a terminal state criterion. Once in a terminal state, the symbolic AI system may update the weighting values associated with the symbolic AI model before performing another iteration of the simulation.

Various terminal state criteria may be used. For example, a terminal state criterion may be that there is no further state change possible. Alternatively, a terminal state criterion may be that the smart contract is cancelled. The system may then update each of the weighting values associated with each of the nodes after reaching a terminal state before proceeding to perform another iteration. In some embodiments, the symbolic AI system may set a status of a vertex to "failed" to simulate the outcomes of a first entity failing to transfer a score (e.g. failure to pay) a second entity.

In some embodiments, the determination of an input may be based on the type of conditional statement being triggered. As further discussed below, one or more of the conditional statements may be non-exclusively classified as one or more types of norms. Example of norm types include rights norms, obligations norms, or prohibition norms. As further discussed below, norm types may also include associations as being part of a pattern, such as a permission pattern. For example, a vertex may include or be otherwise associated with the label "consent or request." By determining activities based on logical categories associated with the conditional statements instead of specific events, predictive modeling may be performed using globalized behavior rules without interpreting each of the globalized behavior rules for each specific contract. For example, a sequence of event may be generated a based on a first probability distribution that approximates an obligation of a first entity as having a 95% chance of being fulfilled and a 5% chance of being denied and a second probability distribution that approximates that a second entity has a 10% chance of cancelling a smart contract before the first entity exercises a right to cure the failure to satisfy the obligation. Using these rules, population scores associated with the population of smart contracts between a first entity and a second entity that consist of obligations norms to pay, rights norms to cure, and rights norms to cancel may be determined without regards to the specific structure of individual smart contracts in the population of smart contracts.

The system may then update each of the smart contract instances associated with a changed norm status, as discussed further below. Furthermore, the system may then update the respective associative array of conditions corresponding to the set of smart contracts. In some embodiments, an associative array of conditions may include only a subset of norm conditions associated with a smart contract, where each the subset of norm conditions is associated with a triggerable vertex of the smart contract. In some embodiments, the system may first deduplicate the norm conditions before performing a lookup operation to increase performance efficiency. For example, after determining that an event has occurred, some embodiments may search through a deduplicated array of norm conditions. For each norm condition that the event would trigger, the system may then update the one or more smart contracts associated with the norm condition in the deduplicated array of norm conditions.

Some embodiments may obtain a sequence of inputs instead of a single input. In some embodiments, the system may use a neural network to generate the sequence of inputs. In some embodiments, the neural network may determine a state value s based on the program state data and provide a vector of probabilities associated with for each of a set of possible changes in the program state. The neural network may also determine a state value to estimate the expected value of the program state after system applies the scenario to the program. In some embodiments, the neural network may use a MCTS algorithm to traverse a tree representing possible future states of the smart contract from a root state. The system may determine a next possible state $s_{+1}$ for each state s by selecting a state with a low visit count, high predicted state value, and high probability of selection. The parameters (e.g. weights, biases, etc.) of the neural network making the state value determination may be represented by $\theta$. After each iteration ending in a terminal state, the system may adjust the values $\theta$ to increase the accuracy of the neural network's predicted state value in comparison to the actual state value assessed whenever a terminal state is reached. Furthermore, a symbolic AI model may have a total score value, and the system may update the total score value based on the state value.

In some embodiments, the process 300 includes determining an outcome score based on the updated program state data, as indicated by block 336. In some embodiments, as stated in this disclosure, a set of scores may be associated with one or more of the outcome states. For example, an outcome of a first norm may include a transfer of currency values from a first entity to a second entity. The symbolic AI system may record this score and combine it with other scores in the same iteration in order to determine a net score for that score type. For example, the symbolic AI system may record each currency change based on inputs and outcomes in order to determine a net currency change, where a score of the smart contract may be the net currency change. Alternatively, or in addition, the symbolic AI system may record scores across different iterations to determine a multi-iteration score, as described further below. Example outcome scores may include a net amount of currency exchanged, a net amount of computing resources consumed, a change in the total cryptocurrency balance for an entity, or the like.

The process 300 may execute a number of iterations of smart contract state change simulations to determine possible outcomes and outcome scores. In some embodiments, there may be one or more criteria to determine if an additional iteration is needed, as indicated by block 340. In some embodiments, the one or more criteria may include whether or not a pre-determined number of iterations of simulations have been executed. For example, some embodiments may determine that additional iterations are needed if the total number of executed iterations is less than an iteration threshold, where the iteration threshold may be greater than five iterations, greater than ten iterations, greater than 100 iterations, greater than 1000 iteration, greater than one million iterations, greater than one billion iterations, or the like. Alternatively, or in addition, the one or more criteria may include determining whether a specific outcome occurs. For example, the one or more criteria may include determining whether the outcome score is less than zero after a terminal state is reached. If the additional iterations are needed, operations of the process 300 may return to block 320. Otherwise, operations of the process 300 may proceed to block 344.

In some embodiments, the process 300 includes determining a multi-iteration score based on the outcome scores of executed iterations, as indicated by block 344. The multi-iteration score may be one of various types of scores and may include values such as a net change in score across multiple iterations, a probability distribution parameter, a measure of central tendency across multiple iterations, a measure of dispersion, or a measure of kurtosis. For example, the system may use a first outcome score from a first iteration, a second outcome score from a second iteration, or additional outcome scores from additional iterations to determine an average outcome score. The system may determine additional multi-iteration scores in the form of probability distribution parameters to determine a probability distribution. As used herein, a measure of kurtosis value may be correlated with a ratio of a first value and a second value, wherein the first value is based on a measure of central tendency, and wherein the second value is based on a measure of dispersion. For example, the measure of kurtosis may equal to $\mu^4/\sigma^4$, where $\mu$ may be a fourth central moment of a probability distribution and $\sigma$ may be a standard deviation of the probability distribution.

In some embodiments, the multi-iteration score may be used to provide one or more predictions using Bayesian inference methods. In some embodiments, the multi-iteration score may be used to generate a probability distribution for the probability that a particular event or event type occurred based on a score, such as a change in currency value or an amount of computing resources consumed. For example, the system may calculate a mean average cryptocurrency amount determined across multiple iterations as a first multi-iteration score and a standard deviation of the cryptocurrency amount as the second multi-iteration score while tracking the number of payment delays associated with the respective cryptocurrency amounts. The system may then use the first and second multi-iteration scores to generate a gaussian distribution, where the system may use the gaussian distribution to perform Bayesian inferences in order to determine a probability that a payment delay occurred after obtaining the value of a new cryptocurrency amount.

In some embodiments, the multi-iteration score may be a weight, bias, or other parameter of a neural network. For example, some embodiments may use a set of multi-iteration scores as weights of a neural network, where the training inputs of the neural network may be outcome scores and the training outputs of the neural network may be events, indicators representing activated outcome subroutines, or activated patterns. Once trained, the neural network may determine the probability of events, triggered conditional statements, or triggered patterns based on observed scores. In some embodiments, the parameters of the neural network may be transferred to other neural networks for further training. For example, a first neural network may be trained using the outcome scores as inputs and sets of events as outputs, and the weights and biases of the training may be transmitted to a second neural network for further training. The second neural network may then be used to indicate whether a particular event had a sufficiently high possibility of occurring based on a score or score change. In addition, the multi-iteration score may include outputs of a convolutional neural network, which may be used to determine behavior patterns across multiple smart contracts.

In some embodiments, the symbolic AI system may use a fuzzy logic method to predict the occurrence of an event based on the outcomes of a smart contract. A fuzzy logic method may include fuzzifying inputs by using one or more membership functions to determine a set of scalar values for each of a set of inputs, where the set of scalar values indicate the degree of membership of the inputs of a set of labels for each of the inputs of a smart contract being simulated by a symbolic AI system. For example, the system may use a membership function to determine a percentage values between 0% and 100% for a set of labels such as "profitable," "risky," or the like. The percentage values may indicate, for each of the smart contracts, a degree of membership to each of the labels. The symbolic AI system may then determine an fuzzified outcome score based on the set of fuzzified data by first using a set of rules in combination with an inference engine to determines the degree of match associated with the fuzzy input and determine which of the set of rules to implement. As used herein, an inference engine may be a system that applies a set of pre-defined rules. For example, an inference engine may include a set of "if-then" expressions that provided responses to particular inputs. By using the inference engine in combination with the set of rules, the fuzzified outcome score may provide an indication of a broader label for the smart contract, such as "unconventional," "risk too high," or the like. In some embodiments, the symbolic AI system may defuzzify the fuzzified outcome score using various methods such as centroid of area method, bisector of area method, mean of maximum method, or the like. The defuzzifying process may result in a defuzzified outcome score that may also be used to determine a label.

In some embodiments, each of the scenarios may have an associated scenario weight, where the associated scenario may be a numeric value representing a normalized or nonnormalized probability of occurrence. For example, a smart contract may be processed based one of three possible scenarios, where the first scenario may have a weighting value equal to 0.5, the second scenario may have a weighting value equal to 0.35, and the third scenario may have a weighting value equal to 0.15. The system may use the associated scenario weights when determining a multi-iteration score. For example, if the first, second, and third scenarios results in allocating, respectively, 100, −10, or −100 computing resource units to a first entity, the system may determine that the expectation resource units allocated to the first entity is equal to 31.5 computing resource units and use the expectation resource units as the allocation value. While the above described using a scalar value as a weighting value, some embodiments may instead use a probability distribution as an associated scenario weight for each of the scenarios and determine the weighting value.

In some embodiments, the system may determine if data from an additional smart contract is to be processed, as indicated by block 350. As discussed in this disclosure, the process 300 may execute a number of simulations of different smart contracts to simulate possible outcomes and score changes. In some embodiments, each of the set of selected smart contracts may be simulated using a symbolic AI simulator. Furthermore, each of the set smart contracts may use the same set of weights/probability values to determine unique scenarios. For example, using the same set of weights corresponding to different combinations of available vertices, the system may determine a first scenario for a first symbolic AI model and a second scenario for a second symbolic AI model, where the first and second symbolic AI models have directed graphs that are different from each other. In some embodiments, the same weights may be used because the plurality of symbolic AI models may include vertices based on the same set of statuses and same set of logical categories. If the additional iterations are needed, operations of the process 300 may return to block 308. Otherwise, operations of the process 300 may proceed to block 354.

In some embodiments, the process 300 includes determining a multi-protocol score based on the outcome scores across multiple smart contracts, as indicated by block 354. A multi-protocol score may be any score that is determined based on a plurality of outcomes from simulating different smart contracts, where the plurality of outcomes may include either or both multi-iteration scores or scores determined after a single iteration. In some embodiments, the multi-protocol score may be determined by determining a population of scores associated with a given entity. For example, a population of scores may be a population of expected income across a population of 500 instantiated smart contracts. The multi-protocol score may be a total income value, average income value, kurtosis income value, or the like.

In some embodiments, one or more methods to determine a multi-iteration score may be used to determine a multi-protocol score. For example, use of fuzzy logic, Bayesian inference, or neural networks may be used to predict multi-protocol scores. For example, some embodiments may use a first set of multi-iteration scores from a plurality of smart contract simulations as inputs and a second set of multi-iteration scores from the same plurality of smart contract simulations as outputs when training a neural network, where a set of multi-protocol score may be one or more the parameters of the trained neural network. For example, some embodiments may include a neural network trained to predict the probability that a specific type of smart contract was used based on multi-iteration scores such as an average payment duration and an average payment amount.

In some embodiments, multiple multi-protocol scores may be used to determine risk between a first entity and a second entity. For example, operations of the process 300 may be performed to determine a list of smart contracts shared by a first entity and a second entity and predict possible risks to the first entity in scenarios resulting from the incapability of the second entity to fulfill one or more norms in the list of smart contracts. In some embodiments, the risk posed to a first entity by a second entity may include considerations for intermediate relationships. For example, a first entity may be owed multiple amounts from a plurality of entities other than a second entity, and a second entity may owe multiple amounts to the plurality of entities. In some embodiments, a risk associated with the total amount of a score value to be collected by the first entity from the plurality of entities may be assessed based on the risk of the second entity failing to fulfill one or more obligations to transfer score values to one or more of the plurality of entities. While the relationship between the first entity and the second entity may be difficult to determine using conventional smart contract systems if no explicit privity relations are listed in the smart contracts, the symbolic AI models described in this disclosure allow these relationships to be determined by searching through entity lists or crawling through one or more privity graphs.

FIGS. 4-9 below show a set of directed graphs that represent examples of program state of a smart contract or a simulation of a smart contract. Each vertex of the directed graph may represent conditional statements that encode or are otherwise associated with norm conditions and outcome subroutines that may be executed when a norm condition is satisfied. Each directed graph edge of the directed graph may represent a relationship between different conditional statements. For example, the tail vertex of a directed graph edge may represent a norm vertex that, if triggered, will activate the respective head vertex of the directed graph edge. As used in this disclosure, the direction of a directed graph edge points from the tail vertex of the directed graph edge to the head vertex of the directed graph edge. Furthermore, the direction of the of the directed graph edge may indicate that the respective head vertex to which the directed graph edge points is made triggerable based on a triggering of the respective tail vertex. In some embodiments, a norm vertex may be triggered if the trigger direction is the same as the directed graph edge direction for each directed graph edge. In some embodiments, the direction of a directed graph edge associated with norm condition may be used to categorize a norm or norm vertex.

Figure 4:
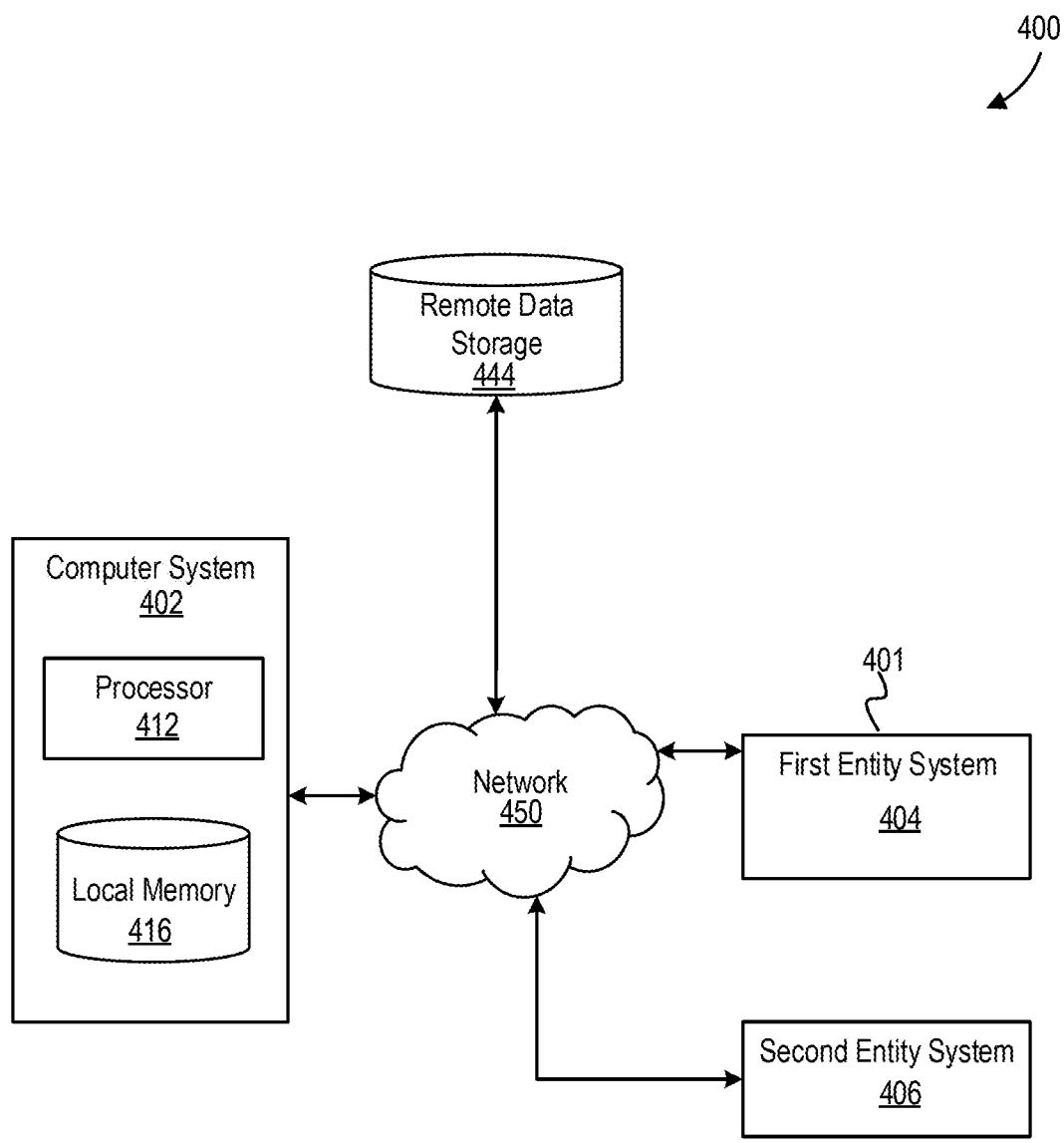
FIG. 4 show a computer system for operating one or more symbolic AI models, in accordance with some embodiments of the present techniques.

FIG. 4 show a computer system for operating one or more symbolic AI models, in accordance with some embodiments of the present techniques. As shown in FIG. 4, a system 400 may include computer system 402, first entity system 404, second entity system 406 or other components. The computer system 402 may include a processor 412 and a local memory 416, or other components. Each of the first entity system 404 or second entity system 406 may include any type of mobile computing device, fixed computing device, or other electronic device. In some embodiments, the first entity system 404 may perform transactions with the second entity system 406 by sending messages via the network 450 to the computer system 402. In some embodiments, the computer system 402 may execute one or more applications using one or more symbolic AI models with a processor 412. In addition, the computer system 402 may be used to perform one or more of the operations described in this disclosure for the process 100 or the process 300. Parameters, variables, and other values used by a symbolic AI model or provided by the symbolic AI model may be retrieved or stored in the local memory 416. In some embodiments, parameters, variables, or other values used or provided by the computer system 402, entity systems 404-406, or other systems may be sent to or retrieved from the remote data storage 444 via the network 450.

Figure 5:
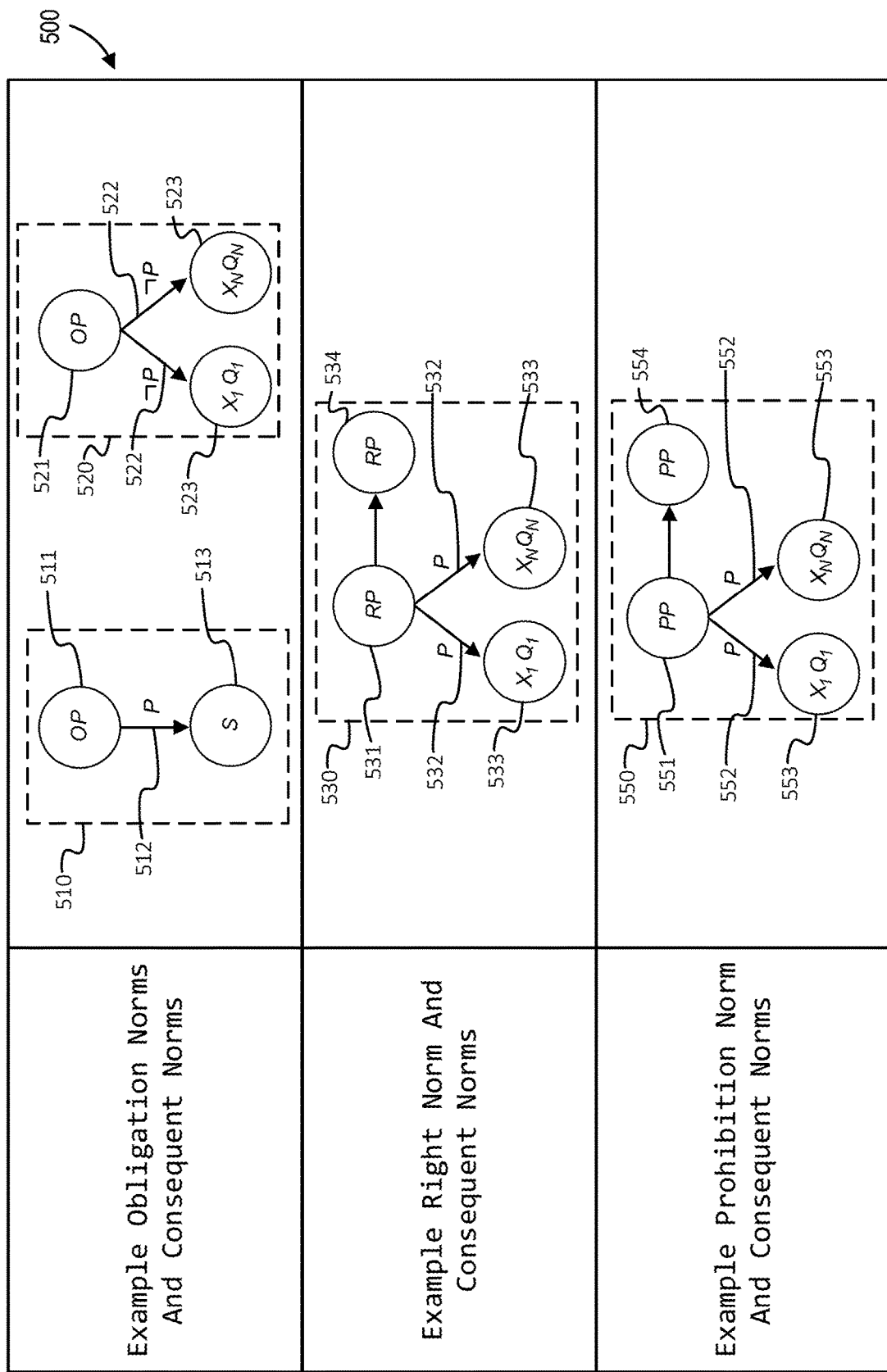
FIG. 5 includes a set of directed graphs representing triggered norms and their consequent norms, in accordance with some embodiments of the present techniques.

FIG. 5 includes a set of directed graphs representing triggered norms and their consequent norms, in accordance with some embodiments of the present techniques. The table 500 shows various triggered vertices and their respective consequent vertices in the form of directed graphs. In some embodiments, the system may include categories for norms of a smart contract based on a deontic logic model, where the categories may include obligation norms, rights norms, or prohibition norms. In addition to various contract-specific ramifications of these categories, norms within each category may share a common set of traits with respect to their transiency and possible outcomes. As shown in table 500, the relationship between a triggered norm and its consequent norms may be represented as a directed graph, where each of the norms may be represented by a vertex of the directed graph and where each triggering event may be used to as a label associated with a graph edge.

Box 510 includes a directed graph representing a smart contract state (or simulation of the smart contract state) after an event satisfying a norm condition of the obligation norm represented by the norm vertex 511. As shown in box 510, after a determination that the norm condition P associated with the norm vertex 511 is satisfied by an event (indicated by the directed graph edge 512), the system may generate an adjacent vertex 513 indicating that the norm vertex 511 is satisfied, where a norm status of the adjacent vertex 513 may be set as "terminal" to indicate that the adjacent vertex is terminal. In some embodiments, a determination that the state of the smart contract or simulation thereof is terminal may be made if a vertex of the smart contract or simulation thereof indicated to be terminal. In some embodiments, instead of generating the adjacent vertex 513, the system may update a norm status associated with the norm vertex 511 to indicate that the norm vertex 511 is satisfied. For example, the system may update a norm vertex associated with the obligation norm by setting a norm status associated with the norm vertex to "satisfied," "terminal," or some other indicator that the obligation norm has been satisfied by an event. In some embodiments, updating a norm vertex associated with the obligation norm may be represented by the statement 6, where $$\xrightarrow{P}$$

represents a result of the norm condition associated with the obligation norm "OP" being satisfied, and S represents the generation of a norm vertex indicating that the conditions of the obligation norm have been satisfied:

$$\text{In } OP \xrightarrow{P} S \tag{6}$$

As shown in box 520, an norm condition P may end up not satisfying a norm condition associated with the norm vertex 521 after satisfying a condition expiration threshold, where the norm vertex 521 is associated with an obligation norm. In response, the system may update the norm vertex 521 by setting a norm status associated with the norm vertex 521 to "failed" or some other indicator that the norm condition associated with the norm vertex 521 has been not satisfied. For example, an event may indicate that a condition expiration threshold has been satisfied without an obligation norm condition being satisfied. In response, the system may generate or otherwise set as triggerable the set of consequent norms associated with adjacent vertices 523, where the relationship between a failure to satisfy a norm condition P of the norm vertex 521 and the adjacent vertices 523 is indicated by the directed graph edges 522. In some embodiments, the generation of the adjacent vertices may be represented by the statement 7, where $$\xrightarrow{\neg P}$$

indicates that the instructions to the right of the symbol $$\xrightarrow{\neg P}$$

are to be performed if a norm condition "OP" is not satisfied, and the instructions represented by the symbolic combination $\Lambda_i X_i Q_i$ represents the generation or activation of the consequent norms that result from the failure of OP:

$$OP \xrightarrow{\neg P} \Lambda_i X_i Q_i \tag{7}$$

In some embodiments, in response to an event satisfying a norm condition of a rights norm, the system may update a norm vertex associated with the rights norm by setting a norm status associated with the norm vertex to "exercised" or some other indicator that the rights norm has been triggered based on an event. For example, as shown in box 530, in response to an event satisfying a norm condition associated a rights norm represented by the norm vertex 531, the system may update a norm vertex associated with the norm vertex 531 by setting a norm status associated with the norm vertex 531 to "exercised" or some other indicator that the rights norm has been exercised. In response, the system may generate or otherwise set as triggerable the set of consequent norms associated with adjacent vertices 533, where the relationship between satisfying a norm condition P associated with the norm vertex 531 and the set of consequent norms associated with adjacent vertices 533 is indicated by the directed graph edges 532. Furthermore, in some embodiments, a rights norm may be contrasted with an obligation norm by allowing a rights norm to remain triggerable after triggering. This may be implemented by further generating or otherwise setting as triggerable the rights norm associated with the rights norm vertex 534. In some embodiments, a rights norm may expire after use. For example, some embodiments may not generate the rights norm vertex 534 after triggering the norm vertex 531. In some embodiments, the operation described above may be represented by statement 8 below, where the result of triggering a rights norm $RP_1$ by satisfying the norm condition P may result in a conjunction of newly-triggerable consequent norms $\Lambda_i X_i Q_i$ and a rights norm $RP_2$ that is identical to the rights norm $RP_1$, where $\Lambda$ represents a mathematical conjunctive operation:

$$RP_1 \xrightarrow{P} \Lambda_i X_i Q_i \wedge RP_2 \tag{8}$$

In some embodiments, in response to an event satisfying the norm condition of a "prohibition" norm, the system may update a norm vertex associated with the "prohibition" norm by setting a norm status associated with the norm vertex to "violated" or some other indicator that the "prohibitions"' norm has been triggered based on an event. For example, as shown in box 550, an event may satisfy a norm condition P associated with the prohibition norm represented by a norm vertex 551. In response, the system may update the norm vertex 551 by setting a norm status associated with the norm vertex 551 to "violated" or some other indicator that the associated prohibitions norm condition has been satisfied. In response, the system may generate or otherwise set as triggerable the set of consequent norms associated with adjacent vertices 553, where the relationship between satisfying a norm condition P associated with the norm vertex 551 and the set of consequent norms associated with adjacent vertices 553 is indicated by the directed graph edges 552. Furthermore, in some embodiments, a prohibitions norm may be contrasted with an obligation norm by allowing a prohibitions norm to survive triggering. In addition, in some embodiments, triggering a prohibitions norm may result in the system decreasing a value representing the state of the smart contract. This may be implemented by further generating or otherwise setting as triggerable the prohibitions norm associated with the prohibitions norm vertex 554 after triggering the norm vertex 551. In some embodiments, the operation described above may be represented by statement 9 below, where the result of triggering a prohibition norm $PP_1$ by satisfying the norm condition P may result in a conjunction of newly-triggerable consequent norms $\wedge_i X_i Q_i$ and a prohibition norm $PP_2$ that is identical to the prohibition norm $PP_1$, where $\wedge$ represents a mathematical conjunctive operation:

$$PP_1 \xrightarrow{P} \wedge_i X_i Q_i \wedge PP_2 \qquad (9)$$

Figure 6:
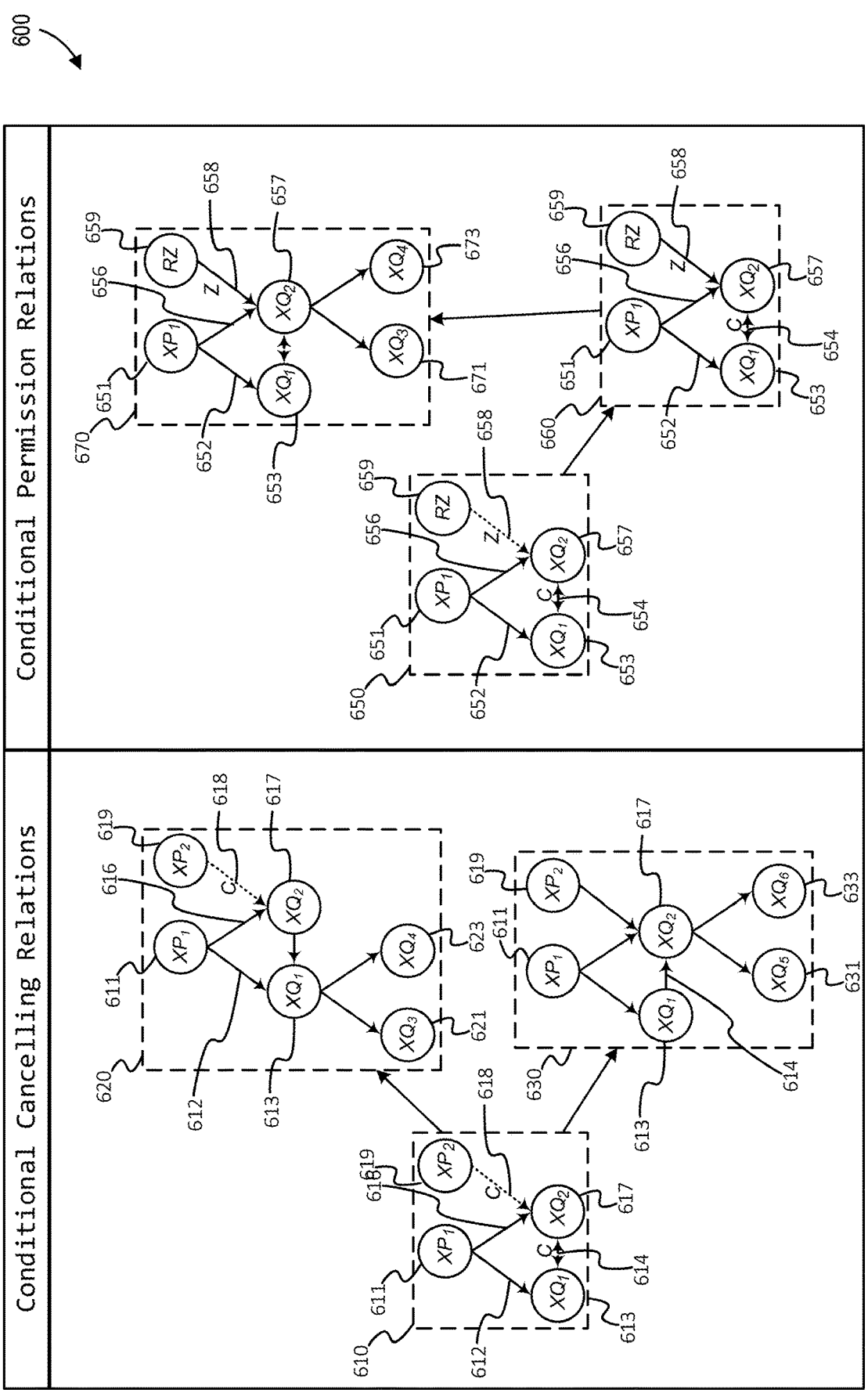
FIG. 6 includes a set of directed graphs representing possible cancelling relationships and possible permissive relationships between norms, in accordance with some embodiments of the present techniques.

FIG. 6 includes a set of directed graphs representing possible cancelling relationships and possible permissive relationships between norms, in accordance with some embodiments of the present techniques. The table 600 includes a left column that includes a directed graph 610 representing an initial state and a directed graph 620 that represents a first possible outcome state of the initial state and a directed graph 630 that represents a second possible outcome state of the initial state. In some embodiments, a norm condition may be a cancellation condition, where satisfying a cancellation condition results in the cancellation of one or more norms. Cancelling a norm may include deactivating a norm, deleting the norm, deleting graph edges to the norm, or otherwise or otherwise setting the norm as not triggerable. For example, an obligations norm may include a cancellation outcome subroutine, where triggering the obligations norm may result in the cancellation of one or more norms adjacent to the obligations norm. In some embodiments, the effect of satisfying a cancellation norm may be represented by statement 10 below, where XP may represent an obligations norm, $$\xrightarrow{P, \neg P}$$

may indicate that the event which triggers the norm XP occurs when the norm condition P is either satisfied or failed, $\wedge_i X_i Q_i$ represents the set of consequent norms that are set to be triggerable based on the event triggering XP, and $X_j U_j$ may represent the set of consequent norms that cancelled based on event triggering XP:

$$XP \xrightarrow{P, \neg P} \wedge_i X_i Q_i \wedge \wedge_j \neg X_j U_j \qquad (10)$$

As shown by statement 10 above, one or more norms may be cancelled. In some embodiments, a cancellation may be implemented as an inactive graph edge between the norm XP and the norms $X_j U_j$, where the graph edge representing the conditional relationship between the norm XP and the norms $X_j U_j$ are directed towards the norm XP. In some embodiments, the cancellation of a norm may be implemented by setting an indicator to indicate that a norm or condition associated with the cancelled norm is no longer triggerable.

The directed graph 610 may represent a state of a start contract and may include the first vertex 611, second vertex 613, third vertex 617, and fourth vertex 619, each of which are associated with a norm of a smart contract. The directed graph 610 also depicts a mutual cancellation relationship between the norm associated with the second vertex 613 and the third vertex 617 represented by the XQ1-XQ2 graph edge 614, where a mutual cancellation relationship of a pair of norm vertices may include a cancellation of one norm vertex of the pair upon triggering of the other norm vertex of the pair. The directed graph 610 also depicts a unidirectional cancellation relationship between the norm associated with the fourth vertex 619 and the third vertex 617 as represented by the XP2-XQ2 graph edge 618. In some embodiments, satisfying or otherwise triggering the norm associated with the third vertex 617 may instantiate the RZ-XQ2 graph edge 618 and cancel the fourth vertex 619. In some embodiments, each of vertices and graph edges shown in FIG. 5 may be represented using a protocol simulation program. For example, the first vertex 611 may be modeled in a simulation program and may be associated with a conditional statement of a smart contract.

In some embodiments, the state represented by the directed graph 610 may advance to the state represented by the directed graph 620. The state represented by the directed graph 620 may be achieved by triggering the norm associated with the second vertex 613, which may result in the cancellation of the norm associated with the third vertex 617. Furthermore, as illustrated by the directed graph 620, triggering the norm associated with the second vertex 613 may also result in the activation of fifth vertex 621 and sixth vertex 623. In addition, triggering the norm associated with the third vertex 617 may result in the cancellation of the norm associated with the fourth vertex 619. Furthermore, as illustrated by the directed graph 630, triggering the norm associated with the third vertex 617 may also result in the activation of a seventh vertex 631 and eighth vertex 633. Each of these triggering behaviors may be implemented directly by a smart contract.

In some embodiments, the triggering relationship described in this disclosure may be modeled using a symbolic AI system that may keep track of any scores associated with events that trigger the norms and the outcomes of triggering the norms. For example, a first probability value may be assigned to the state represented by the directed graph 620 and a second probability value may be assigned to the state represented by the directed graph 630 during a simulation of the smart contract. The symbolic AI system may use the first and second probability values to advance the state represented by either the directed graph 620 or the directed graph 630 over multiple iterations to compute a multi-iteration score using the methods described in this disclosure. For example, if the first probability value is 20% and the second probability value is 80%, and a first score represented by the directed graph 620 is equal to 100 cryptocurrency units and a second score represented by the directed graph 630 is equal to 1000 cryptocurrency units, a multi-iteration score may be equal to 820 cryptocurrency units.

The right column of table 600 includes a directed graph 650, which may represent an initial state of a smart contract (or simulation thereof). The right column of table 600 also includes a directed graph 660 that represents a first possible outcome state of the initial state and a directed graph 670 that represents a subsequent possible outcome state of the first possible outcome state. The initial state represented by the directed graph 650 may include a permissive condition of a permission norm, where satisfying a permissive condition may result in the activation of one or more norms. For example, after being activated, a rights norm RP may include a set of permissions $\{RV_k\}$ that are triggered after satisfying an norm condition associated with the rights norm RP, where the rights norm RP may also be described as a permission norm. Triggering the set of permissions $\{RV_k\}$ may either set the norm XP to be triggerable or otherwise prevent an outcome subroutine of the norm XP from being executed until the set of permissions $\{RV_k\}$ are triggered. This relationship may be represented by statement 11 below, where XP may represent an obligations norm, $RV_k$ represents the permissions that must be triggered before XP may be triggered, $$\overset{P,\neg P}{\to}$$

may indicate that the event which triggers the norm XP occurs when the norm condition P is either satisfied or failed, $\Lambda_i X_i Q_i$ represents the set of consequent norms that are set to be triggerable based on the event triggering XP after the permissions $RV_k$ are triggered, and $X_j U_j$ may represent the set of consequent norms that cancelled based on event triggering XP after the permissions $RV_k$ are triggered:

$$XP | RV_k \overset{P,\neg P}{\to} \Lambda_i X_i Q_i \Lambda \Lambda_i \neg X_j U_j \quad (11)$$

As shown by statement 11 above, XP may be set to be triggerable upon triggering of the permission $RV_k$. Triggering XP after the permissions $RV_k$ are triggered results in activation of the consequent norms $\Lambda_i X_i Q_i$ and cancels the norms $X_j U_j$. In some embodiments, the conditions needed to trigger permissions may be activated in conjunction with rights norms dependent on the permissions, and thus XP and $RV_k$ may be activated as a result of triggering the same triggered norm. In some embodiments, permission behavior may be performed by a smart contract or a simulation thereof by modifying a first status of a first vertex and a second status of a second vertex to indicate that the first and second vertices are triggered, where the first vertex may represent a first rights norm such as XP and the second vertex may represent a permission norm such as a norm having outcome permissions $RV_k$. The smart contract, or a simulation thereof, may trigger a third vertex that is adjacent to the first vertex and the second vertex such as a vertex in $\Lambda_i X_i Q_i$ in response to the first and second statuses now being triggered.

The directed graph 650 may include a first vertex 651, second vertex 653, third vertex 657, and fourth vertex 659. The directed graph 650 also depicts a mutual cancellation relationship between the norm associated with the second vertex 653 and the third vertex 657 represented by the XQ1-XQ2 graph edge 654. The directed graph 650 also depicts a permission relationship between the norm associated with the fourth vertex 659 and the third vertex 657 as represented by the RZ-XQ2 graph edge 658, where the fourth vertex 659 may include or otherwise be associated with permission conditions that must be satisfied in order to trigger the third vertex 657. In some embodiments, satisfying or otherwise triggering the norm associated with the fourth vertex 659 may instantiate the RZ-XQ2 graph edge 658 and allow the outcome subroutines of the third vertex 657 to be executed.

In some embodiments, the program state represented by the directed graph 650 may produce an outcome state represented by the directed graph 660. The outcome state represented by the directed graph 660 may be achieved by satisfying a norm condition associated with the fourth vertex 659. In some embodiments, after the XQ1-XQ2 graph edge 654 becomes instantiated, an event satisfying a norm condition associated with the third vertex 657 may result in the program state represented by the directed graph 670. The directed graph 670 may represent a program state where the norm associated with the third vertex 657 is triggered, resulting in the activation of additional norms associated with the fifth vertex 671 and sixth vertex 673.

In some embodiments, a symbolic AI system may be used to generate a scenario that includes a sequence of inputs having a first input and a second input. The first input may advance the state represented by the directed graph 650 to the state represented by the directed graph 660 and the second input may advance the state represented by the directed graph 660 to the state represented by the directed graph 670. The sequence of inputs may be determined using any of the methods described in this disclosure. For example, the sequence of inputs may be determined using a Monte Carlo method, a neural network, or the like.

Figure 7:
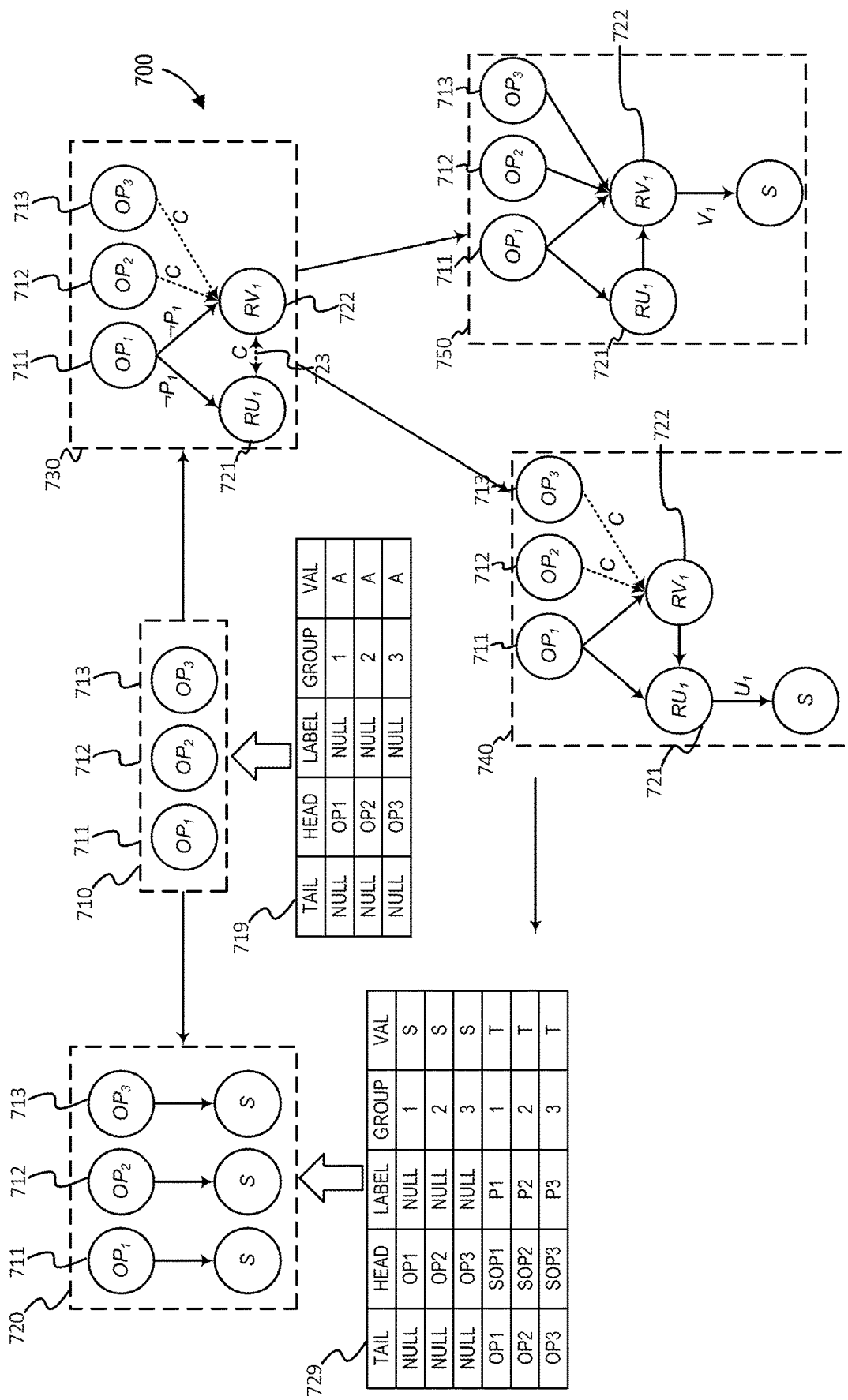
FIG. 7 includes a set of directed graphs representing a set of possible outcome states based on events corresponding to the satisfaction or failure of a set of obligations norms, in accordance with some embodiments of the present techniques.

FIG. 7 includes a set of directed graphs representing a set of possible outcome states based on events corresponding to the satisfaction or failure of a set of obligations norms, in accordance with some embodiments of the present techniques. The set of directed graphs 710 includes a set of three vertices 711-713, each representing an obligation norm to perform a set of related tasks. In some embodiments, the obligation norm may represent an obligation to transmit digital assets, deliver a data payload, or perform a computation. For example, the obligation norm represented by the first vertex 711 may be associated with an obligation for a first entity to transmit a down payment to a second entity, where a determination that the down payment occurred may be based on an event message sent by the second entity confirming that payment was delivered. The obligation norm represented by the second vertex 712 may be associated with an obligation for the second entity to deliver an asset to the first entity, where a determination that the asset was delivered may be based on an event message sent by the second entity confirming that the asset was delivered. The obligation norm represented by the third vertex 713 may be associated with an obligation for the first entity to pay a balance value to the second entity.

The set of directed graphs 720 may represent a first outcome state that may result from the program state represented by the set of directed graphs 710, where each of the obligation norms represented by the three vertices 711-713 are satisfied. In some embodiments, a smart contract simulation system such as a symbolic AI system may assign a probability value to the possibility the state represented by the set of directed graphs 710 is advanced to the outcome state represented by the set of directed graphs 720. For example, a symbolic AI system may assign a probability for the outcome state represented by the set of directed graphs 720 to be equal to 82% when starting from the state represented by the set of directed graphs 710. The symbolic AI system may then perform a set of simulations based on this probability value using a Monte Carlo simulator.

The set of directed graphs 730 may represent a second outcome state that may result from the program state represented by the set of directed graphs 710, where the first obligation is not satisfied and the time has exceeded a condition expiration threshold associated with the first vertex 711. As shown in the set of directed graphs 730, a failure to meet the first obligation represented by the first vertex 711 may result in a system generating or otherwise activating norms associated with a fourth vertex 721 and a fifth vertex 722. In some embodiments, the norm associated with the fourth vertex 721 may represent a first entity's right to cure the payment failure and the norm associated with the fifth vertex 722 may represent a second entity's right to terminate the smart contract. The bidirectional graph edge 723 indicates that triggering one of the pair of vertices 721-722 will cancel or otherwise render as inactive the other of the pair of vertices 721, which may indicate that curing a failed obligation and terminating the smart contract may be mutually exclusive outcomes. In some embodiments, a symbolic AI system (or other modeling system) may assign a probability value to the possibility the state represented by the set of directed graphs 710 is advanced to the outcome state represented by the set of directed graphs 720. For example, the symbolic AI system may assign a probability for the outcome state represented by the set of directed graphs 720 to be equal to 6% when performing a simulation based on the smart contract program state represented by the set of directed graphs 710.

In some embodiments, the state represented by the set of directed graphs 730 may be advanced to the state represented by a set of directed graphs 740. In some embodiments, the state represented by a set of directed graphs 740 may be an outcome state after the norm associated with the fourth vertex 721 is triggered. As shown in the set of directed graphs 740, triggering the norm associated with the fourth vertex 721 may result in cancelling the norm associated with fifth vertex 722. In some embodiments, a symbolic AI system may use probability value representing the probability of the state represented by the set of directed graphs 730 advancing to the state represented by a set of directed graphs 740. For example, a symbolic AI system may use 50% as the probability that the state represented by the set of directed graphs 730 advances to the state represented by a set of directed graphs 740. If the probability of the state represented by the set of directed graphs 720 advancing to the state represented by a set of directed graphs 730 is equal to 6%, this would mean that the probability of the state represented by the set of directed graphs 710 advancing to the state represented by the set of directed graphs 740 is equal to 3% by applying the multiplication rule for the probability of independent events.

In some embodiments, the state represented by the set of directed graphs 730 may be advanced to the state represented by a set of directed graphs 750. In some embodiments, the state represented by a set of directed graphs 750 may be an outcome state after the norm associated with the fifth vertex 722 is triggered. As shown in the set of directed graphs 750, triggering the norm associated with the fifth vertex 722 may result in cancelling the norm associated with second vertex 712, third vertex 713, and fourth vertex 721. In some embodiments, a symbolic AI system may assign a probability value to the possibility of a smart contract state being in the outcome state represented by the set of directed graphs 750 when starting from the program state represented by the set of directed graphs 730. In some embodiments, the probability values associated with each state may be updated after each iteration in a set of simulated iterations using one or more of the methods in this disclosure. For example, some embodiments may apply a MCTS method to explore the program states represented by the sets of directed graphs 710, 720, 730, and 740 across multiple iterations while keeping track of scores for each iteration in order to determine outcome scores for each iteration and multi-iteration scores.

Figure 8:
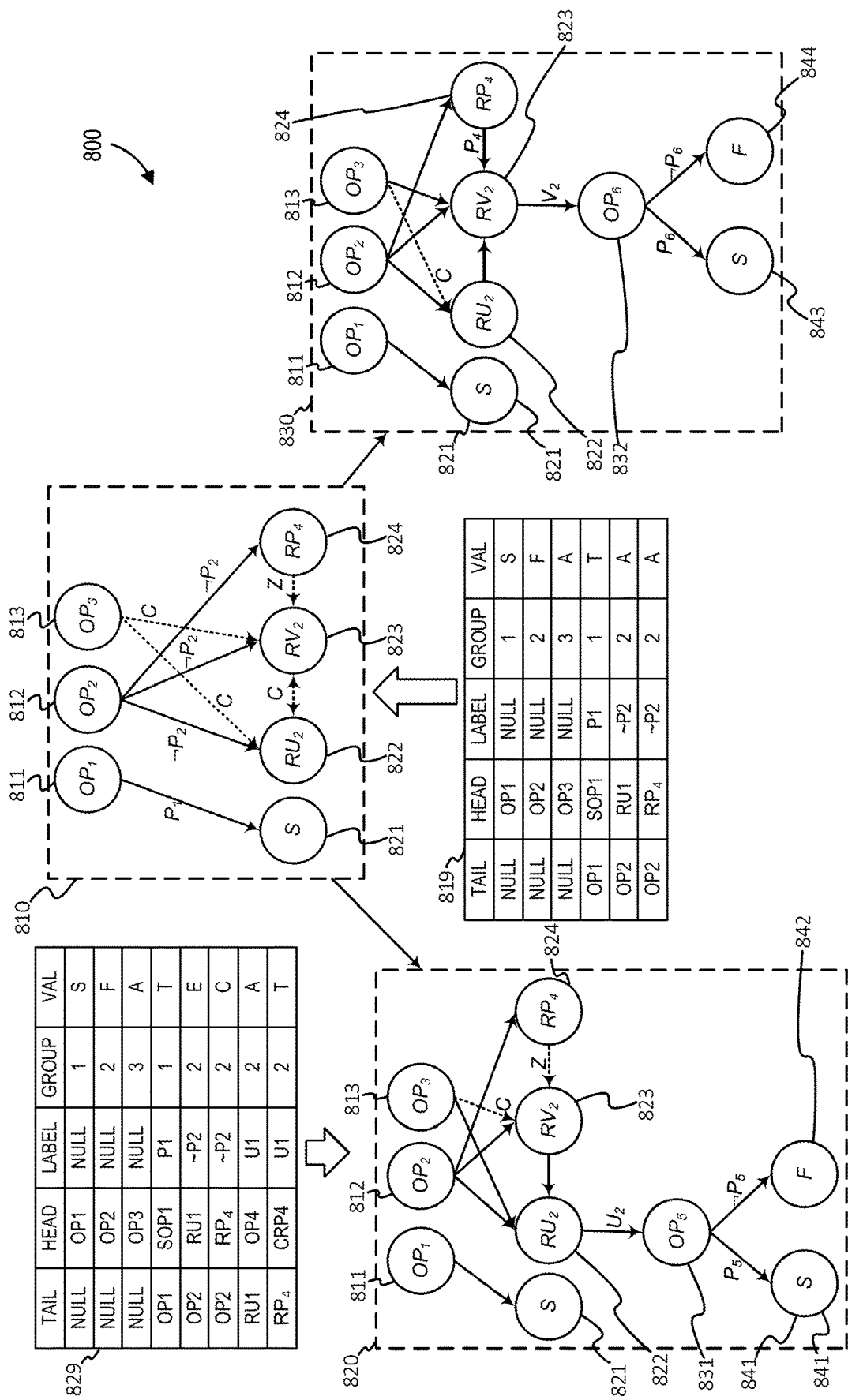
FIG. 8 includes a set of directed graphs representing a set of possible outcome states after a condition of a second obligations norm of a set of obligations norms is not satisfied, in accordance with some embodiments of the present techniques.

FIG. 8 includes a set of directed graphs representing a set of possible outcome states after a condition of a second obligations norm of a set of obligations norms is not satisfied, in accordance with some embodiments of the present techniques. In some embodiments, the set of directed graphs 810 may represent an initial state of a smart contract. Alternatively, the set of directed graphs 810 may represent an outcome state. For example, the program state represented by the set of directed graphs 810 may be an outcome state of the program state represented by the set of directed graphs 710, with an associated occurrence probability equal to 6%. The set of directed graphs 810 may represent a failure to satisfy a norm condition associated with the second vertex 812. In some embodiments, the second vertex 812 may represent an obligation norm indicating an obligation for a second entity to deliver an asset, such as a schematic, to the first entity.

In some embodiments, the state represented by the set of directed graphs 810 may be advanced to the state represented by a set of directed graphs 820. In some embodiments, the state represented by a set of directed graphs 820 may be an outcome state after the norm associated with the fifth vertex 822 is triggered. As shown in the set of directed graphs 820, triggering the norm associated with the fifth vertex 822 may result in cancelling the norm associated with sixth vertex 823. In some embodiments, the fifth vertex 822 may represent a first entity's right to terminate the order and obtain a refund. This outcome may be represented by the eighth vertex 831, which may represent an obligation norm indicating that the second entity has an obligation to pay the first entity, and that this obligation may either be satisfied or failed, as indicated by vertices 841 and 842, respectively.

In some embodiments, the state represented by the set of directed graphs 810 may be advanced to the state represented by a set of directed graphs 830. In some embodiments, the state represented by a set of directed graphs 820 may be an outcome state after the norm associated with the sixth vertex 823 is triggered. As shown in the set of directed graphs 830, triggering the norm associated with the sixth vertex 823 may result in cancelling the norm associated with sixth vertex 823. In some embodiments, the sixth vertex 823 may represent a first entity's right to cure the failure to satisfy the norm represented by the second vertex 812. This outcome may be represented by the ninth vertex 832, which may represent an obligation norm indicating that the second entity has an obligation to deliver an asset to the first entity, and that this obligation may either be satisfied or failed, as indicated by vertices 843 and 844, respectively.

In some embodiments, a symbolic AI system may assign a probability value to the possibility of a smart contract state being in the outcome state represented by the set of directed graphs 820 or set of directed graphs 830 when starting from the program state represented by the set of directed graphs 810. For example, a symbolic AI system may determine that the probability that the outcome state represented by the set of directed graphs 820 is equal to 40%. Similarly, the symbolic AI system may determine that the probability that the outcome state represented by the set of directed graphs 830 is equal to 60%. In some embodiments, the symbolic AI system may use a Bayesian inference to determine if an obligation norm was failed was failed based on a probability distribution computed from the scores associated with program states such as those states represented by the sets of directed graphs 820 or 830. For example, the symbolic AI system may acquire a new score value and, based on the score value, predict whether an obligation represented by the second vertex 812 was failed.

Figure 9:
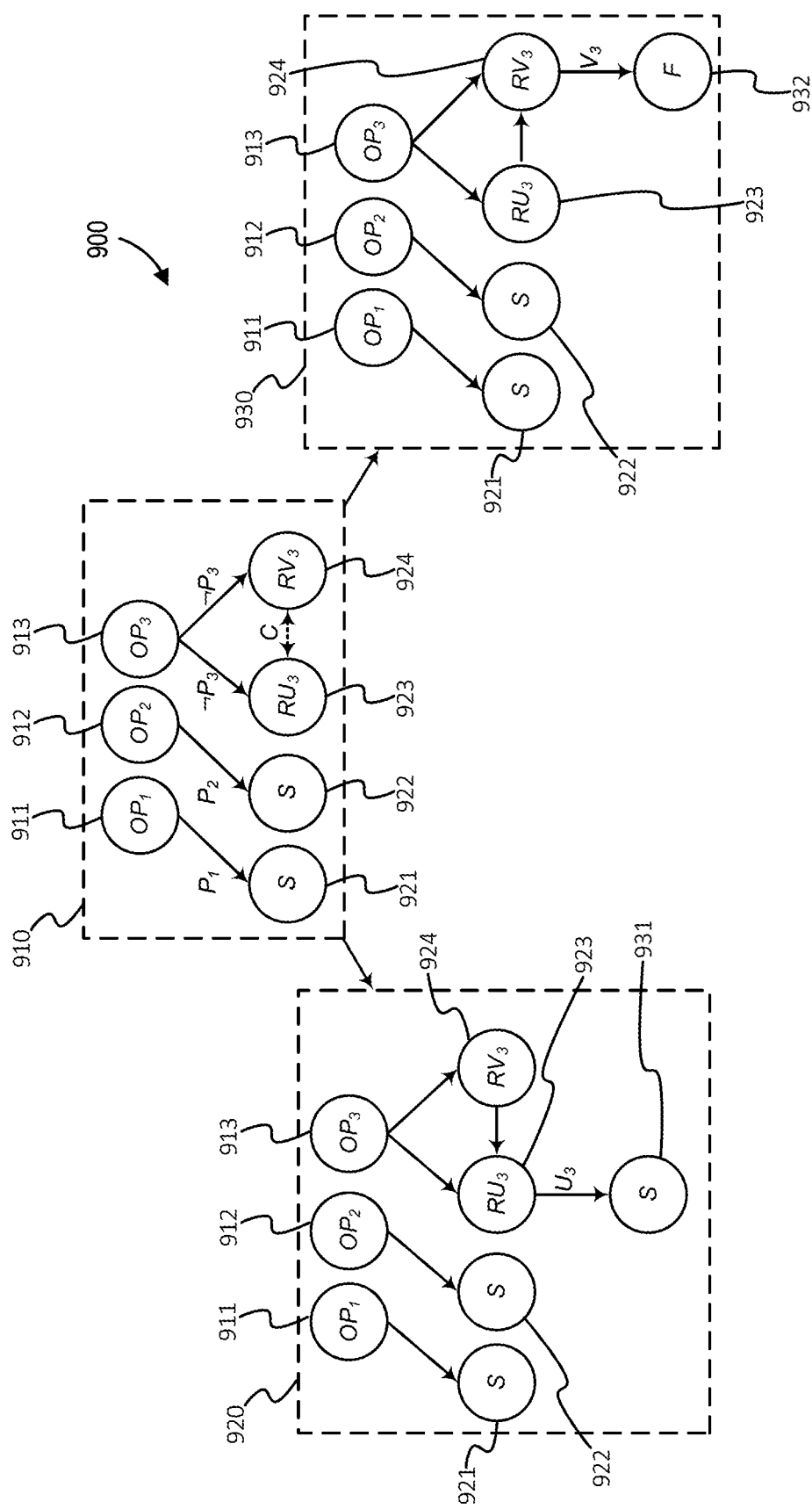
FIG. 9 includes a set of directed graphs representing a set of possible outcome states after a condition of a third obligations norm of a set of obligations norms is not satisfied, in accordance with some embodiments of the present techniques.

FIG. 9 includes a set of directed graphs representing a set of possible outcome states after a condition of a third obligations norm of a set of obligations norms is not satisfied, in accordance with some embodiments of the present techniques. In some embodiments, the set of directed graphs 910 may represent an initial state of a smart contract. Alternatively, the set of directed graphs 910 may represent an outcome state. For example, the program state represented by the set of directed graphs 910 may be an outcome state of the program state represented by the set of directed graphs 810, with an associated occurrence probability equal to 6%. The set of directed graphs 910 may represent a failure to satisfy a norm condition associated with the third vertex 913. In some embodiments, the third vertex 913 may represent an obligation norm indicating an obligation for a first entity to pay a balance value to the second entity. Triggering the norm associated with third vertex 913 by failing to satisfy an associated obligation condition may result in activating norms associated with a sixth vertex 923 and a seventh vertex 924. In some embodiments, the norm associated with the sixth vertex 923 may represent a first entity's right to cure the payment failure and the norm associated with the seventh vertex 924 may represent a second entity's right to declare a breach and flag the first entity for further action (e.g. initiate arbitration, incur a reputation score decrease, or the like).

In some embodiments, the state represented by the set of directed graphs 910 may be advanced to the state represented by a set of directed graphs 920. In some embodiments, the state represented by a set of directed graphs 920 may be an outcome state after the norm associated with the sixth vertex 923 is triggered. In some embodiments, the norm associated with the sixth vertex 923 may represent a first entity's right to cure the payment failure, and thus triggering the rights norm associated with the sixth vertex 923 may represent a first entity's right to cure the failure. As indicated by the satisfaction vertex 931, curing the payment failure may end all outstanding obligations of the smart contract.

In some embodiments, the state represented by the set of directed graphs 910 may be advanced to the state represented by a set of directed graphs 930. In some embodiments, the state represented by a set of directed graphs 930 may be an outcome state after the norm associated with the seventh vertex 924 is triggered. In some embodiments, the norm associated with the seventh vertex 924 may represent a second entity's right to declare a breach, and thus triggering the rights norm associated with the seventh vertex 924 may represent a second entity's declaration of contract breach. This may result in the activation of the failure vertex 932, which may include outcome subroutines that sends a message indicating that the smart contract is in breach to a third party or sends instructions to an API of another application.

Figure 10:
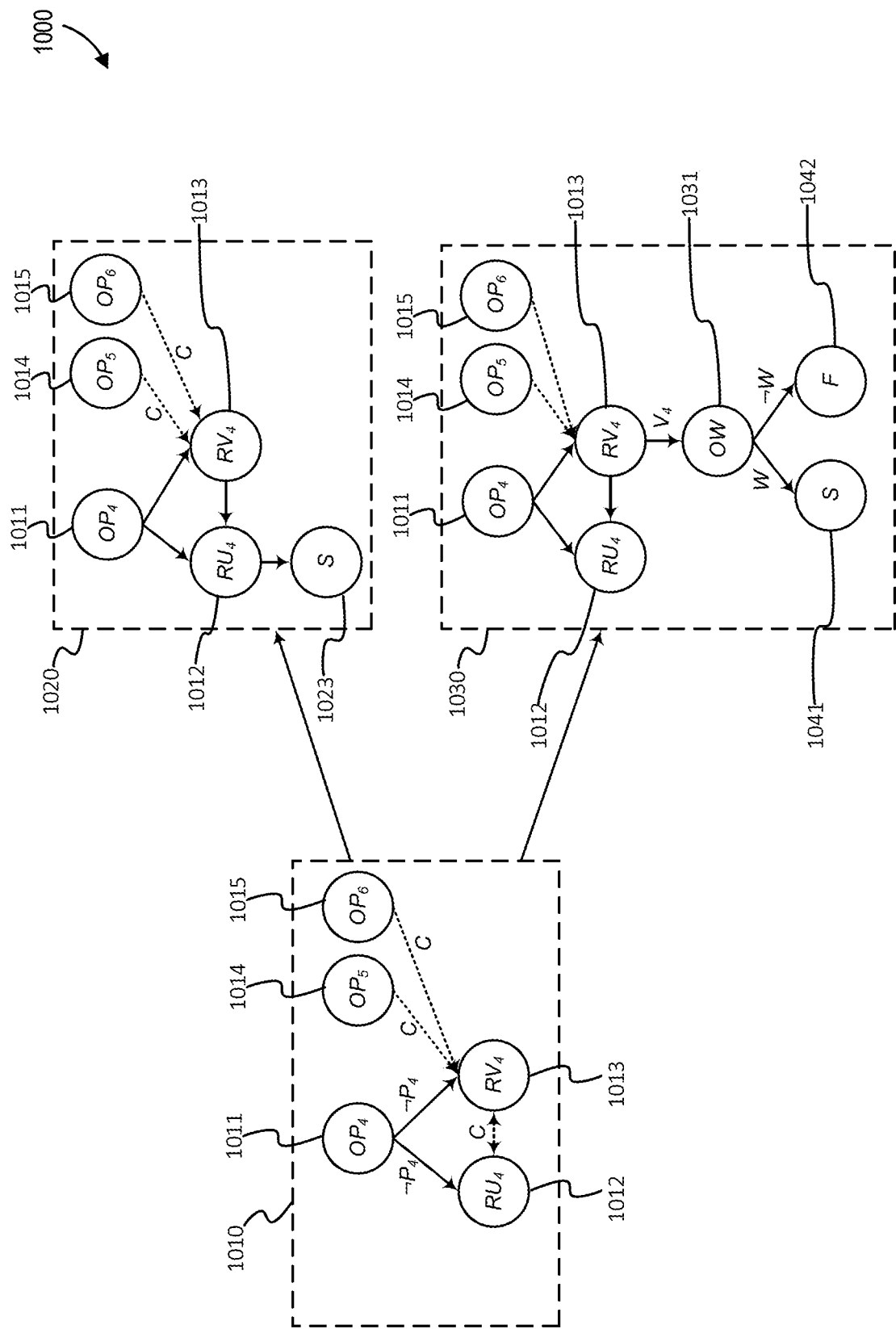
FIG. 10 includes a set of directed graphs representing a pair of possible outcome states after a condition of a fourth obligations norm of a set of obligations norms is not satisfied, in accordance with some embodiments of the present techniques.

FIG. 10 includes a set of directed graphs representing a pair of possible outcome states after a condition of a fourth obligations norm of a set of obligations norms is not satisfied, in accordance with some embodiments of the present techniques. FIG. 10 includes a directed graph 1010 representing a first program state of a smart contract or a symbolic AI simulation thereof. The program state represented by the directed graph 1010 may be changed to the program state represented by a directed graph 1020. Alternatively, the program state represented by the directed graph 1010 may be changed to the program state represented by a directed graph 1030. The directed graph 1010 includes a first vertex 1011 that may represent an obligations norm. In some embodiments, the first vertex 1011 may represent an obligation norm reflecting an obligation to pay by the time a condition expiration threshold is satisfied. If the obligation to pay is failed, the obligation norm associated with the first vertex 1011 may be triggered and the rights norms associated with the second vertex 1012 and the third vertex 1013 may be activated. The second vertex 1012 may represent a rights norm to cure the failure to satisfy the obligations norm represented by the first vertex 1011, and the third vertex 1013 may represent a rights norm to accelerate the payments the smart contract. The directed graph 1010 also includes a pair of vertices 1014-1015 representing future obligations to pay, where exercising the rights norm represented by the third vertex 1013 may cancel the future obligations to pay.

In some embodiments, the state represented by the directed graph 1010 may be advanced to the state represented by the directed graph 1020. In some embodiments, the state represented by the directed graph 1020 may be an outcome state after the norm associated with the second vertex 1012 is triggered. In some embodiments, the norm associated with the second vertex 1012 may represent a right to cure the failure to satisfy the norm condition associated with the first vertex 1011. As indicated by the directed graph 1020, exercising the rights norm associated with the second vertex 1012 may satisfy the norm and activate the vertex 1023, which may indicate that the rights norm associated with the second vertex 1012 has been satisfied.

In some embodiments, the state represented by the directed graph 1010 may be advanced to the state represented by the directed graph 1030. In some embodiments, the state represented by the directed graph 1030 may be an outcome state after the norm associated with the third vertex 1013 is triggered. In some embodiments, the rights norm associated with the third vertex 1013 may represent a right to accelerate payment. Triggering the rights norm associated with the third vertex 1013 may cancel the rights norm associated with the second vertex 1012. In addition, triggering the rights norm associated with the third vertex 1013 may also cancel the obligation norms associated with the vertices 1014-1015. Triggering the rights norm associated with the third vertex 1013 may cause the system to activate a new obligation norm associated with the fourth vertex 1031. In some embodiments, the new obligation norm may include norm conditions to determine whether a first entity transmits a payment amount to the second entity. For example, the new obligation norm may determine whether the first entity transmitted the entirety of a principal payment of a loan to the second entity. The obligation norm associated with the fourth vertex 1031 may be associated to a satisfaction norm represented by a fifth vertex 1041 or a failure norm represented by a sixth vertex 1042.

In some embodiments, advancement of the state represented by the directed graph 1010 to the state represented by the directed graph 1020 or the state represented by the directed graph 1030 may be simulated using a symbolic AI system. For example, the state represented by the directed graph 1010 may be copied into a symbolic AI model, where both the conditional statements associated with the nodes and of the directed graph the edges connecting the nodes of the directed graph may be copied. A symbolic AI system may then simulate state changes using the symbolic AI model to determine an expected value for a smart contract that has already reached the state represented by the directed graph 1010, where the expected value may be a multi-iteration score.

In some embodiments, each of the smart contracts represented by the directed graphs 610, 650, 710, and 1010 may be analyzed using a symbolic AI system to determine one or more multi-protocol scores. For example, each of the smart contracts represented by the directed graphs 610, 650, 710, and 1010 may be analyzed to produce multi-iteration scores such as average scores for each smart contract and a kurtosis value of expected scores. In some embodiments, the analysis may use the same rules to govern the behavior entities in the smart contract by basing the rules on logic types and vertex statuses instead of the contexts of specific agreements. For example, each smart contract simulation may be simulated with a set of rules that include a rule that the probability that a rights norm to cure is triggered instead of a rights norm to accelerate being triggered is equal to 90%. The multi-iteration scores may then be further analyzed to determine a multi-protocol score. For example, based on a multi-iteration score representing a risk score associated with each of the smart contracts, the total exposed risk of a first entity with respect to a second entity may be determined, where the total exposed risk may be a multi-protocol score.

Figure 11:
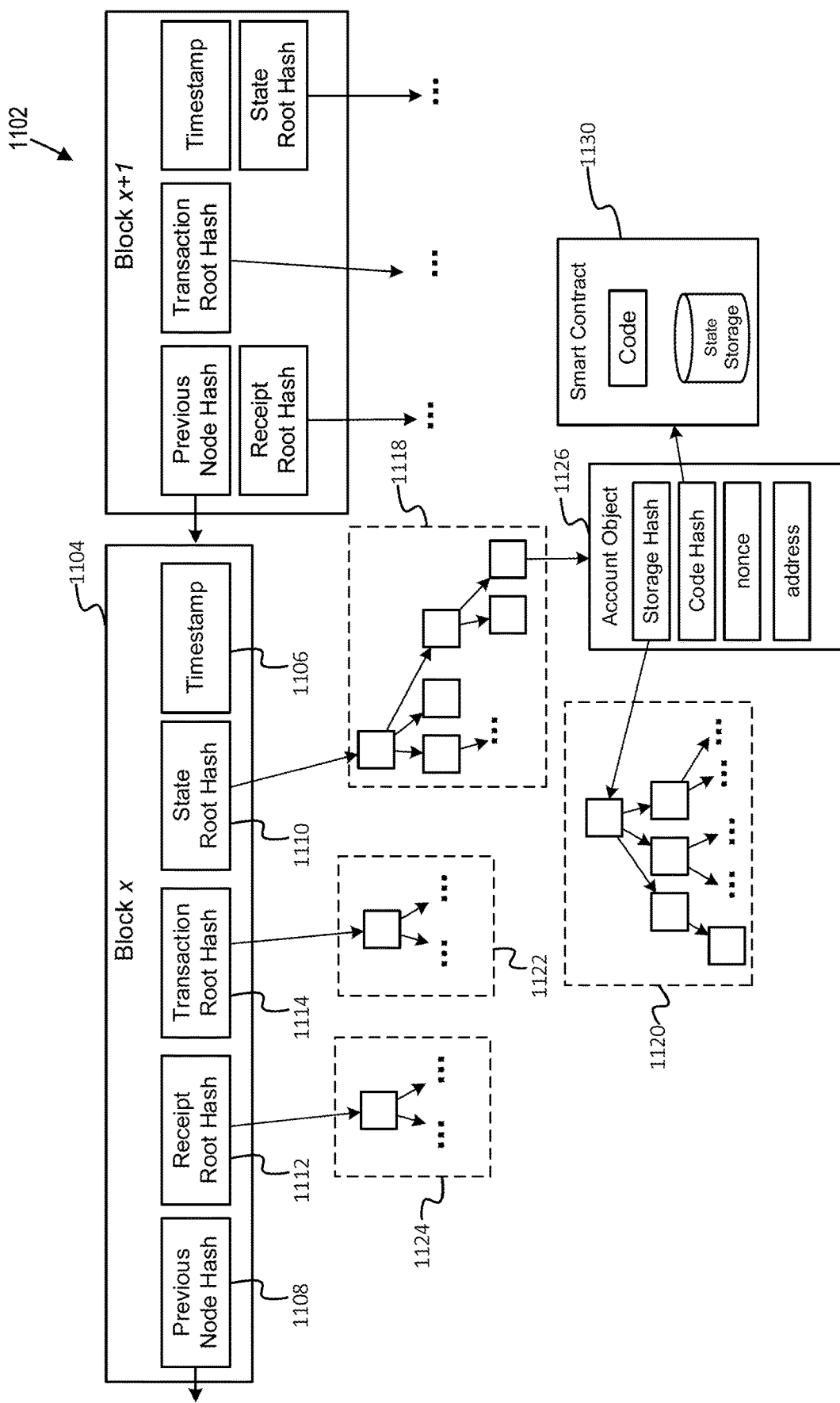
FIG. 11 is a block diagram illustrating an example of a tamper-evident data store that may be used to render program state tamper-evident and perform the operations in this disclosure, in accordance with some embodiments of the present techniques.

FIG. 11 is a block diagram illustrating an example of a tamper-evident data store that may be used to render program state tamper-evident and perform the operations in this disclosure, in accordance with some embodiments of the present techniques. In some embodiments, the tamper-evident data store may be a distributed ledger, such as a blockchain (or other distributed ledger) of one of the blockchain-based computing platforms described in this disclosure. FIG. 11 depict two blocks in a blockchain, and also depicts tries of cryptographic hash pointers having root hashes stored in the two blocks. The illustrated arrows may represent pointers (e.g., cryptographic hash). For example, the arrow 1103 may represent a pointer from a later block to block 1104 that joints the two blocks together. In some embodiments, blocks may be consecutive. Alternatively, the data from the use of a smart contract may skip several blocks between uses of the smart contract. As shown in FIG. 11, a tamper-evident data store 1102 may include a linked list of blocks that includes the block 1104 and other blocks, where the linked list of blocks may be connected by cryptographic hash pointers.

In some embodiments, a directed acyclic graph of cryptographic hash pointers may be used to represent the tamper-evident data store 1102. Some or all of the nodes of the directed acyclic graph may be used to form a skip list or linked list, such as the node corresponding to or otherwise representing as block 1104. In some embodiments, each block represented by a node of this list may include multiple values as content. For example, each respective block may include a timestamp of creation 1106, a cryptographic hash of content of the previous node pointed to by an edge connecting those nodes 1108, a state root value 1110 for a trie of cryptographic hash values that may be referred to as a state trie 1118, a cryptographic hash 1112 that is a root value of a receipt trie 1124 of cryptographic hash values referred to as a receipt trie, and a cryptographic hash value 1114 that is a root value of a trie of cryptographic hash values referred to as a transaction trie 1122. In some embodiments, the block 1104 may be connected to a plurality of tries (e.g., three or more tries) via cryptographic hash pointers. For example, the block 1104 may be connected to Merkle roots (or other roots) of the plurality of tries of cryptographic hash values.

In some embodiments, the state trie 1118 may include multiple levels of cryptographic hash pointers that expand from a root to leaf nodes through 2 or more (e.g. 3, 11, 5, 6, etc.) hierarchical levels of branching. In some embodiments, an account address of a smart contract or instance of invocation thereof may correspond to a leaf nodes, where the smart contract may be an instance of the smart contract described in one or more operations of one or more processes described in this disclosure. In some embodiments, leaf nodes or paths to the leaf nodes of the state trie 1118 may include the fields in the account object 1126. The address may be a smart contract address or instance of invocation of the smart contract, the nonce value may be a count of the times that the smart contract was invoked, the code hash value may be or otherwise include a cryptographic hash of a bytecode representation of the smart contract 1130, the storage hash may be a root (e.g. Merkle root) of a trie of cryptographic hash pointers 1120. In some embodiments, the trie of cryptographic hash pointers 1120 may store key-value pairs encoding a transient program state of the smart contract that changes or is not needed between invocations of the smart contract. In some embodiments, the fields of the account object 1126 may include a predecessor pointer that points to a previous entry of an earlier state trie corresponding to a previous invocation of the smart contract and associated information or hashes.

Figure 12:
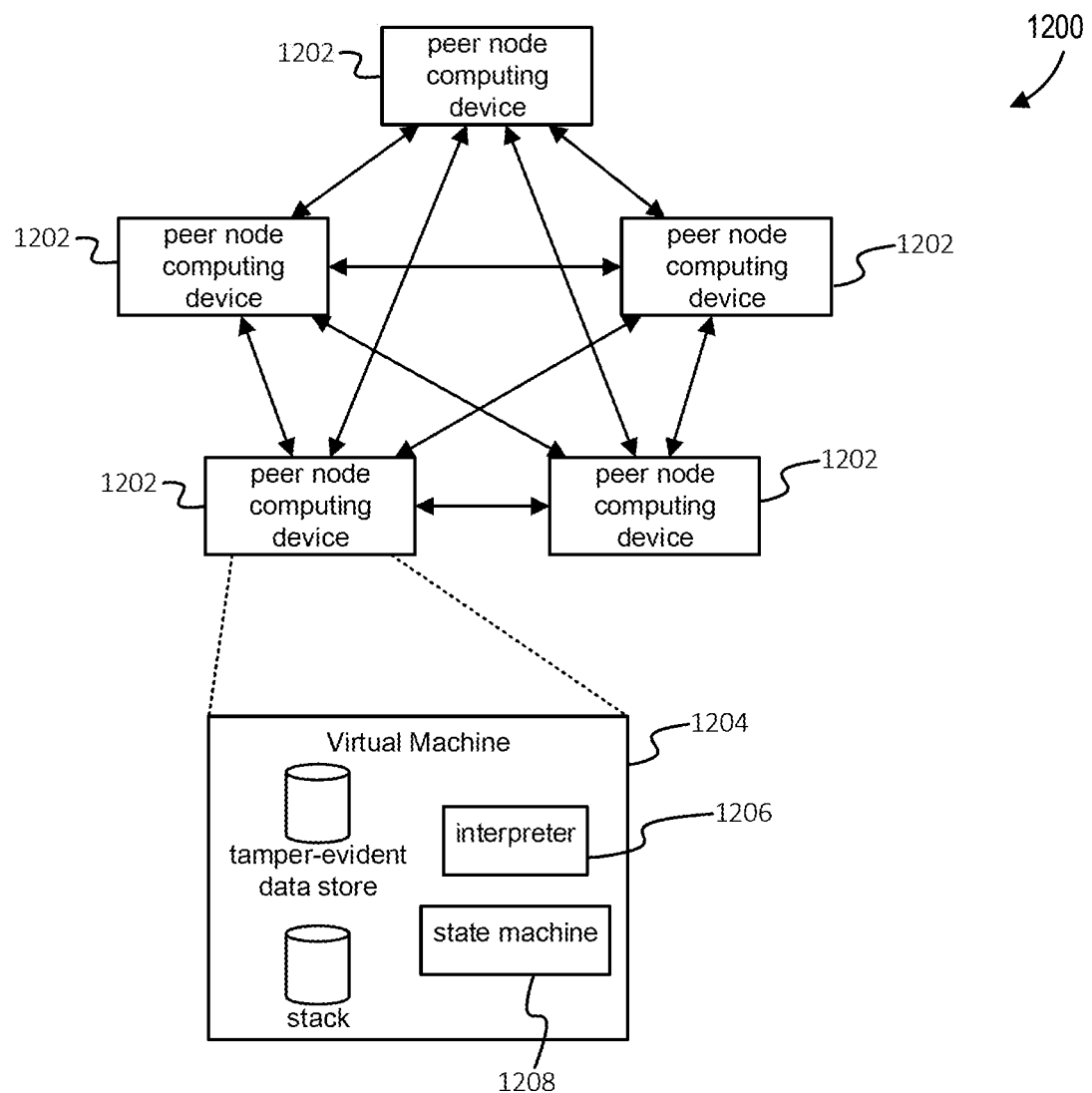
FIG. 12 depicts an example logical and physical architecture of an example of a decentralized computing platform in which a data store of or process of this disclosure may be implemented, in accordance with some embodiments of the present techniques.

FIG. 12 depicts an example logical and physical architecture of an example of a decentralized computing platform in which a data store of or process of this disclosure may be implemented, in accordance with some embodiments of the present techniques. In some embodiments, there may be no centralized authority in full control of a decentralized computing platform 1200. The decentralized computing platform 1200 may be executed by a plurality of different peer computing nodes 1202 via the ad hoc cooperation of the peer computing nodes 1202. In some embodiments, the plurality of different peer computing nodes 1202 may execute on a single computing device, such as on different virtual machines or containers of a single computing device. Alternatively, or in addition, the plurality of different computing nodes 1202 may execute on a plurality of different computing devices, where each computing device may execute one or more of the peer computing nodes 1202. In some embodiments, the decentralized computing platform 1200 may be a permissionless computing platform (e.g., a public computing platform), where a permissionless computing platform allows one or more various entities having access to the program code of the peer node of the permissionless computing platform to participate by using the peer node.

In some embodiments, the decentralized computing platform 1200 may be private, which may allow a peer computing node of the decentralized computing platform 1200 to authenticate itself to the other computing nodes of the decentralized computing platform 1200 by sending a value based on a private cryptographic key, where the private cryptographic key may be associated with a permissioned tenant of the decentralized computing platform 1200. While FIG. 12 shows five peer computing nodes, commercial embodiments may include more computing nodes. For example, the decentralized computing platform 1200 may include more than 10, more than 100, or more than 1000 peer computing nodes. In some embodiments, the decentralized computing platform 1200 may include a plurality of tenants having authentication credentials, wherein a tenant having authentication credentials may allow authorization of its corresponding peer nodes for participation in the decentralized platform 1200. For example, the plurality of tenants may include than 2, more than 12, more than 10, more than 120, more than 100, or more than 1000 tenants. In some embodiments, the peer computing nodes 1202 may be co-located on a single on-premise location (e.g., being executed on a single computing device or at a single data center). Alternatively, the peer computing nodes 1202 may be geographically distributed. For example, the peer computing nodes 1202 may be executing on devices at different data centers or on devices at different sub-locations of an on-premise location. In some embodiments, distinct subsets of the peer nodes 1202 may have distinct permissions and roles. In some cases, some of the peer nodes 1202 may operate to perform the deserialization operations, graph update operations, or reserialization operations as described in this disclosure.

Figure 13:
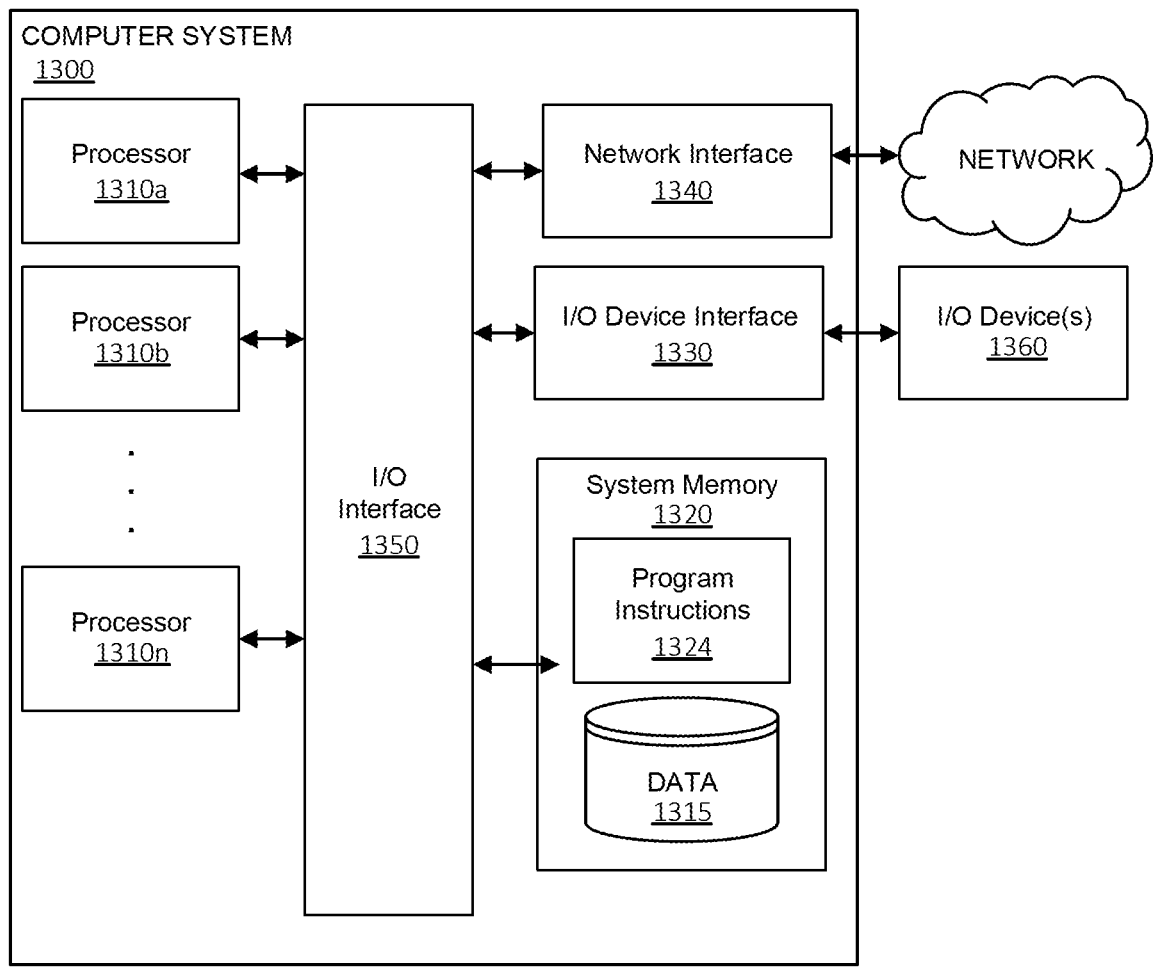
FIG. 13 shows an example of a computer system by which the present techniques may be implemented in accordance with some embodiments.

FIG. 13 shows an example of a computer system by which the present techniques may be implemented in accordance with some embodiments. Various portions of systems and methods described herein, may include or be executed on one or more computer systems similar to computer system 1300. Further, processes (such as those described for FIG. 1, 3, or other figures of this disclosure) and modules described herein may be executed by one or more processing systems similar to that of computer system 1300.

Computer system 1300 may include one or more processors (e.g., processors 1310a-1310n) coupled to System memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 1320). Computer system 1300 may be a uni-processor system including one processor (e.g., processor 1310a), or a multi-processor system including any number of suitable processors (e.g., 1310a-1310n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1300 may include a plurality of computing devices (e.g., distributed computer systems) to implement various processing functions.

I/O device interface 1330 may provide an interface for connection of one or more I/O devices 1360 to computer system 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computer system 1300 through a wired or wireless connection. I/O devices 1360 may be connected to computer system 1300 from a remote location. I/O devices 1360 located on remote computer system, for example, may be connected to computer system 1300 via a network and network interface 1340.

Network interface 1340 may include a network adapter that provides for connection of computer system 1300 to a network. Network interface 1340 may facilitate data exchange between computer system 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1324 or data 1315. Program instructions 1324 may be executable by a processor (e.g., one or more of processors 1310a-1310n) to implement one or more embodiments of the present techniques. Program instructions 1324 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory, computer-readable storage medium that may have program instructions stored thereon that are executable by a computer processor (e.g., one or more of processors 1310a-1310n) to cause the subject matter and the functional operations described herein. A memory (e.g., System memory 1320) may include a single memory device and/or a plurality of memory devices (e.g., distributed memory devices). Instructions or other program code to provide the functionality described herein may be stored on a tangible, non-transitory, computer-readable media. In some cases, the entire set of instructions may be stored concurrently on the media, or in some cases, different parts of the instructions may be stored on the same media at different times.

I/O interface 1350 may be configured to coordinate I/O traffic between processors 1310a-1310n, System memory 1320, network interface 1340, I/O devices 1360, and/or other peripheral devices. I/O interface 1350 may perform protocol, timing, or other data transformations to convert data signals from one component (e.g., System memory 1320) into a format suitable for use by another component (e.g., processors 1310a-1310n). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1300 or multiple computer systems 1300 configured to host different portions or instances of embodiments. Multiple computer systems 1300 may provide for parallel or sequential processing/execution of one or more portions of the techniques described herein.

Those skilled in the art will appreciate that computer system 1300 is merely illustrative and is not intended to limit the scope of the techniques described herein. Computer system 1300 may include any combination of devices or software that may perform or otherwise provide for the performance of the techniques described herein. For example, computer system 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described in this disclosure. In some embodiments, instructions stored on a computer-accessible medium separate from computer system 1300 may be transmitted to computer system 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In some embodiments, additional operations may be performed to determine outcome scores, determine counter-party actions, update a directed graph, or retrieve data from a directed graph. Some embodiments may perform such operations or other operations using methods or systems described in the co-pending PCT application PCT/US2020/049755 titled "GRAPH-MANIPULATION BASED DOMAIN-SPECIFIC EXECUTION ENVIRONMENT," PCT application PCT/US2020/049757 titled "GRAPH OUTCOME DETERMINATION IN DOMAIN-SPECIFIC EXECUTION ENVIRONMENT," PCT application PCT/US2020/049777 titled "MODIFICATION OF IN-EXECUTION SMART CONTRACT PROGRAMS," and PCT application PCT/US2020/049776 titled "GRAPH EVOLUTION AND OUTCOME DETERMINATION FOR GRAPH-DEFINED PROGRAM STATES," which were filed on 2020 Sep. 8 and assigned to the applicant, "Digital Asset Capital, Inc.," and which are herein incorporated by reference. Some embodiments may further perform operations such as scoring entities, using hybrid systems to efficiently query data, determine outcome data based on an event with respect to multiple directed graphs. Some embodiments may perform such operations or other operations using methods or systems described in the co-pending U.S. patent application Ser. No. 17/015,073 titled "CONFIDENTIAL GOVERNANCE VERIFICATION FOR GRAPH-BASED SYSTEM," U.S. patent application Ser. No. 17/015,038 titled "HYBRID DECENTRALIZED COMPUTING ENVIRONMENT FOR GRAPH-BASED EXECUTION ENVIRONMENT," and U.S. patent application Ser. No. 17/015,042 titled "MULTIGRAPH VERIFICATION," which were filed on 2020 Sep. 8, and are assigned to the applicant, "Digital Asset Capital, Inc.," and which are herein incorporated by reference. Some embodiments may perform operations such as dimensionally reducing graph data, querying a data structure to obtain data associated with a directed graph, perform transfer learning operations, or efficiently notify entities. Some embodiments may perform such operations or other operations using methods or systems described in the co-pending U.S. patent application Ser. No. 17/015,069 titled "GRAPH-BASED PROGRAM STATE NOTIFICATION," U.S. patent application Ser. No. 17/015,065 titled "DIMENSIONAL REDUCTION OF CATEGORIZED DIRECTED GRAPHS," and U.S. patent application Ser. No. 17/015,074 titled "ADAPTIVE PARAMETER TRANSFER FOR LEARNING MODELS," which were filed on 2020 Sep. 8, and are assigned to the applicant, "Digital Asset Capital, Inc.," and which are herein incorporated by reference.

As described above, some embodiments may predict an outcome score based on program state data. However, some embodiments may permit an entity to obfuscate information specific to the entity to protect entity privacy. Some embodiments may satisfy the privacy concerns of a first entity while still providing useful scoring mechanisms for other parties interested about the first entity based on event information or other information by performing one or more of the operations described further below.

Event-Based Entity Scoring in Distributed Systems

Interactions between a pair of entities in a network of smart contract programs often rely on the ability of the first of the pair to predict the behavior of the second of the pair. Some entities may be able to use entity scores calculated from arithmetic operations to make such predictions, such as entity scores determined as a ratio of satisfied obligations to failed obligations. As described in this disclosure, uses of the term "smart contract" are provided for illustrative purposes, and other types of self-executing protocols may be used in place of a smart contract unless otherwise stated. Such entity scores may be insufficient to predict entity behavior. In some cases, the norm vertices and program states of a smart contract program may cause an entity to behave in ways that would not be easily captured using entity scores that do not consider specific past behaviors or environmental changes. Various behaviors and program state features may be used to indicate possible patterns in a graph structure. However, the number of the possible permutations of a directed graph and its associated program state (which may be more than a thousand, more than a million, or more than a billion) may prevent a significant portion of possible features from being used to determine an entity score. Furthermore, direct use of entity scores may be infeasible in environments where an entity participating in a smart contract program may only be willing to participate if they are able to obfuscate certain values or parameters from other participants of the smart contract program or other possible observers.

Some embodiments may determine an outcome score associated with a behavior representable by a directed graph of a smart contract program (or other symbolic AI model) based on another behavior indicated by a graph portion of the directed graph or a program state of the smart contract program. These outcome scores may be used to predict how an entity may behave in, such as whether the entity is likely to accept a set of conditional statements, demand additional conditional statements, satisfy a set of conditional statements, or fail the set of conditional statements. These outcome scores may also be used to characterize an entity and determine one or more entity scores for the entity, where an entity score may be equal to an outcome score or be otherwise based on the outcome score. Some embodiments may use the outcome score or entity score to determine which rights norms the entity may exercise or prohibition norms the entity may violate.

Some embodiments may obtain the directed graph of the smart contract program. Some embodiments may determine whether the directed graph includes a graph portion that matches a graph portion template. Some embodiments may determine that a match occurs between a graph portion and a graph portion template by comparing the category labels of the norm vertices of the graph portion and the category labels of the norm vertex templates of the graph portion template. Determining a match may also include a comparison between other values of the graph portion and the graph portion template, such as a condition satisfaction state, a transaction score, a set of participating entities, or the like. An outcome score of the first entity associated with an outcome program state or an outcome vertex of the first entity may be determined based on a determination of a match between a graph portion of a directed graph and a graph portion template, where the graph portion template may be associated with the first entity.

In some embodiments, the graph portion template may be stored in or associated with an entity profile of the first entity. Alternatively, or in addition, the graph portion template may be stored in a general library of graph portion templates and used to determine a set of outcome scores for each entity in a set of smart contract programs or type of entity in the set of smart contract programs (e.g., used to determine outcome scores for all entities having a particular role). By using matching graph portions with stored graph portion templates, some embodiments may provide greater context-dependent predictions when determining outcome scores associated with a decision or program state of an entity and their associated entity score(s) for the entity.

In some embodiments, each respective entity vertex of an entity graph may include or otherwise be associated with a respective entity profile. In some embodiments, the entity graph and entity profiles may be stored in the same data structure. For example, each entity profile may be used as an entity vertex of an entity graph or otherwise be associated with the entity vertex of the entity graph.

Figure 14:
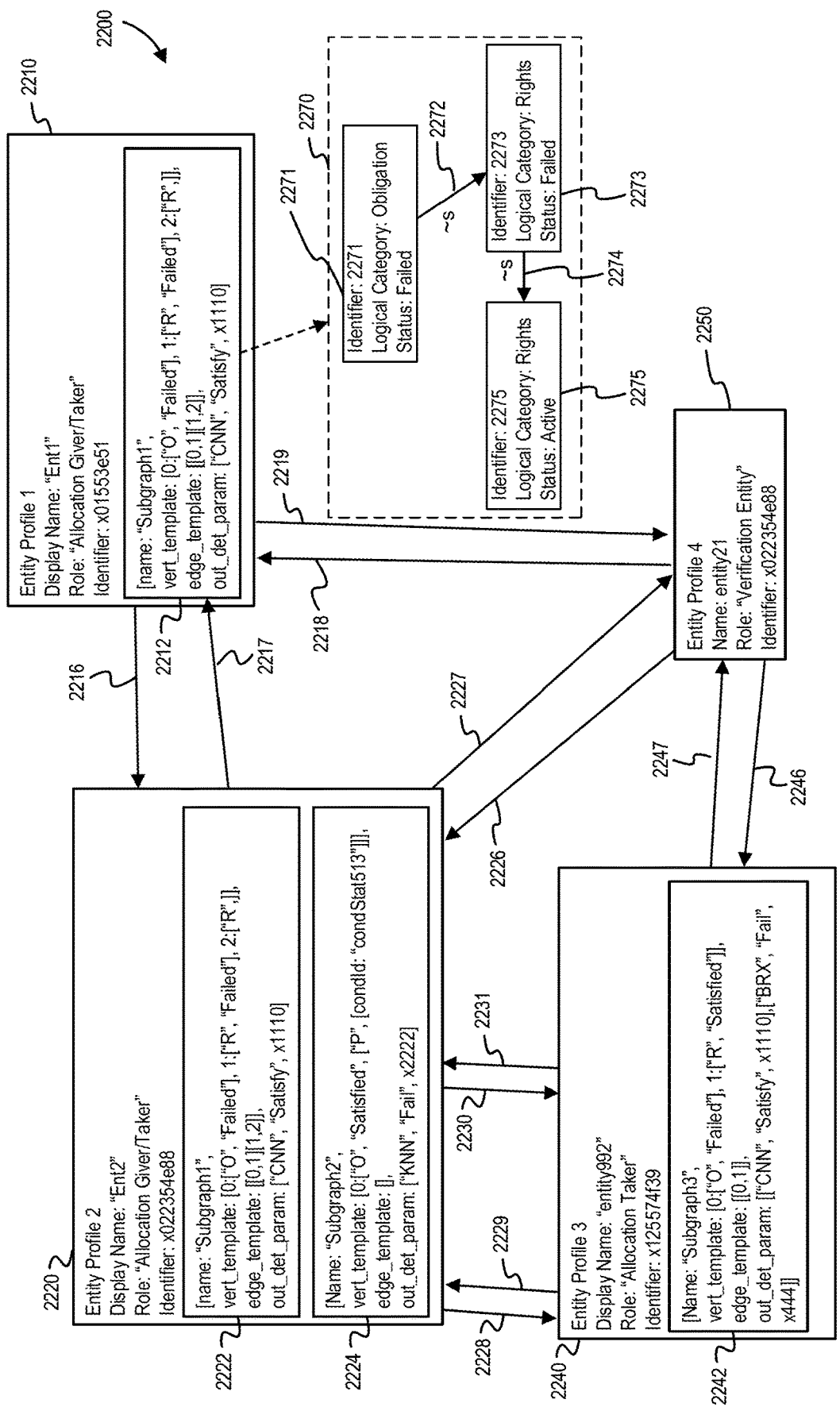
FIG. 14 depicts a diagram of an entity graph, in accordance with some embodiments of the present techniques.

FIG. 14 depicts a diagram of an entity graph, in accordance with some embodiments of the present techniques. An entity graph 2200 may include a set of vertices ("entity vertices") and edges associating the entity vertices, where the entity vertices may include or otherwise be associated with a first entity profile 2210, a second entity profile 2220, a third entity profile 2240, and a fourth entity profile 2250. In some embodiments, each respective entity vertex of the entity graph 2200 may include or otherwise be associated with a respective entity profile. In some embodiments, the entity graph and entity profiles may be stored in the same data structure. For example, each entity profile may be used as an entity vertex of an entity graph or otherwise be associated with the entity vertex of the entity graph. The entity profiles of the entity graph 2200 may be stored in a storage memory of a computing device. For example, the entity profiles of the entity graph 2200 may be stored as objects, lists, trees, or the like. While FIG. 2 depicts the entity graph as comprising entity profiles directly, some embodiments may instead generate or otherwise update an entity graph comprising entity vertices that include values other than those included in an entity profile or include a reference to the entity profile. In some embodiments, an entity graph may be used to determine relationships, events, types of transactions, transaction scores, or the like between different entities.

The box 2212 includes a dictionary encoding a graph portion template that can be visualized in a form represented in the dashed box 2270. As shown in the box 2212, a dictionary encoding the graph portion template may include a first key "name" with a corresponding value "subgraph1" to indicate that the graph portion template has a name "subgraph1." The dictionary encoding the graph portion template in box 2212 may also include a second key "vertex types" and a corresponding value equal to a subdictionary, where each key of the sub dictionary may include a number and each value of the subdictionary may include a vertex property list. As shown in the box 2212, the vertex property list corresponding to the norm vertex template having the index value of "0" may be equal to ["O", "Failed"]. The first value of the vertex property list may indicate the category label "O" (which may represent an "obligation" category) associated with the first norm vertex template and the second value of the property list may indicate a state of the first norm vertex template.

In some embodiments, a category label of a norm vertex template may be similar to or the same as those assigned to one or more norm vertices, such as "obligation," "right," or "prohibition." Furthermore, some embodiments may use other characters to represent a category label. For example, The letters "O," "R," and "P" shown in FIG. 22 and used as part of the vertex property list shown in the box 2212, the box 2222, the box 2224, or the box 2242 may be associated with category labels such as "obligation," "rights," and "prohibitions," respectively. In some embodiments, the set of category labels may include a set of mutually exclusive category labels. For example, if the set of mutually exclusive category labels includes the category labels "obligation,"

"right," and "prohibition," a norm vertex template categorized as being an "obligation" norm may not be categorized as being a "prohibition" norm. As further discussed below, the use of mutually exclusive category labels can increase the speed and reliability of a matching operation between a graph portion and a graph portion template.

The dictionary shown in box 2212 may also include a third key "edge_template" and the corresponding value of the third key "edge_template" may include an array of subarrays, where each subarray may represent an edge template from a first norm vertex template to a second norm vertex template. An edge of a directed graph may be matched with an edge template if the head and tail of the edge match. In some embodiments, the order of the values in each subarray may indicate a directionality of the edge. For example, the subarray "[0,1]" may represent an edge associating the first norm vertex template represented by the key-value pair "[0:["O", "Failed"]]" to the second norm vertex template represented by the key-value pair "[1:["R", "Failed"]]," where the edge may have an edge direction from the first norm vertex template to the second norm vertex template.

The dictionary shown in box 2212 may also include a fourth key "out_det_param," where a corresponding value of the fourth key may include a set of outcome determination parameters or values otherwise associated with the outcome determination parameters. As described further below, some embodiments may determine an outcome determination parameter of a graph portion template using various methods such as by calculating a ratio of a first number to a second number, by computing a ratio of weighted sums, by training a machine learning model, or the like. In some embodiments, the outcome determination parameter of a graph portion template may be equal to correlated with a predicted likelihood of a particular outcome occurring.

In some embodiments, the set of outcome determination parameters may include a value to specify a type of outcome determination operation to use. For example, the set of outcome determination parameters of the box 2212 include the list '["CNN", "Satisfy", "x1110"].' The first element of the set of outcome determination parameters may be an identifier of an outcome determination model usable by a computing system to select the outcome determination model. For example, the value "CNN" may cause a computing system to select a convolutional neural network to determine an outcome score. The second element of the list used as a value for the fourth key "out detparam" may indicate an outcome state associated with the outcome score being computed by a selected model. For example, the second element of the list '["CNN", "Satisfy", "x1110"]' may include the phrase "Satisfy," which may indicate that the outcome score represents a likelihood of the first entity to satisfy an obligation. The value "x1110" may indicate a record in a database of model parameters, where the record may include weights, biases, hyperparameters, or other values of the outcome determination model used to determine an outcome score.

FIG. 14 depicts a diagram of an entity graph, in accordance with some embodiments of the present techniques. The directed graph enclosed by the dashed box 2270 may match the graph portion template encoded in box 2212. Some embodiments may determine that the first norm vertex 2271 matches the norm vertex template represented by the first key-value pair "0:["O", "Failed"].' This determination may be based on the "obligation" label of the first norm vertex matching the "O" (which may be used to represent an "obligation" norm) of the second key-value pair and the failed state of the first norm vertex 2271 matching the "Failed" state of the first key-value pair. Similarly, some embodiments may determine that the second norm vertex 2273 matches the norm vertex template represented by the second key-value pair '1:["R", "Failed"].' This determination may be based on the rights norm label of the second norm vertex matching the "R" of the second key-value pair and the failed state of second norm vertex 2273 matching the "Failed" state of the second key-value pair. Some embodiments may determine that the third norm vertex 2275 matches the norm vertex template represented by the third key-value pair '2:["R",].' This determination may be based on the rights norm label of the second norm vertex matching the "R" of the second key-value pair.

As shown in the dashed box 2270, the first norm vertex 2271 may be associated with the second norm vertex 2273 via the directed graph edge 2272, and the second norm vertex 2273 may be associated with the third norm vertex 2275 via the directed graph edge 2274. A determination may be made that a directed graph edge matches with an edge template. This determination may be based on the head vertex of the directed graph edge matching with a corresponding vertex template that the edge template is directed away from and the tail vertex of the directed graph edge matching with a corresponding vertex template that the edge template is directed towards.

For example, some embodiments may determine that the directed graph edge 2272 may match the edge template subarray '[0,1]' displayed in the box 2212. This determination may be made based on the tail of the directed graph edge 2272 being the first norm vertex 2271, which matches with the norm vertex template represented by "0:["O", "Failed"],' and may also be based on the head of the directed graph edge 2272 being the second norm vertex 2273, which matches with the norm vertex template represented by "1:["R", "Failed"]," where the edge template subarray [0,1] directs away from the first and towards the norm vertex template represented by "1:["R", "Failed"]." Similarly, some embodiments may determine that the directed graph edge 2274 may match the edge template subarray '[1,2]' displayed in the box 2212. This determination may be made based on the tail of the directed graph edge 2274 being the second norm vertex 2273, which matches with the norm vertex template represented by "1:["R", "Failed"]" and may also be based on the head of the directed graph edge 2274 being the third norm vertex 2275, which matches with the norm vertex template represented by "2: ["R"]," where the edge template subarray [0,1] directs away from the norm vertex template represented by "1:["R", "Failed"]" and towards the norm vertex template represented by "2:["R"]."

Some embodiments may determine that a graph portion template matches with a graph portion(s) of a smart contract directed graph. In response, these embodiments may further provide one or more norm vertex identifiers corresponding to the position of the graph portion in the smart contract program directed graph. For example, a graph portion of a directed graph that includes the first norm vertex 2271, second norm vertex 2273, and third norm vertex 2275 may be matched with a graph portion template. In response, some embodiments may provide an identifier for the first norm vertex 2271, second norm vertex 2273, or third norm vertex 2275 in association with the graph portion template.

In some embodiments, the entity graph 2200 may include an association between the first entity profile 2210 and the second entity profile 2220, where the association may include an entity graph edge. For example, the first entity profile 2210 may be associated with the second entity profile 2220 via a first entity graph edge 2216 and a second entity graph edge 2217. In some embodiments, the associations between entities an entity graph may be treated as edges having a directionality or may be associated with a quantitative or categorical value. For example, a first entity graph edge 2216 may be based on a norm vertex associated with a conditional statement that includes an allocation of computing resources from the first entity "Ent1" to the second entity "Ent2."

In some embodiments, the entity graph 2200 may include an association between the first entity profile 2210 and the second entity profile 2220. For example, the first entity profile 2210 may be associated with the second entity profile 2220 via a first entity graph edge 2216 and a second entity graph edge 2217. In some embodiments, the associations between entities an entity graph may be treated as edges having a directionality or may be associated with a quantitative or categorical value. For example, a first entity graph edge 2216 may be stored as an array [x01553e51, x022354e88] based on a norm vertex associated with a conditional statement that includes an allocation of computing resources from the first entity "Ent1" to the second entity "Ent2." Alternatively, or in addition, the first entity graph edge 2216 or other associations between different entities or between their corresponding profiles may be stored as pointers or reference identifiers associated with the entities themselves. Furthermore, some embodiments may store a set of associations such as a set of entity graph edges in a single record, data object, property, or the like. For example, some embodiments may store the first entity graph edge 2216 and second entity graph edge 2217 in the form of an entity association dictionary '[ent1:x01553e51, ent2: x022354e88, RAM: 50, Memory: −300]' to indicate an association based on a set of transactions or possible transactions between the first entity 'x01553e51' and the second entity 'x022354e88.' The entity association dictionary may be based on a first conditional statement of an obligation norm that would cause the first entity allocating 50 GB of RAM from the first entity 'x01553e51' to the second entity 'x022354e88' and a second conditional statement of an obligation norm that would cause the first entity allocating 50 GB of RAM from the first entity 'x01553e51' to the second entity 'x022354e88.'

In some embodiments, the entity graph 2200 may include an association between the second entity profile 2220 and the third entity profile 2240. For example, the entity graph 2200 may include a second set of associations that include the third entity graph edge 2228, a fourth entity graph edge 2229, a fifth entity graph edge 2230, and a sixth entity graph edge 2231. In some embodiments, each of the entity graph edges in the second set of associations may have a directionality from one of the pair of entities to the other of the pair of entities based on a transfer of data, provided service, allocation of resources, or the like. In some embodiments, each of the associations may be based on a set of conditional statements for which the corresponding triggering event(s) or outcome state(s) affect the pair of entities. For example, the third entity graph edge 2228 may be associated with the transaction score "100 GB" that is obtained from a conditional statement encoding the allocation of 100 GB of memory from the second entity associated with the second entity profile 2220 to the third entity associated with the third entity profile 2240.

In some embodiments, the entity graph 2200 may include an association between the first entity profile 2210 and a fourth entity profile 2250. The fourth entity profile 2250 of the entity graph 2200 may represent a verification entity that does not have any stored graph portion templates. The first entity profile 2210 may be associated with the fourth entity profile 2250 via the set of associations that include an entity graph edge 2218 and an entity graph edge 2219. Similarly, the second entity profile 2220 may be associated with the fourth entity profile 2250 via the set of associations that include an entity graph edge 2226 and an entity graph edge 2227. Similarly, the third entity profile 2240 may be associated with the fourth entity profile 2250 via the set of associations that include an entity graph edge 2246 and an entity graph edge 2247. In some embodiments, the entity graph edges between the first, second, or third entity with a verification entity may represent associations based on messages confirming that an action or a value has been sent to a fourth entity associated with the fourth entity profile 2250 by one of the respective entities associated with one of the other entity profiles 2210, 2220, or 2240. For example, the entity graph edges 2219, 2227, and 2247 may be based on instructions encoding the sending of outcome scores or other values to the fourth entity and the entity graph edges 2218, 2226, and 2246 may be based on instructions encoding the transmission of indicators indicating whether the sent scores or other values satisfy a set of criteria. In some embodiments, the entity associated with the fourth entity profile 2250 may provide verification that another entity had satisfied a threshold or other criteria.

Some embodiments may generate an entity graph where each of the entity profiles associated with the vertices of the entity graph satisfies one or more criteria. For example, while the entity graph 2200 includes the fourth entity profile 2250, some embodiments may generate an entity graph based on a first criterion that each entity allocates or receives allocations of computing resources with at least one other entity. Some embodiments may use this first criterion to generate an entity graph comprising entity vertices associated with the first entity profile, second entity profile, and third entity profile without including the fourth entity profile 2250.

Some embodiments may determine one or more paths through the entity graph 2200 to determine a relationship between different entities. For example, the first entity "x01553e51" is not shown to have any direct associations with the third entity "x125574f39." However, some embodiments may determine that the first entity "x01553e51" may be associated with the third entity "x125574f39" based on a path from the first entity "x01553e51" to the third entity "x125574f39" via the first entity graph edge 2216 and the third entity graph edge 2228. Some embodiments may determine that the first entity graph edge 2216 and the third entity graph edge 2228 form a path based on a shared resource type, a shared combination of resource types, shared range bounding transaction amounts, or the like.

Figure 15:
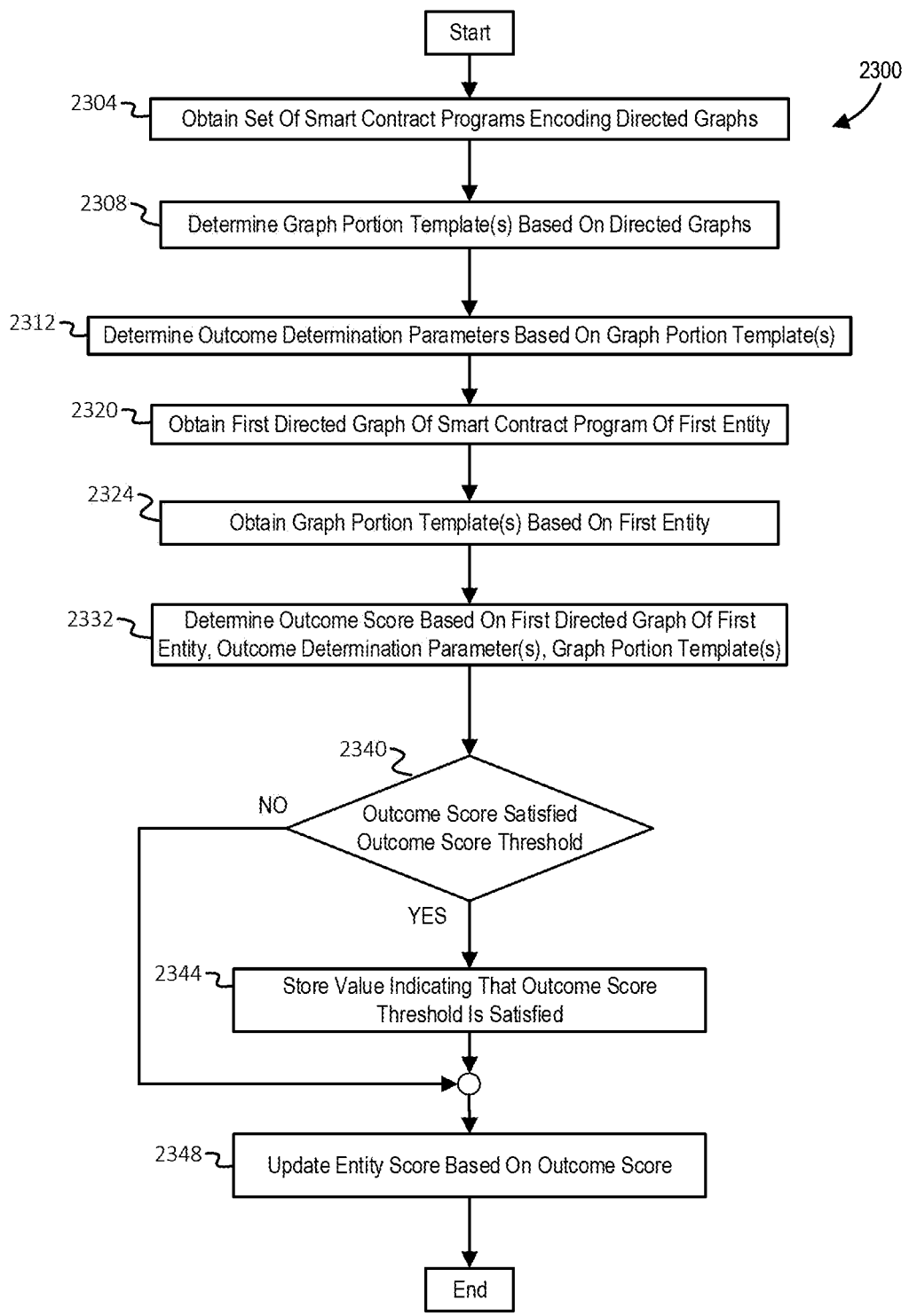
FIG. 15 is a flowchart of a process to assign an outcome score based on a graph portion, in accordance with some embodiments of the present techniques.

FIG. 15 is a flowchart of a process to assign an outcome score based on a graph portion, in accordance with some embodiments of the present techniques. In some embodiments, the process 2300 may include obtaining a set of smart contract programs, each of which encodes a directed graph, as indicated in block 2304. Each program of the set of smart contract programs may similar to those described for block 304. For example, the set of smart contract programs may be obtained from a centralized or decentralized computing platform executing a plurality of smart contract programs or storing a history of smart contract programs. In some embodiments, the number of smart contract programs may be over five smart contract programs, over 10 programs, over 50 programs, over 100 programs, or the like. For example, some embodiments may obtain over 50 smart contract programs, where each respective smart contract program of the plurality of smart contract programs includes data encoding a respective directed graph and encoding a respective set of entities capable of viewing or modifying a state of the respective smart contract program. In some embodiments, an obtained smart contract program may still be in operation, where the state of the smart contract program encoding the directed graph may be changed based on received event messages. Alternatively, or in addition, an obtained smart contract program may be completed and no longer responsive to event messages received by a computing platform. For example, a smart contract program may be executed to completion, where no further conditional statements of the smart contract program can be triggered.

In some embodiments, the process 2300 may include determining a first graph portion template based on the directed graphs of the set of smart contract programs, as indicated by block 2308. A graph portion template may include one or more norm vertex templates, one or more edges associating two norm vertex templates, or the like. A norm vertex template may include values associated with a norm vertex such as a category label, a satisfaction state, a conditional statement, a type of conditional statement, or the like. For example, the graph portion template may include a category label "obligation" and the satisfaction state "failed." As further described below, the norm vertex template may be used to determine the presence of a norm vertex, where two norm vertex templates of a graph portion template may be identical to each other or different from each other. For example, a norm vertex that is indicated to be an obligation norm that is failed may be matched with a first norm vertex template in response to the norm vertex template including or otherwise associated with the category label "obligation" and the satisfaction state "failed." In some embodiments, an edge template associating two norm vertex templates may be directed from a first norm vertex template to a second norm vertex template. An edge template associating two norm vertex templates may include an array specifying the identifiers of two norm vertex templates, a transaction amount, a range of transaction amounts, or the like.

In some embodiments, the graph portion template may be associated with one or more category labels, conditional statements, or types of conditional statements. For example, a set of category labels may be used for a set of norm vertex templates and may include mutually exclusive category labels. For example, a first graph portion template may include a first norm vertex template associated with a first category label, and an edge template may associate the first norm vertex template with a second norm vertex template, where the second norm vertex template may be associated with a second category label. In some embodiments, a conditional statement may be used to specify a graph portion template. For example, a graph portion template may include a terminal norm vertex associated with a failure to satisfy an obligation.

In some embodiments, the graph portion template may include a first norm vertex template and a second norm vertex template that are not connected to each other in the graph portion template. For example, the first norm vertex template may be associated with the category label "obligation norm" and the second norm vertex template may be associated with the same category label "obligation," where the first and second norm vertices may represent unrelated obligations of a first entity to allocate resources to a second entity. Alternatively, or in addition, the graph portion template may include a directed path or cycle connecting a set of norm vertex templates. For example, a first graph portion template may include a first norm vertex template associated with a second norm vertex template and a second norm vertex template associated with a third norm vertex template. In some embodiments, the graph portion template may include a combination of single, disconnected norm vertex templates, directed paths through norm vertex templates, circular paths through norm vertex templates, or the like, where paths through a graph portion template may be determined based on a set of edge templates.

Some embodiments may determine the first graph portion template based on a library of graph portion templates. For example, the library of graph portions templates may include a graph portion template associated with a first array indicating logical category labels of a subgraph. Various methods may be used to determine the presence of a subgraph in a graph. For example, some embodiments may decompose a directed graph into a set of possible subgraphs ("induced graphs") and determine whether a subgraph is present by comparing each induced graph of the set of possible subgraphs with each graph portion template of a set of graph portion templates. In some embodiments, graph portion templates that match one or more induced subgraphs of a directed graph may be included in the set of graph portion templates used to determine an outcome score. Furthermore, as discussed further below, a graph portion template may be associated with a specific entity or set of entities. For example, a graph portion may be stored in an entity profile associated with a specific entity. Alternatively, a graph portion template may be stored in a default set of graph portion templates that is used to determine outcome scores for multiple entities by default.

Some embodiments may use subgraph isomorphism algorithms to determine the presence of a subgraph in a graph, where a subgraph may be specified by a subgraph template. The detection of subgraph isomorphs may include algorithms that account for the possibility that a candidate subgraph is not present a graph (e.g., the candidate subgraph is not necessarily an induced subgraph of the graph) on include algorithms that assume the candidate subgraph is present (e.g., the candidate subgraph is known to be an induced subgraph of the graph). Some embodiments may use a plurality of subgraph isomorphism algorithms to determine the presence of a subgraph based on the subgraph structure itself. For example, some embodiments of may use algorithms to determine the presence of three-node subgraphs in a graph, such as algorithms developed by Itai and Rodeh or Eisenbrand and Grandoni, as described by in "Graph pattern detection" Dalirrooyfard (STOC 2019: Proc. 51st Annual ACM SIGACT Symposium on Theory of Computing, arXiv:1904.03741), which is herein incorporated by reference.

In some embodiments, the process 2300 may include determining a set of outcome determination parameters based on the set of graph portion templates, as indicated by block 2312. A set of outcome determination parameters may be used by an outcome determination model to determine an outcome score, such as a statistical prediction model, an unsupervised learning model, a supervised learning model, some combination thereof, or the like. As further discussed below, the outcome determination model using the outcome determination parameters may be used associated with an outcome score and an outcome. An outcome may include an outcome program state, the occurrence of an event, the satisfaction or failure of a payment obligation by an entity, the matching of a graph portion with a specified graph portion template, or the like.

In some embodiments, an outcome determination parameter may be determined using a ratio or a statistical calculation. In some embodiments, an outcome determination parameter may indicate or otherwise be correlated with a number of times that the behavior indicated by the first graph portion template had occurred. For example, the outcome score may be a ratio of the number of times that the first graph portion template matches with a graph portion in the set of directed graphs to the number of times that the first entity had interacted with another entity based on a plurality of the directed graphs of a plurality of smart contract programs. In some embodiments, an outcome determination model may be caused to use a specified set of outcome determination parameters for a directed graph based on the directed graph having a graph portion matching a second graph portion template, as discussed further below.

In some embodiments, the outcome determination parameters may include a set of weights, biases, or other parameters of a neural network model or another machine-learning model. Some embodiments may determine a set of outcome determination parameters for a first entity by training the neural network model or another machine-learning model to use a plurality directed graphs of a plurality of smart contract programs associated with the first entity. For example, the set of outcome determination parameters may include a set of neural network weights of one or more neurons of a convolutional neural network or other neural network, The convolutional neural network or other neural network may be used to determine a likelihood of an outcome action occurring, where the outcome action may include a transition to an outcome program state, an event occurring, or the like. In some embodiments, the neural network may be trained to use the match between a graph portion and a graph portion template as a feature. For example, some embodiments may be trained using a feature that is set to "1" when a directed graph has a graph portion that matches a first graph portion template and is set to "0" when the graph portion does not match the first graph portion. Additionally, or alternatively, the feature set may include other attributes such as global parameter values of the smart contract program state, variables stored in a storage memory accessible to the smart contract program, or the like.

In some embodiments, the feature set used to train a neural network model or other machine-learning model to determine outcome determination parameters based on a directed graph may include embeddings based on the directed graph. Some embodiments may encode the entity vertices of an entity graph to determine a feature set, such as by applying an embedding algorithm such as a one-hot encoding algorithm to a set of entity vertices. In some embodiments, the embedding assigned to a respective vertex of the directed graph may include or otherwise be associated with a relationship between the respective entity and other entities of the entity graph. For example, some embodiments may generate a set of entity graph features using a vertex embedding algorithm such as using a random walk algorithm, a neural network-based embedding algorithm, or the like. For example, some embodiments may generate a set of embeddings for the vertices of a directed graph using a random walk algorithm such as a DeepWalk algorithm, a Node2Vec algorithm, or the like. Use of a random walk algorithm may include performing random walk sampling for each vertex of the directed graph, training a skip-gram model by using the random walks as one-hot vectors and computing an embedding based on an output of the trained skip-gram model.

Alternatively, or in addition, some embodiments may generate the set of entity graph features using a neural network-based algorithm such as a structural deep network embedding (SDNE) algorithm. For example, some embodiments may use a set of autoencoders that may take a node adjacency vector as an input and is trained to reconstruct the node adjacency vector based on a second-order adjacency. The adjacency vector of a vertex may be represented as a vector where non-zero elements represent a connection between the vertex and other vertices a graph. A first-order adjacency vector for a first vertex may represent the adjacency vector for the first vertex itself, and a second-order adjacency vector of the first vector may represent the adjacency vector for a neighboring vertex of the first vertex. Some embodiments may use the adjacency vectors of a directed graph vertex as a set of embeddings for the directed graph or otherwise determine the set of embeddings based on the adjacency vector outputs of the set of autoencoders. While the above describes the use of random walk algorithms or neural network-based algorithms to generate a set of embeddings, various other algorithms or methods may be used to determine embeddings for a graph. For example, some embodiments may use a graph factorization embedding algorithm, GraRep embedding algorithm, locally linear embedding algorithm, laplacian eigenmaps embedding algorithm, high-order proximity preserved embedding algorithm, deep network embedding for graph representation embedding algorithm, graph convolutional neural network embedding algorithm, graph2vec algorithm, or the like.

In some embodiments, a set of features used to train an outcome determination model for a first entity may include data encoding or otherwise representing statuses of other entities of an entity graph that includes the first entity. For example, a feature used by an outcome determination model for a first entity may include or be based on a feature matrix representing whether other entities of the entity graph have been failed by the first entity. Alternatively, or in addition, a feature may include an entity graph feature that indicates a connectedness of the graph to a specific entity, a global parameter not specific to an entity (e.g., an index stock price, a system temperature value, or the like), or the like. For example, some embodiments may use the graph2vec algorithm, which may include sampling a set of entity subgraphs in an entity graph, training a skip-gram model based on the set of entity subgraphs, and determining entity embeddings based on the trained skip-gram model. Some embodiments may then train a neural network model using the set of entity embeddings to determine an outcome determination parameter.

In some embodiments, a feature used for training or using a machine learning model may include or be based on a set of transaction amounts indicating an amount that has been transferred to or from a respective entity associated with respective entity vertex with respect to each of the other entities that have had a transaction with the respective entity. Alternatively, or in addition, the feature may include or be based on a count of transactions that had occurred between the respective entity and other entities of an entity graph. For example, a feature for training or using a machine-learning model associated with a first entity may include a ratio of the number of times that the first entity had failed an obligation norm when dealing with a second entity to a number of times that the first entity had a transaction with the second entity. Alternatively, or in addition, this ratio or another value based on a count of transactions may be used as an outcome determination parameter.

In some embodiments, the process 2300 may include obtaining a first directed graph of smart contract program of a first entity, as indicated by block 2320. Operations to obtain the directed graph of the smart contract program of the first entity may include obtaining a directed graph from a storage memory by querying a database, retrieving program state data, or the like.

In some embodiments, the process 2300 may include obtaining a set of graph portion templates based on the first entity, as indicated by block 2324. Some embodiments may obtain the graph portion templates by obtaining an entity profile of an entity, where the entity profile includes or is otherwise associated with graph portion templates. As discussed above, the set of graph portion templates may be determined based on a set of smart contract programs associated with the first entity. In some embodiments, an entity profile may include an entity identifier, a set of values indicating one or more attributes associated with an entity, a set of entity scores, or the like. For example, an entity profile may include a set of display names, set of internal alphanumeric identifiers o the entity, set of numeric values or categories indicating behaviors, a set of numeric values or categories indicating limits or numeric ranges, or the like. Some embodiments may store a set of graph portion templates in an entity profile or otherwise associate the graph portion template with the entity profile. For example, some embodiments may store the display name "entity 553," the entity role name "resource allocator," a maximum resource allocation limit "106 GB," and a set of graph portion templates in the first entity profile. In some embodiments, a single entity may be associated with more than one entity profile. Alternatively, or in addition, the set of graph portion templates may be obtained from a library of graph portion templates that is either not associated with an entity profile or is associated with multiple entity profiles. For example, some embodiments may obtain a default set of graph portion templates to determine an outcome score for a first entity from a library of graph portion templates that is not stored in an entity profile of the first entity.

In some embodiments, the process 2300 may include determining a set of outcome scores based on the first directed graph of the first entity, the set of outcome determination parameters, or the set of graph portion templates, as indicated by block 2332. As described above, some embodiments may load or otherwise obtain a set of outcome determination parameters and use the obtained outcome determination parameters to determine an outcome score using an outcome determination model. The selection of an outcome determination model and its corresponding set of outcome determination parameters may be based on values stored in an entity profile of a first entity or otherwise based on values associated with the first entity. For example, a first entity profile may include a plurality of sets of outcome determination parameters, where each set of the plurality of sets causes the use of a respective outcome determination model and a respective set of outcome determination parameters for the respective outcome determination model.

The outcome determination model may include a model for determining predictions or the likelihood of an outcome such as a statistical model, a machine learning model, or the like. The outcome may include various possible outcomes, such as the satisfaction or failure of an obligation by an entity, the activation of a vertex having a specified category label, or the like. For example, some embodiments may determine that a first set of outcome determination parameters stored in an entity profile associated with a first entity specifies the use of a convolutional neural network as an outcome determination model. Some embodiments may then use a weights array identifier stored in the set of outcome determination parameters to obtain a set of weights and biases from a database of parameters. Some embodiments may then use the set of weights and biases for the convolutional neural network to determine an outcome score, where another value stored in the set of outcome determination parameters may indicate that the outcome score includes a measurement of the likelihood that the first entity will fail an obligation.

As described above, determining the outcome score may include determining whether a graph portion of the first directed graph matches a graph portion template of the set of graph portion templates. Some embodiments may use one or more graph isomorphism algorithms to determine whether a graph portion matches a template of the set of graph portion templates. In response to a determination that a match exists, some embodiments may update an input value of the outcome determination model, where the input value indicates that the graph portion matches a graph portion template. Some embodiments may then determine an outcome score based on the input value. For example, some embodiments may obtain a count of the number of times that the graph portion template matches a graph portion of the directed graph and use the count as an input value for a machine learning model to determine an outcome score. In some embodiments, the set of graph portion templates stored in the entity profile of a first entity or otherwise associated with the first entity may include a norm vertex template, an edge between norm vertex templates, a path through a plurality of vertex templates, or the like. Furthermore, in some embodiments, the outcome score may be one of a set of outcome scores, where each score of the set of outcome scores is determined using one of a set of outcome determination parameters.

In some embodiments, the process 2300 may include determining whether the outcome score satisfies an outcome score threshold, as indicated by block 2340. In some embodiments, the outcome score threshold may include a predetermined value. For example, an outcome score may indicate the likelihood that the first entity participates in a smart contract that includes a directed graph having a specified graph portion that matches a target graph portion template. For example, the outcome score threshold may be equal to 50%, and satisfying the outcome score threshold may indicate that at least 50% of the smart contracts in which the first entity participates include a directed graph having a graph portion that matches a target graph portion template. In some embodiments, each entity may include a plurality of outcome scores, where each of the plurality of outcome scores may have a corresponding outcome score threshold. If the outcome score satisfies the outcome score threshold, operations of the process 2300 may proceed to operations described for block 2344. Otherwise, operations of the process 2300 may proceed to operations described for block 2348.

In some embodiments, the process 2300 may include storing a value indicating that the outcome score threshold is satisfied, as indicated by block 2344. The value indicating that the outcome score threshold is satisfied may be stored in various forms. For example, the value indicating outcome score threshold satisfaction may include a boolean value, a number representing that the outcome score threshold is satisfied, an alphanumeric string such as "satisfied," a value of a dictionary or object property, or the like. As discussed further below, the value indicating outcome score threshold satisfaction may be stored in an entity profile, a database of values, or some other data structure stored on persistent computer memory. In some embodiments, the value may be stored on a tamper-evident, distributed ledger operating on a distributed computing platform. Alternatively, or in addition, the value may be stored on a centralized computing platform, such as on a single computing device. Furthermore, as described elsewhere in this disclosure, updating the value indicating outcome score threshold satisfaction may include updating an entity graph.

In some embodiments, the process 2300 may include updating an entity score based on the outcome score, as indicated by block 2348. Various methods may be used to determine an entity score based on the outcome score. For example, some embodiments may set an entity score to be equal to an outcome score. Alternatively, or in addition, an entity score may be equal to a weighted sum of entity scores. For example, some embodiments may determine an entity score to be equal to a set of outcome scores equal to a set of probabilities of obligation norm failure multiplied by a corresponding transaction score.

In some embodiments, updating the entity score based on the outcome score may include updating an entity profile associated with the entity graph, where the entity profile includes or is otherwise associated with the entity score. In some embodiments, the values updating an entity profile of the first entity may then also be used to update additional entity profiles of other entities of an entity graph. Some embodiments may store entity profile values or entity graph values on a tamper-evident, distributed ledger operating on a distributed computing platform. Alternatively, or in addition, the value may be stored on a centralized computing platform, such as on a single computing device.

Furthermore, in some embodiments, the entity score may be used in a set of simulations to determine whether an entity is likely to accept or reject amendments to the conditional statements of a smart contract program or the structure of a directed graph of the smart contract program. For example, a first outcome score may represent a likelihood of a first entity to fail an obligation based on a simulation of a first smart contract program and a second outcome score may represent a likelihood of the first entity to fail an obligation based on a simulation of a second smart contract program. Based on a comparison of the first outcome score and the second outcome score, some embodiments may determine the likelihood that a second entity is likely to accept or reject a proposed amendment to a conditional statement used in the first and second smart contract programs.

Figure 16:
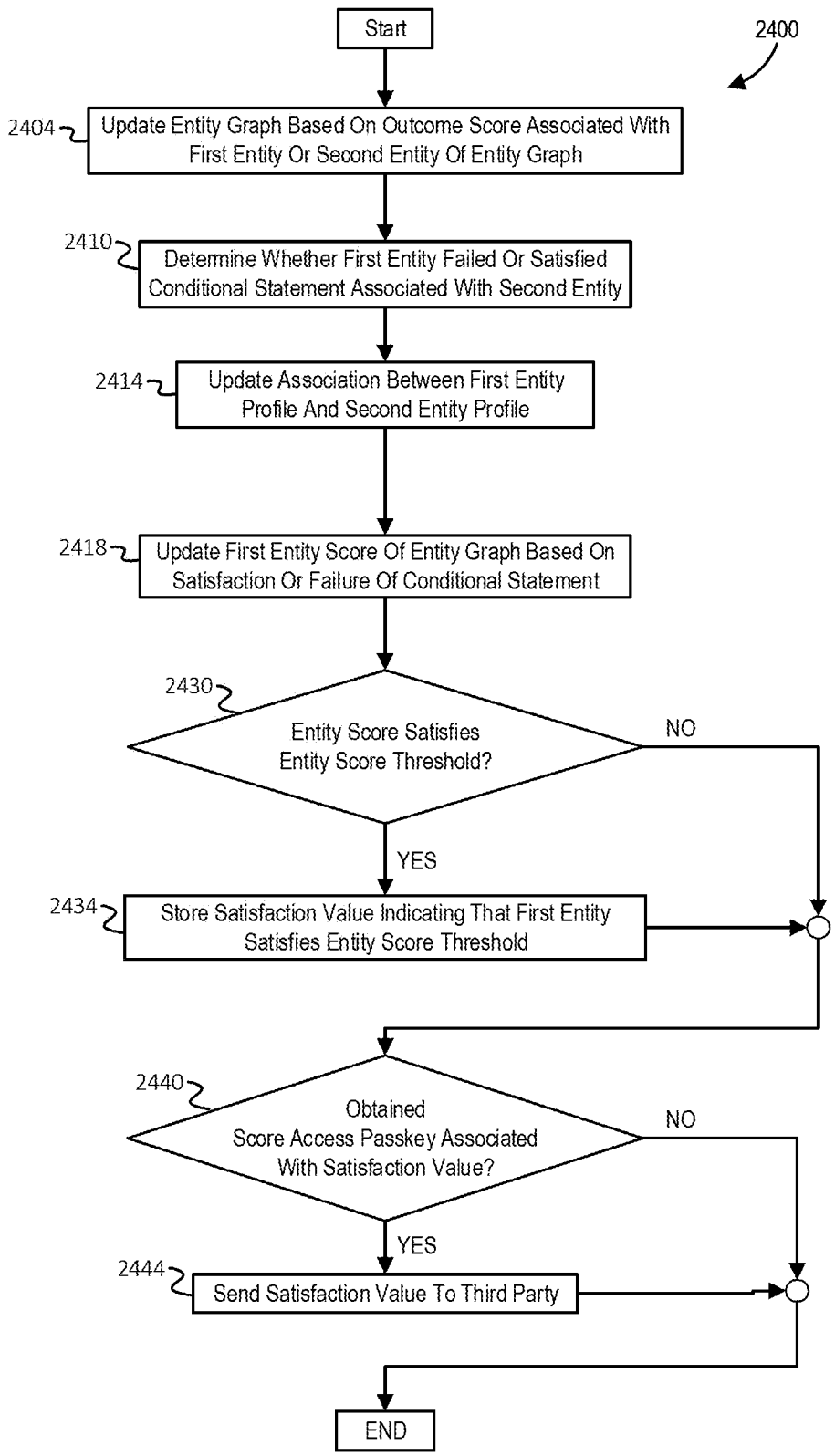
FIG. 16 is a flowchart of a process to send a message indicating that an entity score has been updated based on an entity graph, in accordance with some embodiments of the present techniques.

FIG. 16 is a flowchart of a process to send a message indicating that an entity score has been updated based on an entity graph, in accordance with some embodiments of the present techniques. In some embodiments, operations of the process 2400 may include updating an entity graph based on an outcome score associated with a first entity or a second entity of the entity graph, as indicated by block 2404. In some embodiments, updating an entity graph may include updating an entity score of the entity graph based on an outcome score determined using one or more of the operations described above for the process 2300. For example, an entity score for a first entity may be equal to an outcome score described above. Alternatively, or in addition, an entity score may be based on a combination of outcome scores. For example, in some embodiments, an entity score may be equal to a weighted sum of a first outcome score based on the number of times the entity fails two or more obligation norms and a second outcome score based on the number of times the entity triggers a rights norm to prematurely terminate a smart contract program.

In some embodiments, the entity score, entity profile associated with the entity score, or entity graph associated with the entity score may be stored on a distributed, tamper-evident ledger of a distributed computing platform. For example, a version of a first entity profile, a second entity profile, and an entity graph edge associating the first entity profile to the second entity profile may be stored on the distributed, tamper-evident ledger (e.g., stored as on-chain data). Alternatively, or in addition, some or all of the entity graph may be stored on storage memory that is not part of a distributed, tamper-evident ledger. For example, some embodiments may store data related to the entity graph in a storage memory of a centralized computing platform, where the data may be accessible and transferred over a distributed computing platform via a verification hash value. For example, some embodiments may update data related to a first entity profile by transmitting an updated score from a distributed computing platform to the centralized computing platform. Receiving the updated score may cause the centralized computing platform to update the first entity profile based on the updated score. In some embodiments, the updated score is not stored in a persistent memory of the distributed computing platform and is stored in a persistent memory of the centralized computing system, where the updates score may be obtained from the centralized computing system using data provided from the distributed computing platform.

Some embodiments may detect the similarity between two different entity profiles based on a set of entity similarity criteria. For example, some embodiments may compare a first entity profile and a second entity profile based on a set of predetermined fields such as an entity name, an account number, an identifier value, entity role, a hashed login value, or the like. Some embodiments may determine a similarity value based on a ratio of identical values in the set of predetermined fields. For example, some embodiments may determine that two entity profiles share a same entity name, a same entity role, and a same access privilege and, in response, determine that the two entity profiles satisfy an entity similarity criterion. In some embodiments, the determination that two entities satisfy a set of entity similarity criteria may cause a smart contract program or other symbolic AI program to generate a message indicating the two entity profiles. By indicating similarities between two entity profiles, some embodiments may reduce the risk of hacking attempts, counterfeiting attempts, unnecessary duplication of roles, or the like.

In some embodiments, operations of the process 2400 may include determining whether the first entity failed or satisfied a conditional statement associated with the second entity, as indicated by block 2410. In some embodiments, an event message may be obtained by a smart contract program that triggers a norm vertex associated with the first entity, where the event message causes the first entity to satisfy or fail a conditional statement associated with the norm vertex. For example, a conditional statement may correspond to an obligation norm vertex in a set of norm vertices, where a condition of the conditional statement may include the condition that the first entity sends an account renewal message to the second entity. In response to the first entity sending the account renewal message to the second entity, some embodiments may determine that the first entity has satisfied the obligation norm vertex. Alternatively, or in addition, an event message may be provided by the second entity, a third-party entity, another application operating on a computing platform executing the smart contract program or other symbolic AI program, an API of the smart contract program, or the like. For example, a conditional statement may correspond to an obligation norm vertex in a set of norm vertices, where the conditional statement may include a condition that the second entity sends a confirmation message indicating that it is able to use computing resource allocated by the first entity or has received a corresponding amount of a digital asset equivalent to the computing resource from the first entity. In response to the second entity not sending the confirmation message, some embodiments may determine that the first entity has failed a conditional statement associated with the second entity.

In some embodiments, operations of the process 2400 may include updating an association between a first entity profile and a second entity profile, as indicated by block 2414. The association between the first entity profile the second entity profile may be a part of the entity graph and may be stored as an entity graph edge associating a first entity vertex corresponding with the first entity profile and a second entity vertex corresponding with the second entity profile. The association between the first entity profile and the second entity profile may be stored in various forms associating a plurality of entity profiles, such as an array, a pointer from one of the entity profiles to another of the entity profiles, an identifier stored in one of the entity profiles that may be used to find another of the entity profile, or the like.

In some embodiments, updating the association between the first entity profile the second entity profile may be based on a transaction score between the first entity profile and the second profile. The transaction score may be used as a part of a conditional statement of a norm vertex or may otherwise be associated with the norm vertex. For example, a conditional statement of a rights norm vertex may indicate that a first entity of a set of norm vertices may trigger a rights norm vertex and cause a second entity to transfer 100 units of a digital asset to the first entity, where a transaction score of the rights norm vertex may be or otherwise include the 100 units. In response, some embodiments may update the association between the first entity profile the second entity profile by increasing an association value by 100 units. In some embodiments, the association between entity profiles may be updated even if there is no indication that an entity has satisfied or failed a conditional statement. For example, some embodiments may perform regular updates of an entity graph to update entity graph edges between entity vertices on an entity graph based on parameters of the conditional statements of a set of symbolic AI programs, where each entity vertex corresponds with an entity profile.

In some embodiments, an entity graph may include a plurality of entity graph edges between a first entity profile and a second entity profile of the entity graph. For example, each entity graph edge of the plurality of entity graph edges may represent a different resource type being used in a transaction between the different entities. Some embodiments may update an entity graph edge of the entity graph based on a resource type associated with a transaction score. For example, a first entity profile may be associated with a second entity profile via a first entity graph edge and a second entity graph edge, where the first entity graph edge represents a computing resource allocation and the second entity graph edge represents a time allocation. In response to determining that an event message indicates that the first entity has allocated 500 GB of storage memory to the second entity, some embodiments may update the entity graph by updating a score associated with the first entity graph edge and not updating a score associated with the second entity graph edge. Some embodiments may update the network by updating the association representing storage memory allocation between the first entity and the second entity by adding 500 GB to the storage memory.

In some embodiments, the process 2400 may include updating a first entity score of the entity graph based on the satisfaction or failure of the conditional statement, as indicated by the block 2418. As described above, an entity score for an entity may represent one of various types of attributes or behaviors of the entity and may include attributes or behaviors associated with the satisfaction or failure of norm vertices of a smart contract directed graph. For example, some embodiments may update an entity score of the first entity that represents the number of times that the first entity has failed an obligation. Some embodiments may include a plurality of entity scores associated with the entity profile. For example, some embodiments may include an entity profile storing or otherwise associated with a first entity score and a second entity score, where the first entity score may indicate a number of times that the first entity has failed an obligation norm and a second entity score may indicate a total amount of times that the first entity has exercised a rights norm resulting in another entity transferring an amount of digital assets to the first entity.

Some embodiments may obtain a previous entity score stored on a distributed, tamper-evident ledger and update the entity score based on the previous entity score. For example, some embodiments may obtain a previous entity score of a first entity equal to a ratio representing the number of satisfied obligations to the number of total obligations "975/1000." In response to an event message indicating that the first entity has satisfied another obligation, some embodiments may update the entity score by adding one to the numerator and denominator of the previous entity score to result in the ratio "976/1001."

In some embodiments, the first entity score may be stored in the first entity profile or otherwise associated with the first entity profile. For example, the first entity score may part of an entity profile stored on a tamper-proof, distributed ledger. In some embodiments, a first entity score may be encrypted and updating the first entity score may include sending an encryption key in conjunction with or otherwise associated with update values, where the update values may be used to update the first entity score or otherwise update the first entity profile. Some embodiments may obtain access to the encryption key or use of the encryption to a specified set of entities. For example, some embodiments may provide the encryption key associated with the first entity to the first entity itself, entities associated with one or more transactions with the first entity, a verified set of third-party entities, or the like. By securing the first entity score based on an encryption key, some embodiments may reduce the risk of unauthorized or otherwise inappropriate changes to an entity score of the first entity profile.

In some embodiments, operations of the process 2400 may include determining whether the entity score satisfies an entity score threshold, as indicated by block 2430. In some embodiments, the entity score threshold may be associated with a predetermined value or be controllable by a verification entity. Some embodiments may include a plurality of entity score thresholds, where each of the entity score thresholds may be associated with a specific type of entity score. For example, some embodiments may include a first entity score threshold representing a threshold amount of computing resources allocated over a period of time and a second entity score threshold representing a threshold amount of energy consumed by the first entity. If the entity score satisfies the entity score threshold, operations of the process 2400 may proceed to operations described for block

2434. Otherwise, operations of the process 2400 may proceed to operations described for block 2440.

In some embodiments, operations of the process 2400 may include storing a set of satisfaction values indicating that the first entity satisfies the entity score threshold, as indicated by block 2434. In some embodiments, the satisfaction value may be determined and shared with the first entity profile by a verification entity. For example, a verification entity may determine that a first entity satisfies entity score threshold, indicating that the first entity fulfills a required percentage of obligation norms. In response to this determination, some embodiments may store a satisfaction value in the entity profile of the first entity, where the satisfaction value indicates that the verification entity has determined that the entity score of the first entity satisfies the entity score threshold. Alternatively, or in addition, the satisfaction value indicating that the first entity satisfies the entity score threshold may be stored in a storage memory of the verification entity or in another data storage system.

By storing the satisfaction value indicating that the first entity satisfies the entity score threshold, other entities may then be allowed to determine that the first entity satisfies the entity score threshold without requiring additional computations that may slow down on distributed computing platforms. Furthermore, a verification entity may provide a satisfaction value indicating that a first entity satisfies the entity score threshold. Providing satisfaction values from a verification entity may enable some embodiments to protect the privacy of a first entity while still allowing other entities to trust or otherwise predict the behavior of the first entity.

In some embodiments, operations of the process 2400 may include determining whether a score access passkey value is obtained, as indicated by block 2440. The score access passkey value may be obtained by a smart contract management system to determine whether an entity score associated with an entity profile can be shared with a score-requesting entity. In some embodiments, the score access passkey value may be obtained as a part of another message sent to an API. In some embodiments, the score access passkey may include a series of alphanumeric characters, a set of values, hashed value(s), or the like. In some embodiments, the score access passkey for a satisfaction value of a first entity may be received from the first entity itself. Alternatively, or in addition, the score access passkey may be obtained from a second entity associated with the first entity via a transaction graph or an authenticated third party. If a determination is made that score access passkey is received, operations of the process 2400 may proceed to block 2444. Otherwise, operations of the process 2400 may be considered as complete.

In some embodiments, operations of the process 2400 may include sending a set of satisfaction values to the third party, as indicated by block 2444. In some embodiments, the set of values may include one or more values indicate that the first entity satisfies the entity score threshold. Some embodiments may send a message to another entity or an API based on a set of satisfaction values indicating that the entity score satisfies the entity threshold. For example, some embodiments may send a message indicating that a first entity score of a first entity satisfies the entity threshold to an application program interface of a second entity. Furthermore, as discussed above, some embodiments may determine additional entities that may be associated with the first entity based on a path through an entity graph and send the message to these additional entities as well. Furthermore, some embodiments may provide a satisfaction value without any score access passkey being obtained. For example, some embodiments may provide a first satisfaction value to set of entities without obtaining a score access passkey associated with the first satisfaction value but require that a score access passkey be received from an entity before providing the entity with a second satisfaction value.

As described above, some embodiments may provide scores for entities based on event information without requiring some information that an entity may set as private or otherwise render inaccessible to other entities. In addition to obtaining a score associated with an entity, some embodiments may determine other information associated with an entity or events caused by entities using one or more querying operations. Some embodiments may perform operations, such as those described further below, to use a hybrid computing environment to query or process query results with greater efficiency.

Confidential Governance Verification for Graph-Based System

Real-world transactions and other interactions between entities often occur in a framework of governing conditions. This framework of governing conditions may be constructed from a variety of governing documents such as internal policies, established protocols, regulations, laws, or the like. These governing conditions may be taken into account when executing a self-executing protocol (e.g., smart contract program) to reduce the risk of significant damage stemming from the violation of one or more governing conditions specific to one or more of the parties. For example, some regulations may include a rule that requires a first entity to verify that each other entity the first entity has had transactions with be known and not part of a prohibited parties list. A violation of a rule in a governing document may result in penalties, a halt to transactions, or other negative outcomes to the violating entity. While an entity may already include processes to account for these types of governing conditions (sometimes known as Know-Your-Customer processes or KYC processes), these processes may be difficult to implement or demonstrate the effectiveness of due to technological limitations and malicious agents. These attempts may be further hampered by the desired or required anonymity of entities taking part in digital transactions with respect to each other or the complex nature of certain transactions. For example, some governing conditions may correspond to a set of actions that may be allowed individually but, when integrated as a combined set of actions, would be prohibited by the governing condition.

Some embodiments may convert or otherwise adapt a governing document into a set of governing conditions, each of which may require or restrict an entity's action(s). For example, a governing condition may require that all entities party to a transaction or type of transaction be authorized by a verification agent or restrict the execution of transactions associated with globally prohibited entities. Some embodiments may address these requirements using a cross-program entity identifier that may be confidential with respect to an entity or set of entities but mapped to the entity across a domain of smart contract programs. For example, an entity that is a party to three different smart contract programs may be listed under three different entity identifiers for each smart contract program, but each of the three entity identifiers may be confidentially mapped to the cross-program entity identifier via a data table, an associative array, or the like. Some embodiments may confirm that the entity satisfies a governing condition without revealing a cross-program identity of the entity.

While some embodiments may determine that a governing condition is violated based on the governing condition being satisfied, it should be understood that other governing conditions may be considered violated based on the governing condition not being satisfied. As discussed further below, some embodiments may determine whether a violation is caused by the satisfaction or failure of a governing condition based on a pre-set default parameter (e.g., not satisfying a governing condition encoded in a program results in a determination that the governing condition is violated). Alternatively, or in addition, some embodiments may refer to a parameter associated with a respective governing condition to determine whether the satisfaction or failure of the respective governing condition results in a violation of the respective governing condition.

Figure 17:
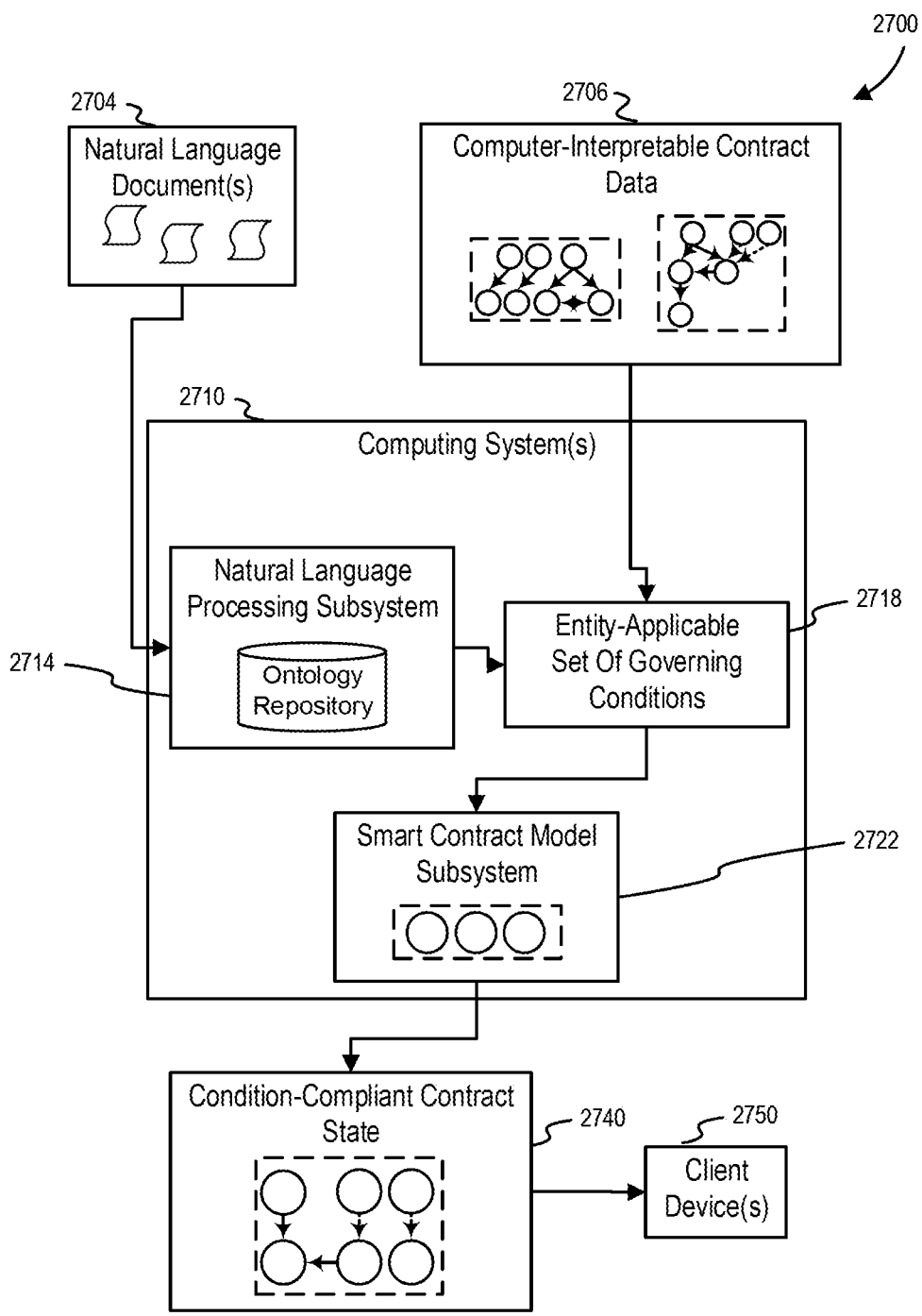
FIG. 17 shows an example of a computer system usable to determine a set of governing conditions, in accordance with some embodiments.

FIG. 17 shows an example of a computer system usable to determine a set of governing conditions, in accordance with some embodiments. In some embodiments, the computing environment 2700 may include a computing system 2710. In some embodiments, the computing system 2710 may include a plurality of computing devices in communication with each other via a networking system. For example, the computing system 2710 may include a plurality of devices operating a decentralized computing platform used to execute some or all of the operations described in this disclosure. Alternatively, or in addition, the computing system 2710 may include a single computing device used to execute some or all of the operations described in this disclosure.

In some embodiments, the set of computing systems may include a natural language processing (NLP) subsystem 2714. The NLP subsystem 2714 may part of an application that is executing on a single device or a plurality of devices. For example, the NLP subsystem 2714 may be executing on a single device or a subset of the plurality of devices, where training parameters, weights, or other results of the NLP subsystem 2714 may be distributed to other devices of the plurality of devices. The NLP subsystem 2714 may obtain a set of natural language documents 2704 to determine a set of governing conditions. In some embodiments, the NLP subsystem 2714 may include or otherwise access an ontology repository 2716 in combination with an entity identifier to determine a set of governing conditions, as further described below. Alternatively, or in addition, the NLP subsystem 2714 may apply one or more operations described in provisional patent application 63/034,255 ("Semantic Contract Maps," filed 3 Jun. 2020, herein incorporated by reference) on a set of governing documents to determine a set of governing conditions. For example, some embodiments may include operations to apply a set of linear combinations of feature observations and cross observations across first order and second orders in the feature space of a governing document to determine a set of governing conditions.

In some embodiments, the computing system 2710 may obtain a set of computer-interpretable smart contract data 2706. The computer-interpretable smart contract data 2706 may include some or all of the data of one or more smart contracts, such as those described above. For example, the computer-interpretable smart contract data 2706 for a first contract program may include a graph of norm vertices, their corresponding edges, a list of entities associated with that first contract program, a set of program state variables, or the like. Alternatively, or in addition, the computer-interpretable smart contract data 2706 for the first contract program may include a value(s) obtained from a different type of computer-interpretable document, such as one described in "Smart contract templates: foundations, design landscape and research directions" by Clack et al. (Clack C D, Bakshi V A, and Braine, arXiv preprint arXiv:1608.00771. 2016 Aug. 2). For example, the computer-interpretable smart contract data 2706 may include or obtain values from a Ricardian contract implemented in JSON code. The computing system 2710 may extract one or more governing conditions from the set of computer-interpretable contract data 2706 and update the set of entity-applicable governing conditions 2718 by determining which conditions(s) of a set of governing conditions are applicable to one or more entities based on their associated cross-program entity identifier. As used in this disclosure, a document that is "computer-interpretable" is encoded in a way such that variable names, variable values, data objects, or other elements of a computer program may be parsed from the document without requiring the use of advanced processing systems, such as neural network systems or other machine learning systems.

In some embodiments, the computing system 2710 may use the set of entity-applicable governing conditions 2718 to perform one or more other operations described in this disclosure. For example, in some embodiments, the smart contract program subsystem 2722 may apply the set of set of entity-applicable governing conditions 2718 to a smart contract program to determine a condition-compliant contract program state 2740. In some embodiments, the condition-compliant contract program state 2740 or data associated with the condition-compliant contract program state 2740 may be sent to a client device 2750.

Figure 18:
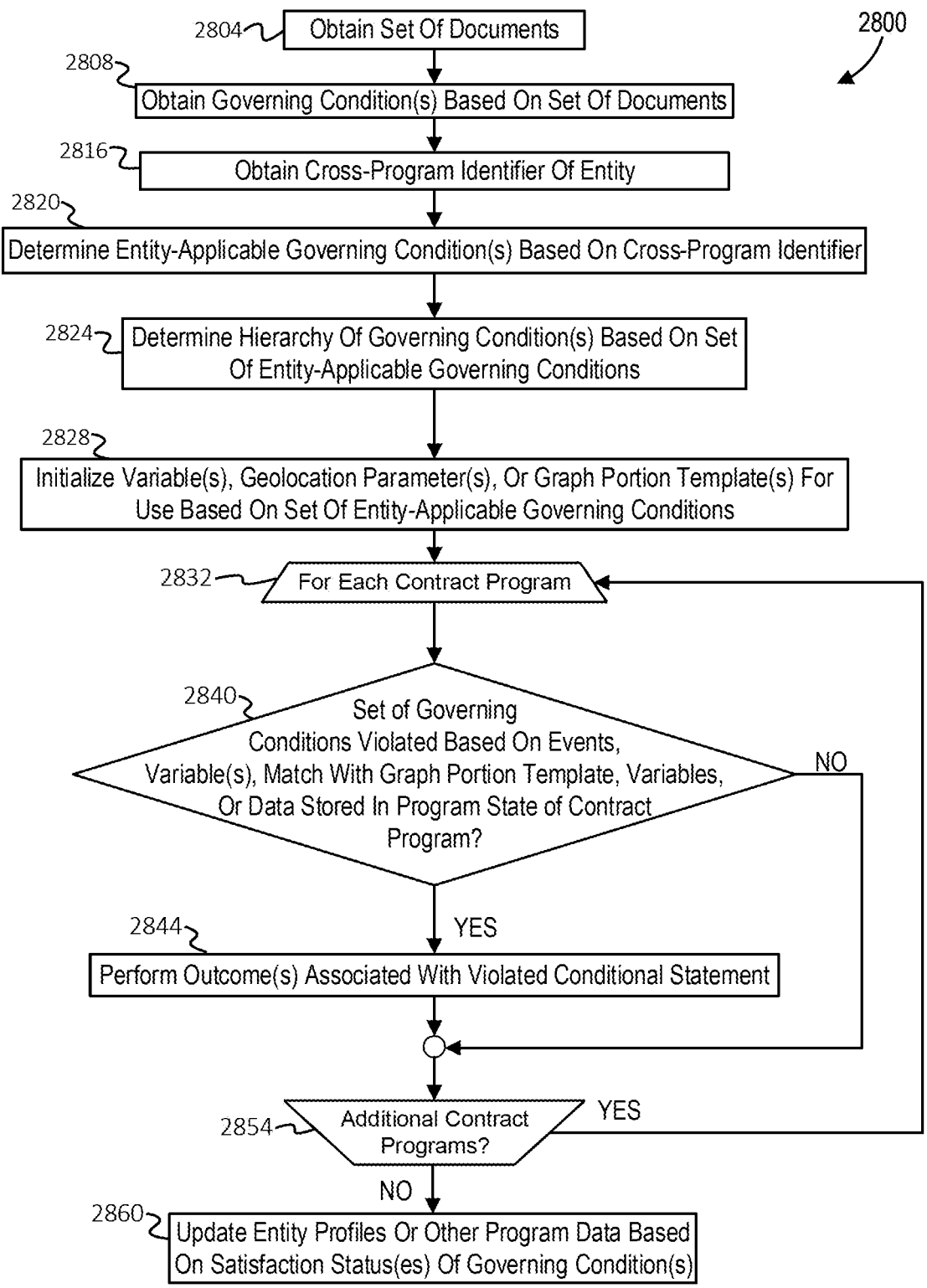
FIG. 18 shows a flowchart of operations to update an entity profile based on whether a set of governing conditions are satisfied, in accordance with one or more embodiments.

FIG. 18 shows a flowchart of operations to update an entity profile based on whether a set of governing conditions are satisfied, in accordance with one or more embodiments. In some embodiments, the process 2800, like the other processes and functionality described herein, may be implemented by a system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described. Some operations may be executed multiple times per instance of the process's execution, some operations may be omitted, additional operations may be added, some operations may be executed concurrently and other operations may be executed serially, none of which is to suggest that any other feature described herein is not also amenable to variation. Operations of the process 2800 may begin at block 2804.

In some embodiments, the process 2800 includes obtaining a set of documents, as indicated by block 2804. Some embodiments may obtain a document as a Ricardian contract or some other document type that is structured to be computer-interpretable by a computer system. For example, the set of documents may include a Ricardian contract document stored as a hierarchical YAML file with pre-determined tags indicating conditions, outcomes, affected entities, affected entity categories, affected actions, affected action types, or the like. Alternatively, or in addition, some embodiments may obtain a document in the form of a natural language document from a user device. For example, some embodiments may obtain a natural language document after a user submits a natural language document from a web browser to an API of the embodiment. Alternatively, or in addition, some embodiments may obtain the natural language document by receiving a document source address such as a web address, database key, unique identifier, or the like and then retrieve a natural language document from the document source address. For example, some embodiments may receive the web address "www.uspto.gov/asdf" as a document source address and then retrieve the natural language document by accessing the web address "www.uspto.gov/asdf" and storing a version of the web page.

In some embodiments, the system may use optical character recognition (OCR) methods to convert text for subsequent processing. For example, the system may apply OCR methods to process a rendered image of a document and detect the presence of one or more words in the rendered image. As described further below, these words may then be processed to determine word embeddings or text block scores, which may then be used to generate or otherwise update a governing condition, an outcome(s) associated with the governing condition, or other data associated with a set of governing conditions.

In some embodiments, the process 2800 may include obtaining the governing conditions based on the set of documents, as indicated by block 2808. The governing conditions may be obtained using a set of NLP operations, such as those performed by the NLP subsystem 2714. In some embodiments, using the set of NLP operations may include operations such as routing or stemming the words of the set of documents. Using the set of NLP operations may include encoding words, phrases, sentences, or other bodies of text into vectors, where the functions used to encode the words or other components of text into vectors may include the use of neural network encoders or decoders. In some embodiments, a pre-trained neural network may be used, such as a neural network based on the BERT encoding system. In some embodiments, an ontology graph may be used to associate or categorize natural language statements to identify entities, entity categories, resources, resource types, relationships, thresholds, threshold types, rights, obligations, prohibitions, or the like. In some embodiments, some or all of the set of governing conditions may be directly obtained from a computer-interpretable document without requiring the use of a learning-based NLP system. Furthermore, as described above, some embodiments may use one or more operations described in patent application 63/034,255, which is incorporated by reference, to determine a set of governing conditions from the set of documents. For example, some embodiments may use the probabilistic identification system to identify a set of governing conditions from a trading regulation written as a natural language document.

In some embodiments, a plurality of documents may be analyzed. In some embodiments, the plurality of documents or the set of governing conditions determined from the plurality of documents may be ranked based on precedence values. A precedence value may be assigned to a document or its associated governing condition(s) when the document is used to determine the associated governing condition(s). Alternatively, or in addition, a precedence value may be assigned or updated to be associated with a set of governing conditions after the set of governing conditions are determined. In some embodiments, updating a precedence value of a document or governing condition from an initial precedence value to a new precedence value may cause a re-determination of a hierarchy of governing conditions. Additionally, some embodiments may use the updated precedence value(s) to determine a new set of dominant governing conditions, as described further described below. Additionally, some embodiments may update the set of governing conditions when an additional document is obtained. For example, some embodiments may generate a first set of governing conditions based on three natural language governing documents. After obtaining an additional natural language governing document, some embodiments may update the first set of governing conditions to include governing conditions determined from the additional document, which may cause one or more operations below to be performed with respect to the updated set of conditions.

In some embodiments, the precedence value may indicate how governing conditions determined from a first document may relate to other governing conditions, such as governing conditions from other documents. For example, the first document may be submitted with a first precedence value "3" that is mapped to the precedence category "company policy," and a second document may be submitted with a second precedence value "5" that is mapped to the precedence category "state law." Some embodiments may assign "company policy" to governing conditions determined from the first document and assign "state law" to governing conditions determined from the second document. As further discussed below, these precedence values may be used to reconcile governing conditions addressing a same subject, where a hierarchy of precedence values may be used in cases of conflicting governing conditions. Various other types of precedence values may be used. For example, a precedence value may be assigned as a numeric value selected from a set of integer values between 1 and 10.

The set of governing conditions may be stored in one or more forms in computer memory. In some embodiments, a set of governing conditions may be stored in the form of a directed graph or otherwise associated with a directed graph described in this disclosure. For example, some embodiments may generate a set of arrays representing vertices and edges, where each vertex may be associated with a governing condition. In some embodiments, a vertex may be associated with information associated with the governing condition of the vertex, such as an outcome of satisfying or not satisfying the governing condition. Alternatively, or in addition, the set of governing conditions may be stored as a data table or other database structure, where each record of the data table may encode a governing condition or information associated with the governing condition, such as a precedence value, a rank in a hierarchy of conditions, a list of entities or entity categories to which the governing condition applies to, or the like.

As discussed further below, the set of governing conditions may be associated with one or more entities of the smart contract program. For example, a first governing condition of the set of governing conditions may be encoded as a requirement that any entity of a set of entity categories must have a minimum amount of a resource. In some embodiments, a first governing condition may be determined to be violated based on a satisfaction of the first governing condition. Alternatively, some embodiments may determine that a governing condition is violated based on the governing condition not being satisfied. Some embodiments may determine whether the satisfaction of a governing condition causes violation or non-violation based on a default setting, a category associated with the governing condition, a condition-specific parameter, or the like. In some embodiments, the violation of the first governing condition may cause a change in program state based on the violation outcome. For example, in some embodiments, violation of a first governing condition may cause a program state to be suspended or may prevent transactions of a certain type from being performed.

In some embodiments, a governing condition may encode a restriction on the parameters of a transaction between different entities. For example, a first condition of the set of governing conditions may be encoded as a requirement that a first entity provides a minimum amount of resources or a maximum amount of resources to a second entity. In some embodiments, a condition of the set of governing conditions may be encoded as a restriction on the type of entities that may interact with each other or with a community of entities. For example, a first condition of the set of governing conditions may be encoded as a requirement that each entity of a smart contract agreement is verified by an agent, where the verification by the agent may be performed by a written or digitally-encoded message associated with each entity. Operations to obtain the governing conditions associated with a specific entity are described further in the descriptions corresponding to FIG. 19. Some embodiments may explicitly indicate or otherwise associate a parameter with one or more of the obtained governing conditions to indicate whether the satisfaction or non-satisfaction of the governing condition results in a violation of the governing condition. The parameter may be initialized or updated by an explicit value encoded in a computer-interpretable governing, set based on an NLP system decision, or the like.

In some embodiments, the process 2800 may include obtaining a cross-program entity identifier of an entity, as indicated by block 2816. In some embodiments, the cross-program entity identifier (sometimes known as a "global unique identifier" or "GUID") for an entity may be unique with respect to other entity identifiers in a decentralized computing platform or a domain within the decentralized computing platform. For example, some embodiments may store the cross-program entity identifier "xkl32115_xa" in a set of cross-program identifiers in direct association with a first entity, where no other entity registered in the decentralized computing platform is directly associated with the cross-program entity identifier "xkl32115_xa" in the set of cross-program identifiers.

In some embodiments, a mapping or set of mappings may exist between the cross-program entity identifier and a set of program-specific entity identifiers recorded as participating in a set of self-executing protocols (e.g., a set of smart contract programs) or transactions occurring in the context of the set of self-executing protocols. For example, where a first entity identifier of a first contract program executing on a decentralized platform and a second entity identifier of a second contract program may both be associated with the same cross-program entity identifier. In some embodiments, the cross-program entity identifier may be confidential or otherwise not accessible to an unauthorized entity, even if the unauthorized entity is capable of viewing a program-specific entity identifier mapped to the cross-program entity identifier. For example, each of the entities participating in a contract program may be unable to view any cross-program entity identifiers other than their own, even if they can view program-specific entity identifiers for the other entities participating in the contract program. In some embodiments, the cross-program entity identifier may be encrypted using one or more various encryption algorithms, such as one based on a DES encryption, AES encryption, RSA encryption, another encryption algorithm described in this disclosure, or the like.

In some embodiments, a set of cross-program entity identifiers may be stored in persistent storage of one or more nodes of a decentralized computing platform. For example, the set of cross-program entity identifiers may be stored in persistent storage of some or all of the computing devices of a decentralized computing platform. Alternatively, or in addition, the set of cross-program entity identifiers may be stored on a persistent memory of an on-premises server or a centralized cloud computing service. Some embodiments may store the cross-program entity identifiers in a database with an associated public entity identifier or set of public entity identifiers.

In some embodiments, an entity may be assigned to two different cross-program entity identifiers. For example, a first entity having a first cross-program entity identifier may acquire a second entity having a second cross-program entity identifier. After the first entity acquires the second entity, some embodiments may associate the second cross-program entity identifier to the first entity via a pointer, an associative array, a shared record in a database, or the like. As discussed further below, some embodiments may re-analyze a governing condition originally determined to be applicable to the second entity to determine if the governing condition is applicable to the first entity. Some embodiments may indicate that the second cross-program entity identifier is deprecated after associating the second cross-program entity identifier to the first cross-program entity identifier.

In some embodiments, the process 2800 may include determining a set of entity-applicable governing conditions based on the cross-program entity identifier, as indicated by block 2820. A set of entity-applicable governing conditions may be determined by determining which subset of governing conditions from a set of governing conditions apply to an entity based on the entity's corresponding cross-program entity identifier. In some embodiments, the cross-program entity identifier may be associated with a set of entity categories usable for determining which governing conditions may be applied to the entity identified by the cross-program entity identifier. Entity categories may include entity categories common to a general field of industry, entity categories shared by multiple smart contract program entities, entity categories used by entities of a specific smart contract program, or entity categories specific to a single entity, or the like. Example entity categories may include terms such as "American Banking Entity," "Foreign Agent," "SaaS Provider," "Computing Resource Provider," or the like. Furthermore, as discussed elsewhere, while some governing conditions may be determined to be violated based on the conditions(s) of the governing condition being satisfied, other governing conditions may be determined to be violated based on the condition(s) of the other governing conditions.

Some embodiments may determine whether a governing condition is applicable to a cross-program entity identifier based on whether an entity category is listed by the governing condition or listed as a subcategory of a category listed by the governing condition. Some embodiments may determine that a first category is a subcategory of a second category based on an ontology graph, a data table, a truth table, another symbolic AI data structure, or the like. For example, a first governing condition may list "non-US entity" as an entity category, and an ontology graph may lists the entity category "Canadian Company" as being a subset of the category "non-US entity." Some embodiments may determine that a first cross-program entity identifier is associated with the entity category "Canadian Company," and that this entity category is a subcategory of the category "non-US entity" based on the ontology graph. In response, some embodiments may determine that the first governing condition is an entity-applicable category for the first entity.

In some embodiments, a first governing condition may indicate that an entity has a right to perform an action, and a second governing condition may indicate that the entity is prohibited from performing the action. Some embodiments may detect a conflict between a pair of governing conditions based on them being associated with different category labels from a set of mutually exclusive category labels and a shared entity or entity category, a shared indicated action, a shared indicated resource, or some other similarity between the conditions or outcomes of the two governing conditions. For example, some embodiments may obtain governing conditions associated with one of a set of mutually exclusive category labels "rights," "prohibitions," and "obligations." Some embodiments may detect a conflict between two governing conditions if the first governing condition is labeled with the category label "rights" to indicate that a first entity has a right to accelerate a repayment and the second governing condition is labeled with the category label "prohibitions" to indicate that the first entity is prohibited from accelerating the repayment.

Alternatively, or in addition, some embodiments may determine that two governing conditions may be combined based on a determination that the two governing conditions have the same category label from a set of mutually exclusive category labels. For example, some embodiments may determine that a first and second governing conditions are both labeled with the category label "prohibition" and indicate, respectively, that a first entity is prohibited from allocating more than 10 terabytes and 100 terabytes of memory from a particular server system. In response, some embodiments may combine the first and second governing conditions by either adding the prohibited amounts (e.g., prohibiting the allocation of 110 terabytes) or selecting the greater of the prohibited amounts (e.g., prohibiting the allocation of 100 terabytes). Similar operations to sum quantities of governing conditions or select a greater (or lesser) quantity may be performed when two governing conditions are labeled as "rights," "obligations," or other category labels from a set of mutually exclusive category labels.

In some embodiments, the process 2800 may include determining a hierarchy of governing conditions based on the set of entity-applicable governing conditions, as indicated by block 2824. Some embodiments may determine a hierarchy of governing conditions based on precedence values associated with the set of entity-applicable governing conditions. For example, a set of precedence values may be encoded by a sequence of precedence categories '["branch policy", "company policy", "city regulation," "state regulation," "federal regulation"],' where each precedence category is mapped to a precedence value. In some embodiments, the sequence of precedence categories may be mapped to a sequence of precedence values such that the next category is mapped to a greater precedence value than the value mapped to the previous category (e.g., "branch policy" is mapped to a lower precedence value than the precedence value of "company policy). In some embodiments, a greater precedence value may correspond to a greater level in a hierarchy of governing conditions, which may result in the governing condition having a greater hierarchy level acting as an overriding condition. An overriding condition may negate or otherwise take precedence over a governing condition that is detected to conflict with the overriding condition.

Some embodiments may use a precedence value as a precedence category. For example, the precedence value "1" may be associated with a first governing condition as a precedence category of the governing condition. While the above discloses greater precedence values corresponding to having a greater precedence in a hierarchy of governing conditions, some embodiments may instead assign lower precedence values to have a greater precedence in a hierarchy of governing conditions. Furthermore, while the above discloses precedence values in numbers, other forms of precedence values are possible, such as letters, a sequence of enumerated types, a directed graph encoding category values or category labels, or the like.

Some embodiments may use a hierarchy of governing conditions to resolve a detected conflict between a plurality of governing conditions. For example, a first governing condition associated with the precedence category "company policy" may encode a right of a first entity to monitor the data traffic of a second entity by setting a viewing authority of the first entity to the boolean value "True." A second governing condition associated with the precedence category "state law" may include a prohibition on any entities from monitoring the data traffic of any other entity. As discussed above, some embodiments may determine that the first governing condition and the second governing condition are in conflict with respect to each other based on shared entity categories and an encoded action of "permit monitoring." Some embodiments may resolve conflicts by determining which of the governing conditions takes precedence over the other based on the hierarchy of governing conditions (e.g., based on a determination of which governing condition has a greater precedence value). For example, some embodiments may determine that the precedence category "state law" is mapped to a greater precedence value than the precedence value mapped to the category "company policy." In response, some embodiments may remove the first governing condition, set the first governing condition as deprecated, or otherwise indicate that the first governing condition is enforcing a condition that conflicts with a greater precedence governing condition.

In some embodiments, a first governing condition and a second governing condition, or their respective outcomes, may be combined. For example, a first governing condition may include or otherwise be associated with a first outcome specifying that a first entity is to be penalized with a 500 unit loss if the first entity is detected to have had a transaction with a prohibited second entity. A second governing conditions of the first entity may include or otherwise be associated with a second outcome specifying that the first entity is to be penalized with a 1000 unit loss if the first entity is detected to have had a transaction with the prohibited second entity. Some embodiments may consolidate these two outcomes of governing conditions into a single conditional statement penalizing the first entity with a 1500 unit loss if the first entity is determined to perform the transaction with the prohibited second entity.

In some embodiments, the process 2800 may include initializing a set of variables, geolocation parameters, or graph portion templates for use based on the set of entity-applicable governing conditions, as indicated by block 2828. Initializing a variable may include determining whether the variable is already an existing parameter in a program state or determining a set of functions usable to determine the variable from program state. By initializing variables, geofences, geolocation parameters, graph portion templates, or other variables used by a governing condition, some embodiments may provide a significantly richer and enforceable set of governing conditions.

Some embodiments may use a decision tree, decision support system, ontology graph on other data structure to determine whether a set of variables is already stored in program data or whether a set of functions are required to compute the variable from values stored in program data.

For example, the term "cumulative power allocation" may be associated with the category "quantitative value" in an ontology graph. Some embodiments may then obtain a governing condition encoding the instructions, "the first entity must allocate up to 1000 units of power to the second entity per month." In response, some embodiments may generate a new variable "cumulative power allocation" to keep track of how many units of power the second entity consumes for the month, which may be used to determine if the governing condition is satisfied. Alternatively, or in addition, some embodiments may determine that a variable encoded in a governing condition is already stored in program data and, in response, include instructions to use the pre-stored variable. For example, a governing condition may include instructions to use a pre-stored variable "monthly_CPU_core_use" with an associated descriptor of "monthly memory CPU core usage." Some embodiments may then determine that a first variable that may be named "monthly_CPU_core_use" or may otherwise indicate a monthly CPU core usage is stored in memory for a smart contract program. In response, some embodiments may use the first variable when determining whether the governing condition is satisfied. In some embodiments, the set of variables may be a sequence of variables. For example, a governing condition may include a condition based on the detection of data use outside of data use patterns corresponding with video streaming, where data use patterns corresponding with video streaming are associated with bandwidth uses oscillating in a sinusoidal pattern.

Some embodiments may obtain a governing condition that includes a set of geolocation parameters. A geolocation parameter may include a set of global positioning system (GPS) coordinates, a geofence defining a physical boundary, a set of geographic locations, or the like. For example, some embodiments may obtain a governing condition encoding a restriction on a geographic location titled "location 1" and determine a geofence based on the value of "location 1." In some embodiments, a set of geographic coordinates or related values forming a geofence may be encoded into a governing condition. Alternatively, or in addition, some embodiments may refer to a value(s) stored in a geographic information system (GIS) to determine a place or a geofence for the place. For example, some embodiments may obtain a governing condition restricting a transaction(s) with entities associated with a region (e.g., a country, a state, a city, a neighborhood, or the like), where the governing condition includes the region's name. Some embodiments may communicate with the API of a GIS system such as Google Maps to determine the boundary of the region based on the name. Some embodiments may use the boundary as a geofence to determine if a geographic location associated with an entity or transaction associated with the entity falls inside the geofence.

In some embodiments, a governing condition may encode a graph portion template or otherwise be associated with a graph portion template. For example, a governing condition may include a set of vertices and edges representing vertices and edges of a graph portion template. Alternatively, or in addition, a governing condition may include a record index identifier pointing to a record in a library of graph portion templates. In some embodiments, the governing condition may encode a graph portion template that represents a behavior to be explicitly restricted or allowed. For example, a graph portion template encoded in a governing condition may include three vertices indicating that a set of conditional statements associated with the vertices have been satisfied, where the governing condition prohibits the set of conditional statements from being satisfied. In response, some embodiments may prevent a transaction from causing the satisfaction of the set of conditions, generate a GUI warning indicating that the governing condition is being violated, generate or store a tag indicating that the governing condition has been violated or is at risk of being violated, or the like.

In some embodiments, a governing condition may be based on values distributed across different programs. For example, some embodiments may determine a set of score changes associated with a first entity by detecting the set of score changes. Additionally, or independently, some embodiments may determine which set of program-specific entity identifiers are associated with the score changes. Additionally, or independently, some embodiments may determine the cross-program entity identifier associated with each of the program-specific entity identifiers. By determining using the cross-program entity identifier, cross-program entity-applicable conditions may be tested even when the participants of smart contract programs are anonymized. Some embodiments may determine whether a sum based on score changes satisfies a threshold value. For example, a first and second score change may be detected in a first and second contract program, where the first and second contract programs identify participating entities by program-specific entity identifiers. Some embodiments may determine that each of the score changes is associated with the same entity based on associations between the first and second program-specific entity identifiers and a cross-program entity identifier. Some embodiments may then determine whether the entity satisfies a governing condition based on the first and second score changes. For example, some embodiments may determine whether an entity satisfies a governing condition restricting a maximum or minimum net score change over a period of time (e.g., a maximum amount of financial currency acquired over a one week period, a minimum amount of electrical power provided in a one day period, etc.). Some embodiments may determine a summation of the score changes and compare the summation to a threshold value to then determine if the governing condition is satisfied.

In some embodiments, the process 2800 may include performing one or more operations described by blocks 2840, 2844, 2854, or 2860 for each respective smart contract program of the obtained set of smart contract programs, as indicated by block 2832.

In some embodiments, the process 2800 may include determining whether the set of governing conditions is violated based on a set of events, variables, match with a graph portion template, or data stored in program state of a smart contract program as indicated by block 2840. As described above, a governing condition may include various types of conditions. In some embodiments, a governing condition may include a condition based on whether a variable satisfies a threshold. For example, a first governing condition may include a condition based on whether a score change associated with an event causes satisfies a minimum score threshold to determine whether the first governing condition is satisfied. Alternatively, or in addition, a governing condition may include instructions to determine whether a geographic location associated with an entity satisfies a location threshold represented by or otherwise determined from a geolocation parameter. For example, a second governing condition may include instructions to determine whether a geographic location of an entity or a geographic location where a transaction is executed is associated with a restricted location to determine whether the second governing condition is satisfied.

In some embodiments, a determination may be made that a governing condition is violated based on a detected violation occurring in a simulated outcome. For example, some embodiments may obtain an event indicating that a transaction between a first entity and a second entity of a smart contract program is about to occur based on a confirmation between the first entity and the second entity to allow the transaction during the execution of the smart contract program. The event may be simulated and tested with each of a set of governing conditions to determine if any of the governing conditions are violated. For example, some embodiments may perform a lookup operation based on a first cross-program entity identifier associated with the first entity and a second cross-program entity identifier associated with the second entity to find an entity-applicable governing condition associated with either the first entity or second entity. Some embodiments may then simulate an outcome based on the program state of the smart contract program and the event to determine whether the entity-applicable governing condition is violated by the transaction in the simulated outcome. In response to a determination that the governing condition is violated by the transaction in the simulated outcome, some embodiments may take action as if the governing condition is violated.

In some embodiments, operations of the process 2800 may be performed concurrently with a smart contract program capable of updating program state based on a detected event. In some embodiments, the event may be encoded in an event message received by an application executing the respective contract program. For example, a distributed application executing the respective contract program may receive a first event message at an API, where the first event message indicates an event corresponding to a first entity transferring a set of digital assets to a second entity. Some embodiments may obtain an event based on an indication that the event is about to occur, and may simulate the occurrence of the event to determine whether one or more governing conditions would be violated before the event actually occurs. Alternatively, or in addition, obtaining an event may include simulating the occurrence of a possible event. For example, some embodiments may obtain an event indicating that a first entity will fail to fulfill its obligations to a second entity based on a simulation result.

In some embodiments, the governing condition may be violated based on a program state resulting from an event. For example, a governing condition may include a requirement that an allocated reserve score for a first entity is greater than 10% of a total transaction amount associated with the score. After a first event, the total transaction amount may result in the first entity having an allocated reserve score less than 10% of a total transaction amount. In response, some embodiments may determine that the first governing condition is violated.

Some embodiments may include additional operations to look through previous events or program states associated with previous events. For example, some embodiments may search through some or all of the events encoded in the history of a smart contract program to determine if a governing condition associated with the contract program is violated. In addition, or alternatively, some embodiments may search through a history of program states of a smart contract program to determine if any of the governing conditions were violated. While the above describes the occurrence of an event, some embodiments may look through a history of previous events previous program states of a smart contract program without requiring a new event to have occurred. In response to a determination that a governing condition was violated, operations of the process 2800 may proceed to block 2844. Otherwise, operations of the process 2800 may proceed to operations described by block 2860.

In some embodiments, the process 2800 may include performing one or more outcomes associated with the violated governing condition, as indicated by block 2844. In some embodiments, the outcome may be explicitly encoded in the governing condition. For example, the governing condition may include an outcome instructing an application to penalize the first entity by an amount, restrict the first entity from interacting with any other entities, send a message to a third-party observer, or the like. Alternatively, or in addition, some embodiments may include instructions to perform a set of default operations in response to the violation of a governing condition. For example, some embodiments may send a message to an entity acting as an oversight agent in response to a violation of any governing conditions associated with the precedence value "government law."

In some embodiments, a governing condition may have been violated in a simulated outcome instead of being violated during an actual execution of the program state. The outcome of a simulated violation may result in the generation of a warning message that the governing condition may be violated. Alternatively, or in addition, an outcome of a simulated governing condition violation may include simulated penalties, simulated consequent events, or other simulated possible outcomes to be stored in a record of directed graph simulation. Furthermore, in some embodiments, a warning may be sent to an entity based on a score or other value of a transaction meeting a warning threshold associated with a governing condition. For example, some may first determine a warning threshold based on a value included in a governing condition, such as determining a warning threshold of 80% based on a governing condition having a threshold of 100%. Some embodiments may send a warning message to a first entity based on a determination that a score (e.g., a cumulative amount of a digital asset being traded, a monthly total of computing resource use, or the like) of a transaction involving the first entity satisfies the warning threshold of 80%.

Some embodiments may hold a transaction in a pending state in response to a determination that a governing condition is violated, where actions taken during the transaction may be reversed while the transaction is held in the pending state. For example, some embodiments may reverse the transfer of a digital asset, de-allocate a resource, or otherwise undo an exchange between a set of entities for a transaction while the transaction is pending. Some embodiments may wait for a threshold period of time after making a first determination that a set of governing conditions are violated and re-determine whether the set of governing conditions are violated. For example, after determining that a governing condition requiring that a first entity be authenticated by a third-party agent is not satisfied, resulting in an indicated violation of the governing condition, some embodiments may wait for 10 minutes and then re-determine whether the first entity is authenticated by the third-party agent. In response to a determination that the governing condition is now satisfied, the pending transaction may be allowed proceed, where allowing the pending transaction to proceed may include setting a variable to indicate that the pending transaction has been confirmed or persisting the transaction to a persistent storage device of a decentralized computing platform (e.g., via storage in a distributed, tamper-evident ledger).

In some embodiments, a transaction between a set of entities may require additional actions before the transaction may be permitted in cases where a governing condition is violated by an entity. Some embodiments may require verification for a transaction from a third-party entity indicating that a pending transaction is permitted. In some embodiments, the requirement may be encoded as a governing condition or may be encoded as a conditional statement that is part of a smart contract program. For example, a first entity may allocate a resource to a second entity during a pending transaction between the first entity and the second entity, where the transaction data of the pending transaction may then be sent to a third-party entity for validation. Some embodiments may then determine whether the transaction is valid based on the cross-program entity identifiers of the first entity, the second entity, and data associated with each entity. In some embodiments, the data may include the first entity having an available amount of funds, the second entity having a proof of ownership of an asset, or the like. Some embodiments may permit the occurrence of the transaction after validation by the third-party entity. Permitting the occurrence of the transaction may include indicating that a pending transaction has been validated in a persistent storage, permitting data from a pending transaction to be stored in a data table of verified transactions, storing data from the pending transaction as a transaction verified by the third-party entity in a distributed, tamper-evident ledger, or the like.

In some embodiments, the process 2800 may include determining whether any additional contract programs are available for processing, as indicated by block 2854. In some embodiments, a system may determine that additional smart contract programs are available based on a determination that a loop used to cycle through each contract program in a list of obtained smart contract programs has not reached a termination condition. In response to a determination that additional smart contract programs are available for processing, the process 2800 may return to the operations described for block 2832. Otherwise, operations of the process 2800 may proceed to the operations described for block 2860.

In some embodiments, the process 2800 may include updating a set of entity profiles or other program data based on the status(es) of the set of governing conditions, as indicated by block 2860. Some embodiments may update a status of a profile for an entity associated with a cross-program entity identifier to indicate whether the entity has violated a governing condition. For example, some embodiments may determine that an event detected to have violated a first governing condition was caused by an action of a first entity. In response, some embodiments may update a first entity profile status that is associated with the first entity with an indication that the first entity has violated the first governing condition. In some embodiments, non-violation of a condition may cause the updating of a status. For example, some embodiments may store an status indicator that the entity has not violated any of a set of governing conditions.

Some embodiments may generate a profile for an entity in response to a determination that an existing profile for the entity is not found, where the profile may be referenced by, include, encode, or otherwise be associated with the entity's cross-program entity identifier. During the generation or updating of an entity, the entity may be characterized or otherwise associated with an entity profile storing data about the entity, where the entity profile may be referenced by the cross-program entity identifier. For example, some embodiments may obtain data about an entity by determining a cross-program entity identifier using a program-specific entity identifier that maps to the cross-program entity identifier or is otherwise associated with the cross-program entity identifier. Some embodiments may determine data from a corresponding entity profile using the cross-program entity identifier as an index value. Some embodiments may obtain a document to verify the identity of an entity. For example, some embodiments may obtain a natural language document that includes identity information for an entity and for a verifying agent indicated as capable of confirming the identity information.

Some embodiments may use a using an NLP system to store a verifying agent identifier, a verifying agent address, an entity name, or other value associated with a cross-program entity identifier. In some embodiments, the verifying agent address may include an electronic message destination or access information, such as a network port, a web address, application program interface (API) connection information, or the like. Some embodiments may then verify the identity of the entity by sending a first message to the verifying agent to the API or other electronic message destination indicated by the verifying agent address, where the message may include the entity name or information associated with the entity name such as a digital signature, a physical geographic location, a biometric reading, or the like. Some embodiments may then receive a response message from the verifying agent indicating that the entity name is valid or that the information associated with entity name is valid. In response, some embodiments may set the first profile associated with the first cross-program entity identifier as a verified profile.

In some embodiments, updating the set of entity profiles may include updating a set of entity profiles of a set of counterparty entity of a condition-failing entity. For example, some embodiments may determine that a first entity is responsible for failing a governing condition, such as by causing the generation of a graph portion matching a graph portion template indicated as a prohibited graph pattern by a governing condition. In response, some embodiments may update the entity profile of a counterparty entity or send a notification message to the second entity. In some embodiments, the second entity may be a designated monitoring entity, system administrator, government entity, or the like. Alternatively, or in addition, some embodiments may select the second entity based on a determination that the second entity has had a transaction with the first entity or that the second entity is associated with the first entity via an entity list of a smart contract program. Some embodiments may update the profile of the second entity or send a notification message to the second entity indicating that the first entity violated a governing condition even if the second entity was not determined to have violated any governing conditions. Some embodiments may include a governing condition that prohibits an entity from having more than a threshold number of transactions with violating entities. By keeping track of other entities having had transactions or possible future transactions with the entities determined to have violated a governing condition, significant compliance of the smart contract programs with a set of governing conditions may be increased.

In some embodiments, a cross-program entity identifier stored in an entity profile or otherwise accessible via the entity profile may be encrypted. In some embodiments, the entity profile may be used to verify that an entity identified by a cross-program entity identifier is verified as meeting a set of governing conditions without other program-specific entity identifiers associated with the entity even if one program-specific entity identifier is known. For example, a first entity may send a query to retrieve the profile of a second entity based on a first program-specific entity. In response, data from the profile of second entity may be provided to the first entity, the data including a verification that the first entity satisfies or has satisfied each of a set of governing conditions without disclosing the cross-program entity identifier of the second entity or other program-specific entity identifiers of the second entity. By providing a means of verifying an entity's ability to satisfy a set of governing conditions without requiring the disclosure of a cross-program entity identifier, some embodiments may increase the security of a decentralized computing platform when executing smart contract programs or other symbolic AI programs.

Figure 19:
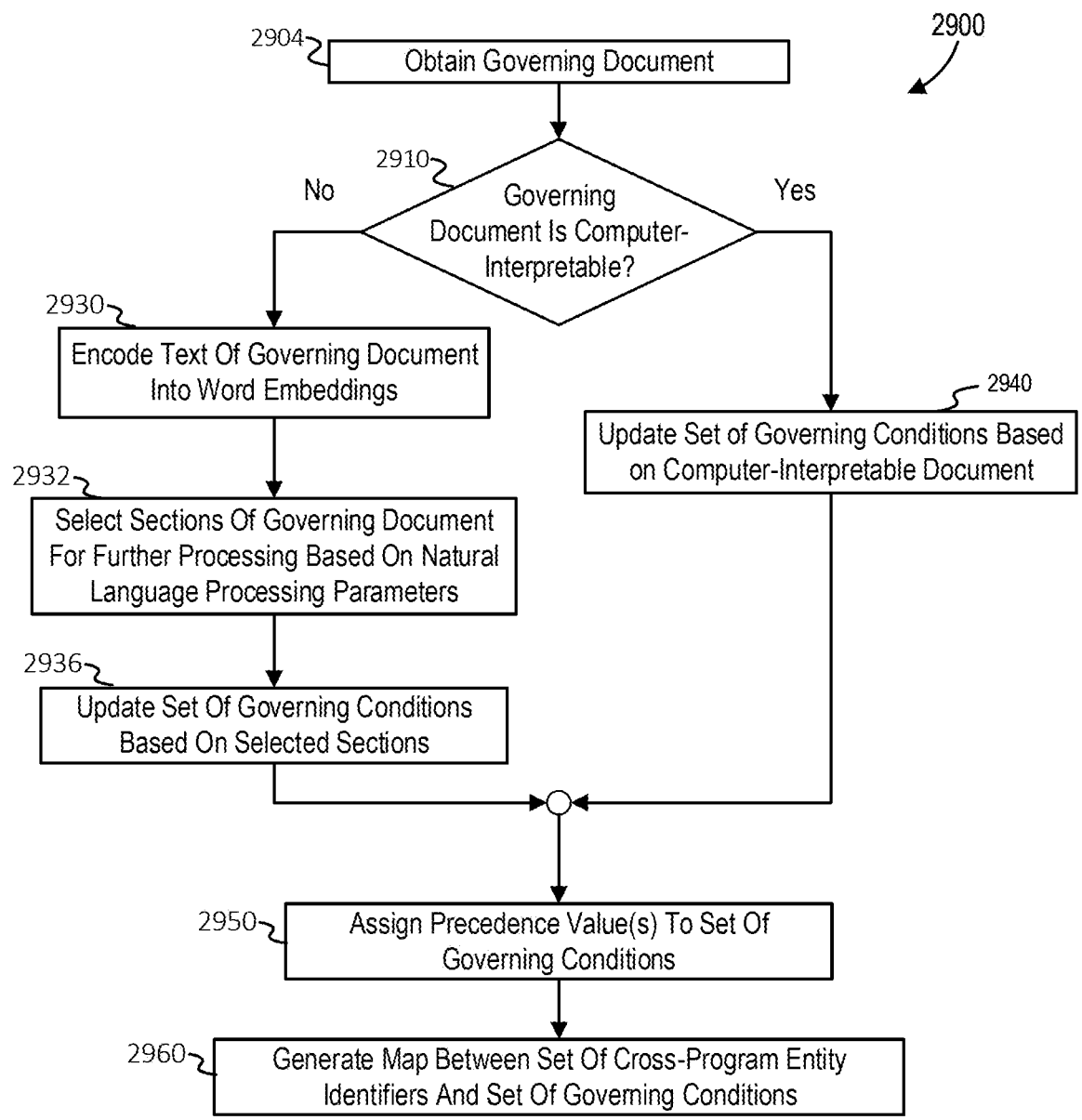
FIG. 19 shows a flowchart of operations to determine a set of governing conditions based on obtained documents, in accordance with one or more embodiments.

FIG. 19 shows a flowchart of operations to determine a set of governing conditions based on obtained documents, in accordance with one or more embodiments. In some embodiments, the process 2900 may include obtaining a set of governing documents, as indicated by block 2904. In some embodiments, obtaining the set of governing documents may include obtaining a natural language document or a computer-interpretable document using methods similar to or the same as those described above for block 2804.

In some embodiments, the process 2900 may include determining whether the set of governing documents is computer-interpretable, as indicated by block 2910. Some embodiments may determine that the set of contract information is computer-interpretable based on a value stored in the set of contract information. For example, the set of contract information may include a JSON file including a field and value pair "ROP system compatible: True" and, in response, determine that the contract information is computer-interpretable. Alternatively, or in addition, some embodiments may analyze the content of a governing document to determine whether the content matches one or more known patterns categorized as being computer-interpretable. For example, some embodiments may determine that a set of contract information is computer-interpretable in response to the text of the set of contract information matching a pattern associated with a compatible Ricardian contract implementation. In response to a determination that the contract information is computer-interpretable, the process 2900 may proceed to operations described for block 2930. Otherwise, operations of the process 2900 may proceed to block 2940.

In some embodiments, the process 2900 includes encoding text in the governing document into a set of word embeddings, as indicated by block 2930. Some embodiments may first stem or lemmatize the words of a document before encoding text in the governing document to determine embeddings. In some embodiments, each word embedding of the set of word embeddings may include one or more values, such as a set of values represented as a vector. Some embodiments may use word2vec or a similar context-independent embedding model or another neural network-based embedding model to compute word embeddings. Some embodiments may use other context-independent embedding models (e.g., non-neural network-based models) such as the Global Vectors for Word Representation model ("GloVe") to determine word embeddings. Alternatively, or in addition, some embodiments may use context-dependent embedding models such as ELMo, BERT, Context2Vec, or the like to determine word embeddings. In some embodiments, a system may apply a plurality of embedding models to determine embeddings.

In some embodiments, the process 2900 may include selecting a set of sections of the governing document for further processing based on natural language processing (NLP) parameters, as indicated by block 2932. In some embodiments, determining the set of interpretable sections may include detecting text headers and using the text headers to partition and use for the natural language processing subsystem. Some embodiments may detect the presence of a text header (or other text section delimiter) based on differences in a set of text spacing, set of font styles, set of text sizes, set of text formats, set of listed enumerations, or the like. For example, some embodiments may determine the presence of a text header based on an increase in font size with respect to a majority font size of the text of the governing document. Alternatively, or in addition, some embodiments may use a list of terms, data table, an ontology graph, or the like to determine the region of text to assign to a text section. Some embodiments may use spatial relationships between text. For example, some embodiments may determine that a spatial distance between a first section of text and a second section of text satisfies a text spatial distance threshold (e.g., by being greater than the text spatial distance threshold). In response, some embodiments may assign the words to separate sections of text. In some embodiments, the NLP parameters may include use weights, biases, a number of encoder or decoder layers, or the like. In some embodiments, a first set of NLP parameters may be transferred as part of a set of transfer learning operations from a first NLP system to a second NLP system.

In some embodiments, a section may be selected using an unsupervised learning model to possible entities, entity categories, transactions, transaction types, actions. The unsupervised learning model may include latent Dirichlet allocation (LDA), latent semantic analysis (LSA), probabilistic latent semantic analysis (PLSA), discrete principal component analysis (discrete PCA), or the like. For example, some embodiments may use an PLSA model to determine one or more entity categories of a section, where the entity categories may be listed as in an ontology graph. In some embodiments, the unsupervised topic modeling method may be combined with a supervised topic modeling method. For example, the prediction model may use a LDA2vec model, which may include use of an LDA model with a trained neural network embedding model. As further described below, once selected, a section may be further processed to determine a set of governing conditions from the selected section. By selecting specific sections, before applying other NLP operations, some embodiments reduce computing resource use. Furthermore, a governing condition may be mapped back to a selected section, where the mapping may be useful for verifying the accuracy of a computer-determined governing condition based on a comparison with the text of the selected section.

In some embodiments, the process 2900 may include updating a set of governing conditions based on the selected sections, as indicated by block 2936. Some embodiments may use an NLP model to determine a set of governing conditions from a selected section of text, where using the NLP model may include using one or more data pre-processing systems, prediction models, or data post-processing systems. In some embodiments, using a natural language processing model may include determining one or more word embeddings, as described above. In some embodiments, using a prediction model may include using an unsupervised prediction model. Alternatively, or in addition, using a prediction model may include using a supervised prediction model. In some embodiments, using a prediction model may include using both one or more supervised prediction models and one or more unsupervised prediction models. Additionally, some embodiments may apply one or more operations described in provisional patent application 63/034,255 to determine set of governing conditions. For example, some embodiments apply a triple extraction operation described in provisional patent application 63/034,255 to determine a governing condition.

In some embodiments, determining the governing conditions may include using entity categories, resource categories, or other categories associated with an ontology graph. The ontology graph may be used to associate or categorize natural language statements to identify entities, entity categories, resources, resource types, relationships, thresholds, threshold types, rights, obligations, prohibitions, or the like. In some embodiments, the ontology graph may be used to indicate hierarchical relationships between entities based on entity categories. For example, a first ontology graph may include a first ontology vertex labeled "category A entity" and a second ontology vertex labeled "domestic US entity." The first ontology graph may include an ontology edge from the first ontology vertex to the second ontology vertex, where the direction of the ontology edge may indicate that an entity listed as a "category A entity" is also a "domestic US entity."

In some embodiments, the ontology graph may be used to indicate hierarchical relationships between entities based on entity categories or hierarchical relationships between resources or resource types. For example, the NLP subsystem may obtain a natural language phrase, "the daily bandwidth of silver level entities must be less than 1 gigabyte per second to avoid mandatory data reduction" from a natural language document of a set of documents. In response, the NLP subsystem may determine a governing condition or a corresponding outcome of violating the governing condition. For example, the NLP subsystem may convert the natural language phrase into the computer-interpretable governing condition "IF silver_level AND (daily_bandwidth_allocation<1)" based on entity categories, resource categories, or relationships determined from the natural language phrase.

In some embodiments, the process 2900 may include updating a set of governing conditions based on the computer-interpretable governing document, as indicated by block 2940. As described above, values, names, and other elements may be parsed from a computer-interpretable governing document to generate or otherwise update a set of governing conditions. For example, some embodiments may obtain a JSON document that includes fields for a contract identifier, a first entity identifier, a second entity identifier, an obligation for the second entity to allocate a resource to the first entity, and a penalty on the second entity for failure to allocate the resource. Some embodiments may parse the fields of the JSON document to generate a set of governing conditions using identifiers, values, descriptors, arrays, functions, or other elements that are similar or identical to those parsed from the JSON document.

In some embodiments, the process 2900 may include assigning a set of precedence values to the set of governing conditions, as indicated by block 2950. In some embodiments, a precedence value for a governing condition may be determined based on a tag or categorization of the governing condition. For example, a precedence category "state law" may be assigned to a governing document during an upload of the governing document and the precedence value associated with the label "state law" may be assigned to the governing document. Alternatively, or in addition, some embodiments may use a pre-defined vocabulary, an ontology graph, or another symbolic AI component to assign a precedence value to the set of governing conditions. For example, some embodiments may provide the title "CFR TITLE 32" to a rules engine of a symbolic AI system to determine that governing conditions determined from the governing document associated with "CFR TITLE 32" is associated with a precedence category "USA Federal Regulation" and its corresponding precedence value "5." Alternatively, or in addition, some embodiments may use a machine-learning system to determine a precedence value. For example, some embodiments may use a neural network to analyze the title and text of a governing document to determine a precedence category "State Law," which may be mapped to a precedence value of "4" by some embodiments. As described above, the precedence values may be used to determine a hierarchy of governing conditions or otherwise reconcile conflicting or duplicative governing conditions.

In some embodiments, the process 2900 may include generating a map between a set of cross-program entity identifiers and the set of governing conditions based on entity data associated with the cross-program entity identifiers, as indicated by block 2960. In some embodiments, generating the map between the set of cross-program entity identifiers and the set of governing conditions may include generating, modifying, or otherwise updating a data table, associative array, or other multi-dimensional data structure to determine the set of governing conditions applicable to each entity. Some embodiments may generate a map between a cross-program entity identifier and a governing condition by directly associating the cross-program entity identifier to the governing condition in a record of a database. Alternatively, some embodiments may generate a map between a cross-program entity identifier and a governing condition via one or more indirect associations. For example, some embodiments may generate a map between a cross-program entity identifier and a governing condition by associating a program-specific entity identifier of a smart contract program with a cross-program entity identifier, where the governing condition is associated with the smart contract program. The map between the set of cross-program entity identifiers and the set of governing conditions may then be used to determine a set of entity-applicable governing conditions.

As described above, some embodiments may verify entities or entity transactions based a cross-program entity identifier. Additionally, some embodiments may perform other verification operations based on multiple vertices of one or more directed graphs, where each respective directed graph may encode its own respective codified agreement. Some embodiments may perform operations, such as those described further below, to decrease computational resource requirements when determining the effects that one or more events may have on a set of vertices.

Graph-Based Program State Notification

Multi-party self-executing protocols may cause the execution of many transactions between multiple pairs of entities, where the quantities, resource types, or other parameters of the transaction may be obtained from conditional statements of the self-executing protocol. As a self-executing protocol remains in execution, an entity may be faced with an increasingly significant number of terms, where the number of terms may be greater than five, greater than 10, greater than 100, or the like. These terms may regulate what the entity can do, must do, or is prohibited from doing. By expanding the number of possible actions to consider in any sequential analysis, some embodiments may increase the cost of computational analysis or predictions based on a program state of the in-execution self-executing protocol. Additionally, such systems may strain the cognitive load on a human representative of an entity, who may often be forced to make decisions based on the numerous terms under tight time constraints.

Some embodiments may use a self-executing protocol that associates categories with vertices represented by program state of the self-executing protocol. Some embodiments may aggregate parameters of actions indicated by these vertices based on the categories. Some embodiments may provide an entity summarized actions that an entity may perform, is obligated to perform, or is prohibited from performing based on that these aggregated parameters. Some embodiments may determine aggregated parameters based on subsets of vertices determined to have been triggered by an event message, activated by the event message, or otherwise indicated based on predicted paths through a directed graph.

Some embodiments may further determine one or more actions based on a set of private conditional statements associated with the entity. As further discussed in this disclosure, some embodiments may use data associated with vertices categorized as obligations, rights, prohibitions, or the like with private conditional statements associated with an entity. The resulting values may then be used to cause further actions associated with the entity. Alternatively, or in addition, some embodiments may send one or more values of an outcome program state caused by or otherwise based on an event message to an electronic address of a computing device of the entity. A program executing on the computing device of the entity may then use a value(s) of the computing devices as a part of its own internal electronic workflow. Some embodiments may then receive a private output from the computing device of the entity and use the private output to update one or more values in program state.

By generating aggregated parameters by using properties of a directed graph, such as categories associated with vertices, some embodiments may summarize or otherwise reduce the complexity of managing an entity's protocol-encoded tasks. These aggregated parameters may reduce multiple vertices representing prohibitions, rights, obligations, or the like into a summarized state having a fewer number of conditions. Some embodiments may then base predictions or analysis on this summarized state, which may subsequently reduce the computational cost of generating predictions based on the self-executing protocol. Alternatively, or in addition, some embodiments may present a user interface (UI) displaying values of a summarized state to reduce the cognitive load of interpreting and keeping track of rights, obligations, or prohibitions of an entity.

Figure 20:
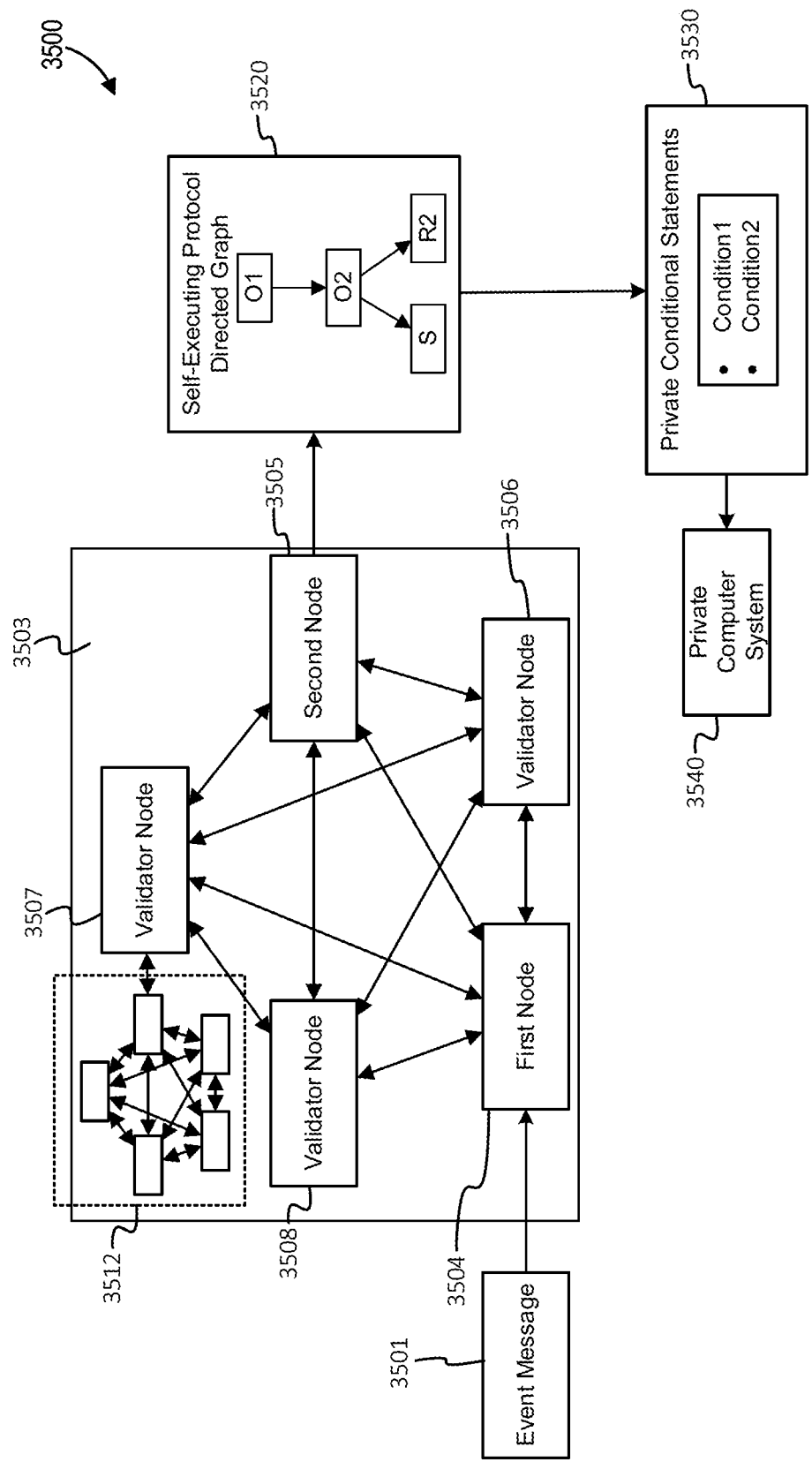
FIG. 20 depicts a logical and physical architecture diagram usable for determining aggregate parameters, in accordance with some embodiments of the present techniques.

FIG. 20 depicts a logical and physical architecture diagram usable for determining aggregate parameters, in accordance with some embodiments of the present techniques. The computing environment 3500 includes a peer-to-peer network 3503 that includes a first node 3504, a second node 3505, a set of validator nodes 3506-3508, and a second subdomain of nodes 3512, as further described below. In some embodiments, one or more of the nodes 3504-3508 or the second subdomain of nodes 3512 may be similar to one or more of the peer computing nodes 1202. As discussed elsewhere in this disclosure, the peer-to-peer network 3503 may implement a consensus operation between the set of validator nodes 3506-3508 to determine the validity of a message being distributed amongst the nodes of the peer-to-peer network 3503. Additionally, some embodiments may select different nodes of the peer-to-peer network 3503 to include or remove nodes from the set of validator nodes 3506-3508.

In some embodiments, the peer-to-peer network 3503 may include additional nodes, where the nodes of the peer-to-peer network 3503 may be organized into different subdomains of nodes. In some embodiments, messages or transactions may be validated or stored using a sharding model, where each of the subdomains of nodes may validate or store a portion of the messages or transaction taking place in a distributed program running on the peer-to-peer network 3503. For example, the nodes 3504-3508 may form a first subdomain, where the set of validator nodes 3506-3508 may be used in a consensus operation to determine the validity of the event message 3501 and store information on a distributed, tamper-evident ledger stored on the nodes of the peer-to-peer network 3503, where versions of the distributed, tamper-evident ledger may be stored on persistent storage of some or all of the nodes. In some embodiments, a second subdomain of nodes 3512 of the peer-to-peer network 3503 may validate a different event message or transaction. As further discussed in this disclosure, some embodiments may then perform one or more cross-subdomain operations to transfer data across different subdomains, such as between one of the nodes of the second subdomain of nodes 3512 and the validator node 3507 of the first subdomain of nodes.

Various consensus algorithms may be used to determine the validity of a message or the role of a node. In some embodiments, each of the validator nodes may determine that a message or transaction is valid based on validation rules that include determining whether the message includes one or more signature values. For example, some embodiments may determine whether the event message 3501 is signed with a signature value indicating that the event message is from a registered sensor or other registered information source. Additionally, as further discussed in this disclosure, some embodiments may determine the validity of a system based on whether the message includes duplicative information, is validated by an independent information source, is signed by an observer, or the like.

The event message 3501 may be received by the first node 3504. In some embodiments, data of the event message 3501 may then be sent from the first node 3504 to the second node 3505, where the second node 3505 may be registered to an entity that is affected by the event message 3501. The data may include the entirety of the event message 3501 or a set of parameters obtained from the event message 3501. As discussed in this disclosure, some embodiments may validate the event message 3501 to determine whether the event message 3501 satisfies a set of security criteria. Some embodiments may use the validator nodes 3506-3508 to determine the validity of a message. Some embodiments may also use a set of message validation criteria to validate whether an indicated event message is valid, where an event message may satisfy the set of security criteria but not satisfy a set of validation criteria. For example, some embodiments may determine that the event message 3501 may be valid based on a set of security checks, but determine that the event message 3501 is not validated based on a set of parameters encoded in the event message 3501 not being supported by any other information sources.

Some embodiments may begin operations to update program state based on the event message 3501. For example, some embodiments may update a directed graph 3520 encoded in a self-executing protocol based on the event message 3501. As further discussed in this disclosure, some embodiments may determine subsets of vertices and associated entities based on the event message and the vertices that it triggers or activates. The event message 3501 and the subsets of vertices selected from the directed graph 3520 may be used in conjunction with a set of private conditional statements 3530 of an entity to determine tasks for the entity to perform. Some embodiments may send one or more messages based on the resulting directed graph 3520, set of parameters encoded in the event message 3501, and set of private conditional statements 3532 a private computer system 3540 controlled by or otherwise associated with the entity. In some embodiments, the private computer system 3540 may send, your one or more APIs, values to one or more nodes of the peer-to-peer network 3503 two initiate, permit, modify, prevent, or otherwise update a transaction between the first entity and another entity.

While the above discloses the use of validator nodes, some embodiments may validate messages or transactions without separating the functionality of validator nodes from non-validator nodes. For example, some embodiments may use a peer-to-peer network of nodes such that each node of the network validates a message or transaction. Alternatively, or in addition, some embodiments may validate a message or transaction of a program operating on a centralized computing device or centralized platform.

Figure 21:
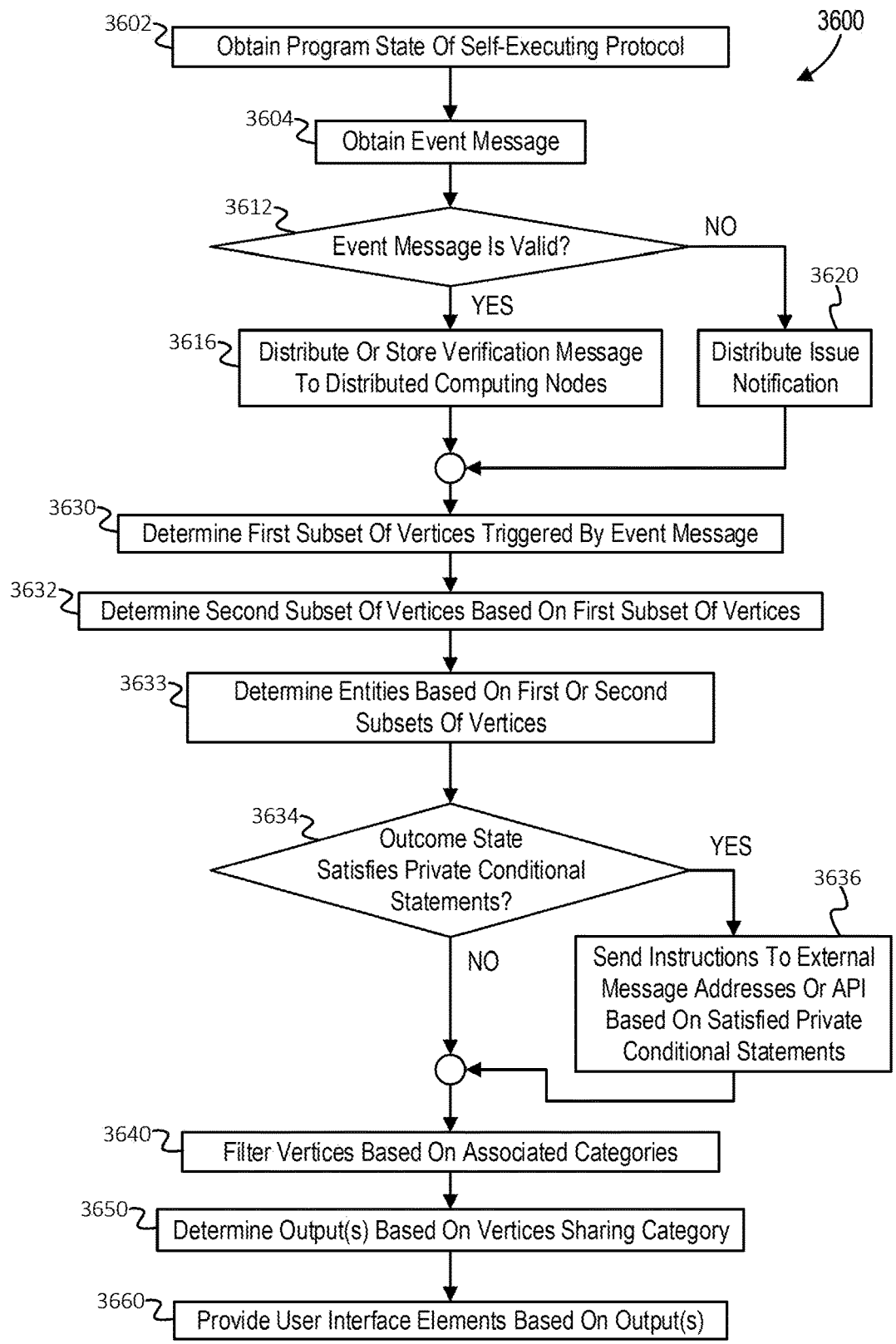
FIG. 21 is a flowchart of a process to determine aggregated parameters, in accordance with some embodiments of the present techniques.

FIG. 21 is a flowchart of a process to determine aggregated parameters, in accordance with some embodiments of the present techniques. In some embodiments, the process 3600 may include obtaining a program state of a self-executing protocol, as indicated by block 3602. In some embodiments, obtaining a program state may include obtaining a program state from a still-in-execution program. For example, a first application may be executed over a peer-to-peer network of nodes, and one or more nodes of the peer-to-peer network may store program state for the application. Some embodiments may download a local version of the program state for use when performing one or more operations disclosed in this disclosure. Alternatively, or in addition, some embodiments may obtain a program state during a simulation of a program, where the simulation may simulate some or all of the functions or operations of the program.

In some embodiments, the process 3600 may include receiving a message, as indicated by block 3604. An event message may be one of various types of messages that changes a program state, and may include a message indicating the occurrence of a transaction, a message provided by an observer node, a message provided by a sensor, or the like. In some embodiments, the event message may be received at an API that causes one or more conditional statements of a set of vertices to trigger or become active. In some embodiments, the event message may be a web message sent over the Internet. The message may be formatted in a pre-determined way or may be sent in natural language text form. In some embodiments, the event message may include a set of parameters such as what entity sent a message, what set of entities are a subject of the message, specific conditional statements or vertices affected by the message, or the like.

Some embodiments may parse the received event message or otherwise obtain a set of parameters of the event message. For example, a first event message may include the hash map '[subj1: "Ent1"; action: "allocate"; units: "50", subj2: "Ent2"; type:"obligation"].' Some embodiments may extract the key-value pairs of the hash map and obtain the first entity name "Ent1," the second entity name "Ent2," the action "allocate," and the category label "obligation." In some embodiments, the set of parameters obtained from the first event message may indicate that the entity "Ent1" has an obligation to allocate 50 units to the entity "Ent2." Various other operations may be used to obtain a set of parameters of an event message. For example, some embodiments may use one or more NLP operations to determine a set of parameters from an event message. Some embodiments may determine the validity of the message via one or more operations being performed at the node receiving the event message, using one or more operations described further below. Alternatively, or in addition, some embodiments may determine the validity of the event message using a set of validator nodes.

In some embodiments, an entity may be determined to be affected by an event message that is first received by a first node, where the first node is not controlled by or otherwise registered to the first entity. Some embodiments may then determine a path through the network connecting the first node to a second node, where the second node is controlled or otherwise registered to the entity. If an event message is received at a first node, some embodiments may send data of the event message from the first node to the second node.

Some embodiments may determine the network path by performing a breadth first search (BFS) or depth first search (DFS) operation through a graph representing a peer-to-peer network of nodes. For example, some embodiments may use an DFS algorithm to determine a shortest path from a message-receiving node and a destination node by exploring each node directly connected to the message-receiving node (the first layer of nodes), and then iteratively exploring each node connected to the next layer of the message-receiving node until the destination node is selected. In some embodiments, use of the BFS algorithm may generate a network path that includes a link from the message-receiving node to an intermediate node and a second link from the intermediate node to the destination node. As discussed further below, some embodiments may reduce the amount of time that a node receives a message affecting the node by using a network path determined using one or more operations described above. Some embodiments may determine a path through the peer-to-peer network of nodes to minimize or otherwise reduce the number of nodes that the event message may visit before arriving at a destination node associated with an entity affected by an event message.

In some embodiments, the process 3600 may include determining whether the event message is valid, as indicated by block 3612. Some embodiments may determine whether a message is valid by performing operations at a message-receiving node, a set of validator nodes, or other nodes of a peer-to-peer network. Alternatively, some embodiments may determine whether the event message is valid by performing operations on a centralized computing platform. Determining that a message is valid may include determining that a set of validation criteria are satisfied. The set of validation criteria may include a criterion that the message includes or is otherwise associated with one or more signature keys provided by a registered entity. In some embodiments, the set of validation criteria may include a criterion that the message be confirmed by at least two separate entities.

Some embodiments may implement a consensus protocol to determine the validity of a message. For example, after receiving a message at a first node of a node network, some embodiments may send the message to a plurality of validator nodes of the node network. to determine if the message satisfies the set of validation criteria. Alternatively, some embodiments may send the message to every node of the node network for validation, where each node of the node network determine the validity of the message using a consensus protocol. Some embodiments may determine that a message is valid if a majority of the nodes used to determine the validity of the message agree that the message is valid.

The set of validator nodes may include any number of nodes, but may preferably include more than three, more than ten, or more than 50 validator nodes to increase validation confidence. Some embodiments may concurrently send the event message to an entity listed as affected by the event message or otherwise determined as being affected by the event message before the set of validator nodes arrive at a consensus on the validity of the event message. By sending the event message from the receiving node to the affected node before the event message is determined to be valid, some embodiments may allow operations based on the event message to begin in cases where validation operations may be delayed. Some embodiments may determine that a message is valid in response to a determination that a hash key or other value indicating that a security value is satisfied. For example, some embodiments may determine whether a message includes a required security key based on whether each node of a set of validator nodes form a consensus that the message includes the required security key.

Some embodiments may include determine that an event message is valid based on additional validation criteria. The additional validation criteria may be based a set of parameters obtained from the event message. For example, some embodiments may use one or more criteria to determine whether a received message is a duplicate event message. some embodiments may distribute an issue notification indicating that the received event is a duplicate of the previously-received event. A duplicate event message may include values that are similar to other event messages or different from other event messages. Some embodiments may determine whether a timestamp or other indication of time associated with an event message satisfies a duration threshold between two event messages to determine the validity of an event message.

In some embodiments, a duplicate event message of a first event message does not have to be identical to the first event message. For example, a first event message may include the value "Ent 1 send 30 to Ent 2 at 00:01 received 20501212 at node33," indicating that entity "Ent1" transferred 30 units to entity "Ent2" at 00:01, where the message was received at the node "node33." A second event message may include the value "Ent 1 send 30 to Ent 2 at 00:01 received 20501212 at node34" to indicate that entity "Ent2" transferred 30 units to entity "Ent2" at 00:01, where the message was received at node "node34." In response to receiving the second message, some embodiments may parse the message into parameters, such as the entity names "Ent1" and "Ent2," the transaction name "transfer," and the score "30." In response to a match in these parameters between the first message and the second message, some embodiments may determine that the second message is a duplicate event message with respect to the first event message. Alternatively, or in addition, some embodiments may use a validation criterion that determines that a first message is valid only after receiving a second message duplicating one or more parameters of the first event message. For example, some embodiments may determine that a first event message comprising a first entity identifier and a transaction score is valid based on a determination that a second event message received after the first event message also includes the first entity identifier and the transaction score.

If a determination is made that an event message is valid, operations of the process 3600 may proceed to operations described for block 3616. Otherwise, operations of the process 3600 may proceed to operations described for block 3620.

In some embodiments, the process 3600 may include distributing a validation message to nodes of the node network, as indicated by block 3616. The validation message may indicate that the event message includes valid information and that operations based on a set of parameters obtained from the event message may be used. For example, the validation message may include a message encoding an identifier of an event message and a boolean value to indicate that the message has satisfied one or more validation criteria, such as the validation criteria discussed above. In some embodiments, the distribution of the validation message may be performed as a part of an implementation of a consensus protocol.

In some embodiments, the distribution of the validation message may cause some embodiments to store the validation message on a tamper-evident, distributed ledger encoding records in a directed acyclic graph of cryptographic hash pointers or other distributed storage of a node network. As discussed elsewhere in this disclosure, versions of the tamper-evident, distributed ledger may be stored across multiple nodes of a peer-to-peer network (e.g., in persistent storage devices of multiple nodes). For example, during or after distribution of a validation message, some embodiments may update a set of arrays of a tamper-evident, distributed ledger to include an identifier of the message and a boolean value to indicate that the message is validated. The tamper-evident, distributed ledger may include an array of previous values, such as identifiers of previous messages, previous indications of validation or invalidation, or the like.

As discussed elsewhere in this disclosure, values stored on a tamper-evident, distributed ledger may be stored in sharded database architecture or otherwise arranged such that different nodes have access to different values. For example, a first stored value of a tamper-evident, distributed ledger may be accessible to a first entity that is permitted to view the first stored value and may not be accessible to a second entity that is not permitted to view the first stored value. Some embodiments may use a sharding architecture to form a consensus on the validity of a value or storing the value, where such sharding techniques may include one or more of those described by Wang et al. (Wang, G., Shi, Z. J., Nixon, M. and Han, S., 2019, October. Sok: Sharding on blockchain. In Proceedings of the 1st ACM Conference on Advances in Financial Technologies (pp. 41-61)), which is hereby incorporated by reference. For example, some embodiments may determine the validity of a message using a byzantine fault-tolerant (BFT) consensus protocol, where implementing a BFT protocol may include operations to divide a tamper-evident, distributed ledger into partitions, each partition stored into by a subset of nodes of a peer-to-peer network of nodes. By implementing a sharding technique, some embodiments may increase the scalability of a distributed computing platform used to perform one or more operations the process 3600. Additionally, some embodiments may skip distributing the validation message if the operations of the process 3600 are being performed by a single computing device.

In some embodiments, the process 3600 may include distributing an issue notification to nodes of node network, as indicated by block 3620. As discussed above, some embodiments may determine that one or more parameters of an event message does not satisfy a set of validation criteria. Some embodiments may provide a corresponding issue notification based on the set of validation criteria not satisfied by the event message, where the issue notification may indicate issues such as the event message providing duplicative information, the event message being provided by an untrusted entity, or the like. For example, some embodiments may determine that a validation criterion is not satisfied by an event message based on the event message indicating the occurrence of a transaction already stored in a record as having occurred. In response, some embodiments may send an issue notification indicating the message is a duplicate message.

In some embodiments, one or more types of issue notifications may cause an event message to be labeled as invalid. After a determination is made that an event message is not valid, some embodiments may prevent one or more operations from being performed based on the invalidated event message. For example, after a determination is made that an event message is invalid, some embodiments may prevent the event message from being used to select subsets of vertices as disclosed for block 3630 below. Alternatively, or in addition, some embodiments may label one or more results determined using operations based on the event message as results that should be deleted, ignored, or otherwise not used for further operations. For example, some embodiments may have initially received a first event message at a node used to execute a self-executing protocol. In response to receiving the first event message, some embodiments may then determine a local instance of an outcome program state based on the first event message, as further discussed below. Some embodiments may then determine that the first event message is invalid at a later time or receive a message indicating that the first event message is invalid at a later time. In response, some embodiments may prevent the local instance of the program state from be stored on a distributed, tamper-evident ledger or may otherwise prevent values of the locally updated instance from being stored in a set of records of values from previous versions of program state.

In some embodiments, the process 3600 may include selecting a first subset of vertices triggered by the event message, as indicated by block 3630. As discussed in this disclosure, various operations may be performed determine whether an event message triggers vertices of a directed graph stored in program state, where each respective vertex of the vertices may be associated with a respective conditional statement. Some embodiments may determine that a respective vertex is triggered by the event message based on an event message satisfying one or more conditions of a respective conditional statement associated with the respective vertex. For example, an event message parameter may include a sensor value, and a conditional statement associated with a vertex may be satisfied if the sensor value exceeds a sensor threshold of the conditional statement. In some cases, satisfaction of the conditional statement may cause some embodiments to update a vertex status of the associated vertex to a "satisfied" state or other state indicating satisfaction of the conditional statement. Alternatively, or in addition, some embodiments may select a vertex based on the vertex being updated to a failed state based on an event message. For example, an event message parameter may include an indication of a quantitative score of an entity falling below a threshold of a conditional statement associated with a vertex. In response, some embodiments may determine that the vertex is failed and include the vertex in the first selected subset of vertices.

Some embodiments may determine that a vertex is triggered in response to an event message even if the event message does not include any mention of a resource amount or resource type of a conditional statement. For example, an event message may indicate that a time threshold is satisfied and, in response, some embodiments may determine that a time threshold associated with the conditional statement of a vertex is satisfied and, consequently, set a vertex status of the vertex as "failed."

In some embodiments, the process 3600 may include selecting a second subset of vertices based on the first subset of vertices, as indicated by block 3634. the second subset of vertices may be selected based on a set of directed edges associated with the first subset of vertices or otherwise based on a connection with the first subset of vertices. In some embodiments, the second subset of vertices may include vertices that were previously inactive or would otherwise not have caused an effect even if one or more of their corresponding conditional statements were satisfied. Additionally, the second subset of vertices may include future event-activated vertices.

In some embodiments, the second subset of vertices may include an anticipated set of vertices and associated likelihood parameters associated with the additional set of vertices. In some embodiments, each of the anticipated set of vertices may be connected to an active vertex via one or more directed edges of a directed graph encoded in program state. For example, some embodiments may activate a first vertex in response to receiving an event message and select the first vertex for inclusion in the second subset of vertices. Some embodiments may then select a second vertex based on a directed edge associating the second vertex with the first vertex. Some embodiments may also determine or otherwise obtain a likelihood score indicating the likelihood of the second vertex being activated, where the likelihood score may be determined using a set of historical data or otherwise predicted using a statistical model or machine learning model.

In some embodiments, the process 3600 may include selecting an entity based on the first or second subset of vertices, as indicated by block 3633. As further discussed in this disclosure, some embodiments may select entities to determine what set of private conditional statements to obtain, what address to send a UI, or the like. Some embodiments may select an entity based on an entity role or other entity category associated with the entity. For example, an outcome of a triggered vertex may include instructions to notify all entities having the category "bidder" that a score associated with a digital asset has been updated to a new value. In response, some embodiments may select an entity based on the entity having the entity role "bidder." An entity role may be shared amongst multiple entities. For example, a first and second entity may both have the entity role "subscriber" and the entity role "publisher." In some embodiments, the entity role may indicate a function played by the entity in a self-executing protocol. For example, a first entity may be labeled as an "allocator," which may indicate that the first entity has permission to allocate one or more resources to another entity of the self-executing protocol. Some embodiments may use entity roles to determine permissions to perform certain operations or access certain information.

Some embodiments may determine that an entity has been assigned a new entity role and, in response, send update messages to an address associated with the entity based on vertices being associated with the new entity role. For example, a vertex of a self-executing protocol may be associated with the entity role "outstanding allocators" and a first entity may have originally not been associated with this entity role. If the first entity is later assigned or otherwise associated with the entity role "outstanding allocators" at a later time, some embodiments may include the first entity in a selected subset of entities that share the "outstanding allocators" entity role and determine one or more aggregated parameters for the first entity. Alternatively, or in addition, some embodiments may have the entity pre-selected based on one or more operations of the process 3600 being initiated or caused by an accessing entity, where the accessing entity may act as a selected entity.

In some embodiments, the process 3600 may include determining whether an outcome state caused by the event message satisfying a set of private conditional statements, as indicated by block 3636. In some embodiments, the outcome state may include values directly updated by an event message, vertex statuses associated with vertices of a directed graph, or the like. For example, an outcome state of a first program state caused by an event message may include the program state after a first variable of the program state representing a vertex status is updated to "satisfied" in response to the event message satisfying the conditional statement of the vertex and after a second variable of the program state representing a sensor reading is updated by the event message.

In some embodiments, an entity participating in a self-executing protocol may be associated with a set of private conditional statements. The set of private conditional statements may be hidden from or otherwise not viewable by one or more other entities of the self-executing protocol. For example, some embodiments may, after receiving an event message, change an outcome state based on a first subset of vertices triggered by the event message. One or more values of the outcome state may be used to determine whether a set of private conditional statements are satisfied, such as determine whether the first entity has allocated an amount of a computing resource to the second entity. In response to satisfying a respective private conditional statement, some embodiments may perform one or more respective outcome actions of satisfying the respective private conditional statement.

In some embodiments, results based on evaluations of the set of private conditional statements with outcome states may be used as a part of an entity's internal workflow. An entity's internal workflow may include various operations that may integrate or incorporate outputs of a self-executing program or associated computer programs. As discussed above, some embodiments may use a set of private conditional statements that causes a set of messages to be sent to one or more addresses in response to an outcome program state satisfying the set of private conditional statements. It should be understood that, while some embodiments may send a message or perform other operations in response to a private conditional statement being satisfied, other embodiments may send the message or perform other operations in response to an outcome state not satisfying a set of private conditional statements.

Alternatively, or in addition, some embodiments may send a message or perform other operations based on other operations directly associated with an entity. For example, some embodiments may include operations to compute a score representing the amount of allocated resources being publicly used after receiving each event message and send the score to an address of the entity. The score or other results of these operations may then be used by the entity to update one or more internal values or to use as input(s) for other workflow operations.

Some embodiments may use architecture to prevent an outcome transaction or the execution of another operation by the self-executing protocol from occurring without a confirmation key or other input value that is requested by a confirmation request. For example, some embodiments may determine that an outcome program state indicating that a first entity is obligated to allocate an amount to a second entity satisfies a private conditional statement of the first entity. In response, some embodiments may send a first and second confirmation request to a first and second address, respectively. In some embodiments, the first and second address may be registered to a first and second representative of the first entity, respectively. Some embodiments may then prevent execution of a transaction transferring the amount from the first entity to the second entity until a first confirmation key from the first address and a second confirmation key from the second address is received. Some embodiments may implement operations to request confirmation keys from multiple addresses to increase security during a transaction. Additionally, some embodiments may store one or more of the confirmation keys in in a distributed, tamper-evident ledger as a part of or in association with data recording evidence of the transaction.

In some embodiments, the process 3600 may include filtering the subsets of vertices determined above based on a set of shared categories, as indicated by block 3638. In some embodiments, set of shared categories may be a shared category of a set of mutually-exclusive categories. For example, some embodiments may collect a set of vertices based on each of the set of vertices being associated with the category label "right" of the set of mutually exclusive categories "["right", "obligation", "prohibition"]". In some embodiments, each respective category label of the set of mutually exclusive categories may be used to select multiple subsets of vertices, where each respective subset of vertices share a category label.

In some embodiments, a vertex sharing a category selected from a mutually-exclusive set of categories may share one or more properties, associated behaviors, or the like. For example, a first category label, such as the category labeled with the title "obligation," may be selected from a set of mutually-exclusive categories labeled ["rights", "obligations", "prohibitions"]. Each respective vertex of the vertices labeled with the category label "obligation" may include a time threshold associated with another conditional statement. Failing to satisfy the conditional statement by the time threshold may result in the vertex status of the respective vertex being updated to indicate a failed state. It should be understood that the specific title "obligation" may be changed to various other terms, such as "requirement," "cat1," or the like, and that a change in the title of the category does not change operations based on the category. As further discussed below, determining aggregated parameters based on vertices categorized as "obligations" may include determining a net amount based on the each of the parameters associated with each of the set of active vertices labeled as "obligations."

In some embodiments, a second category selected from the set of mutually-exclusive categories may be labeled "prohibition" and may be associated with a conditional statement that, if satisfied, may cause a vertex associated with the conditional statement to be labeled as a failed vertex. For example, a vertex labeled with the second category may initially be active and, be changed to a status indicating failure in response to a event message satisfying the conditional statement of the vertex. In many cases, as further discussed below, prohibitions associated with different prohibition vertices from a same self-executing protocol or multiple sub-executing protocols may be combined to simplify prediction models, visual interfaces, or other operations. As further discussed below, determining aggregated parameters based on rights may include determining a net amount based on the each of the parameters associated with each of the set of active vertices labeled as "prohibitions."

In some embodiments, a third category selected from the set of mutually-exclusive categories may be labeled "right" may be associated with a conditional statement that requires an explicit request by an entity to trigger. For example, a vertex labeled with the third category may initially be in an active state and require an entity to send a message triggering the vertex, which may then activate one or more new vertices. As further discussed below, determining aggregated parameters based on rights may include determining a net amount based on the each of the parameters associated with each of the set of active vertices labeled as "right."

In some embodiments, the process 3600 may include determining a set of aggregated parameters based on a subset of vertices sharing a category, as indicated by block 3640. The set of aggregated parameters may include a quantitative or categorical value determined from combining, via one or more functions, values used by a set of conditional statements associated with a subset of vertices. For example, some embodiments may determine an aggregated parameter value based on values associated with the second subset of vertices described above, where each of the second subset of vertices used may have a shared category label. For example, each of the vertices associated with a value used to determine an aggregated parameter value may share the category label "right" from a set of mutually-exclusive category labels "[right, obligation, prohibition]". Some embodiments may then store an aggregated parameter in persistent storage, where it may be retrieved for later use or stored on a distributed, tamper-evident ledger.

Some embodiments may determine a sum as an aggregated parameter, where the embodiments may use threshold values encoded in a set of conditional statements as inputs when determining the aggregated parameter. For example, a subset of vertices labeled with the category "obligation" may have a corresponding subset of conditional statements, where the respective thresholds of the conditional statements may be equal to the values "100," "105," and "201." Some embodiments may determine that the sum of the values, "406" as the aggregated parameter, where the aggregated parameter may represent a total amount to be owed, allocated, or otherwise associated with a resource type involved in an obligation.

Some embodiments may use weights assigned to vertices of the second subset of vertices when determining an aggregated parameter. For example, as discussed above, the second subset of vertices may include non-active vertices that have not been triggered, each of which are associated with a weight indicating a probability of occurrence. Some embodiments may compute an expected value based on the weight and use the expected value as a part of a prediction model or for display in a UI. For example, some embodiments may determine that, after the activation of a first vertex by an event message, the first vertex may result in two possible outcomes based on a satisfaction or failure of a conditional statement of the first statement, where each of the two possible outcomes are associated with a respective first and second weight. Some embodiments may then multiply the amount received in the first outcome by the first weight and multiply the amount received in the second outcome by the second weight to determine a net anticipated amount. Some embodiments may then provide the net anticipated amount as an aggregated parameter for display in a UI or as an input for other operations.

Some embodiments may execute or simulate the execution of one or more vertex interactions when determining an aggregated parameter. For example, one or more vertices of a set of active vertices may cancel or otherwise update another vertex of the set of active vertices, where such updates may be considered when determining an aggregated parameter. Some embodiments may simulate the triggering of one or more of the activated vertices to determine a maximum or minimum aggregate amount and use the maximum or minimum aggregate amount as an aggregated parameter. For example, some embodiments may detect the presence of active vertices and determine, via relationships encoded in the directed edges of the directed graph of the self-executing protocol, that the triggering of a first obligation vertex may cancel a second obligation vertex and that the triggering of the second obligation vertex may cancel the first obligation vertex. The first vertex may be associated with a first conditional statement that requires the allocation of a first amount from a first entity to a second entity. The second vertex may be associated with a second conditional statement that requires the allocation of a second amount from the first entity and the second entity. Some embodiments may then determine a minimum amount to be obligated based on the cancellation interaction between the first vertex and the second vertex and use the minimum amount as an aggregated parameter, where the aggregated parameter may then be displayed in a UI in a region associated with obligations (e.g., in a region visually titled "obligations," "required tasks," or the like).

In some embodiments, the process 3600 may include providing a UI based on the set of aggregated parameters, as indicated by block 3650. The set of aggregated parameters to be used in a UI to display aggregated parameters based on vertex categories, and may include a current amount owed, a current amount to be allocated within a time interval, an amount anticipated to be received within a time interval, or the like. In some embodiments, a plurality of vertices may be associated with each of the upper values, where a visualization of the plurality of vertices associated with the output may be changed to emphasize the relationship between the plurality of vertices and the associated up. For example, some embodiments may provide a UI having a first UI element that displays a sum of the obligated amounts associated with a plurality of vertices.

In some embodiments, a UI may also include a visualization of the directed graph, where clicking on the sum of obligated amounts will cause the visualization to highlight the associative plurality of vertices shown in the directed graph. For example, some embodiments may visually indicate a subset of vertices that were activated by an event message, where the subset of vertices is shown to be different from other vertices being displayed in the UI. Various methods may be used to visually distinguish the subset of vertices. Visually distinguishing a vertex from other vertices may include changing a color of the vertex, changing a size of the vertex, or animating the vertex in a different way with respect to the other vertices of the directed graph. Alternatively, or in addition, the UI provided by some embodiments may cause one or more additional operations to be performed in response to an interaction with a UI element of the UI. In some embodiments, the additional operations may include sending messages or otherwise causing additional interactions between a local machine executing and displaying the UI and a self-executing protocol executing across a distributed, peer-to-peer network.

Figure 22:
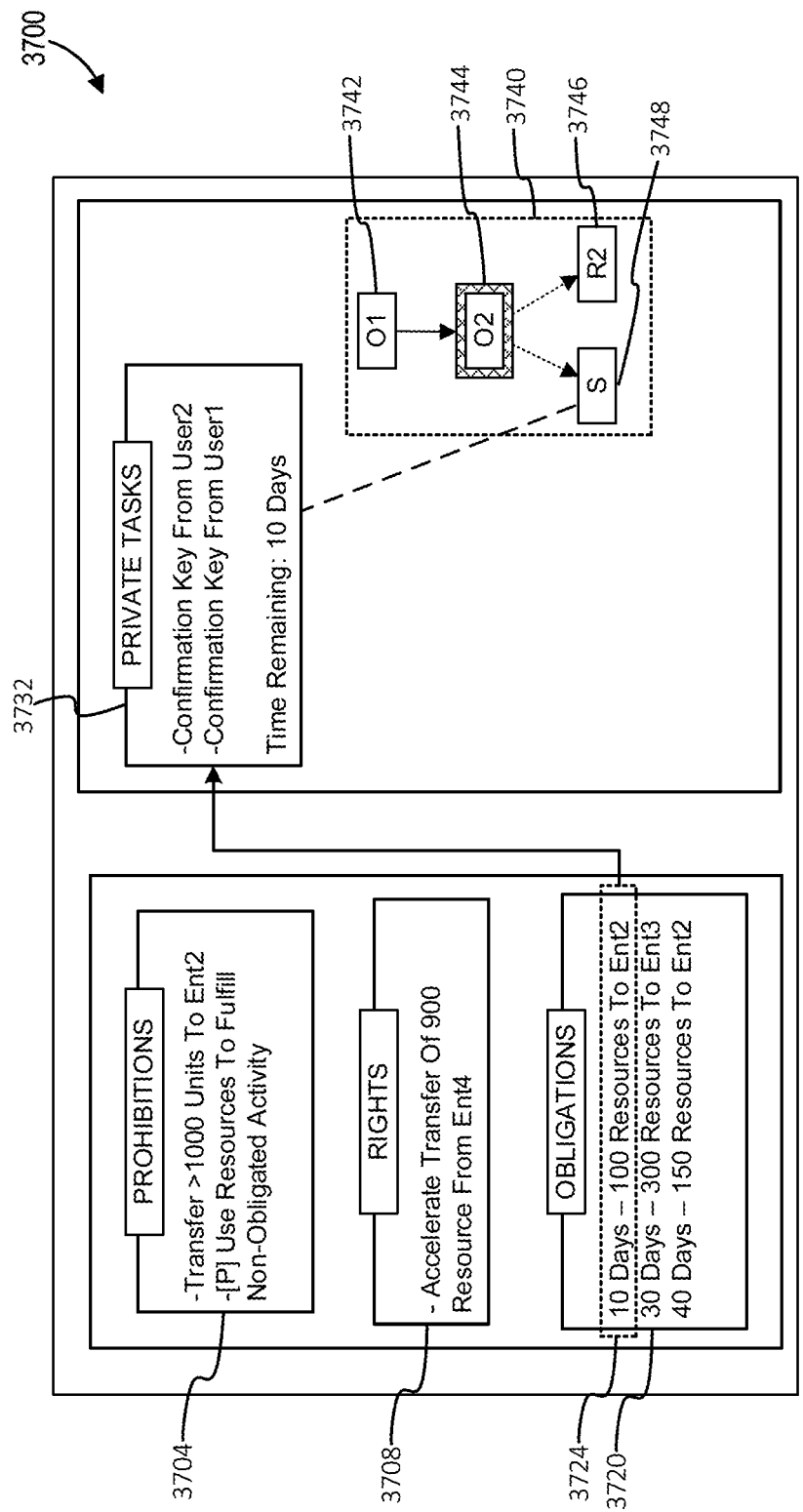
FIG. 22 depicts a user interface that displays aggregated parameters, in accordance with some embodiments of the present techniques.

FIG. 22 depicts a user interface that displays aggregated parameters, in accordance with some embodiments of the present techniques. FIG. 22 depicts a UI that displays a result based on aggregated parameters, in accordance with some embodiments of the present techniques. The UI 3700 may include UI elements generated based on one or more aggregated parameters determined using one or more operations described in the process 3600. The first UI element 3704 may be based on a first aggregated parameter having the value "1000," where the aggregated parameter indicates a maximum amount of resource units that must be transferred to the entity "Ent2." Some embodiments may have selected value "1000" from three different parameters [200, 500, 1000], where each parameter may represent a threshold of a conditional statement of a different prohibition vertex. Additionally, the first UI element 3704 may include an indicator indicating that the use of a resource to fulfill a non-obligated activity is prohibited based on a private conditional statement, where the indicator may be the text "[P]" that precedes the phrase "Use Resource To Fulfill Non-Obligated Activity."

The second UI element 3708 may include the aggregated parameter having the value "900," where the aggregated parameter may be determined from a plurality of vertices categorized as "rights." In some embodiments, interaction with the second UI element 3708 may cause the display of the plurality of vertices. For example, a user may interact with the second UI element 3708 by clicking on or tapping on the text, "Accelerate transfer of 900 resources from Ent4." In response, the UI 3700 may then display a new box indicating two vertices or their associated conditional statements, where each of the two indicated respective vertices is associated with an acceleration of an amount of resources from the entity "Ent4," and where the amounts sum to the quantity "900." In some embodiments, interactions with this new box or another UI element may then cause a message to be sent to a self-executing protocol that trigger one or more of the indicated respective vertices. For example, some embodiments may click on a button in the UI that, when pressed, sends a message to a self-executing protocol and triggers a rights vertex to accelerate the transfer of an amount from the entity "Ent4."

As discussed above, some embodiments may determine an aggregated parameter based on vertex relationships encoded in a set of directed edges or other associations between vertices. For example, some embodiments may have determined the value "900" from a first parameter "300," a second parameter "500," and a third parameter "600," where each parameter may represent a quantity that may be requested from the entity "Ent4." A first conditional statement may use the first parameter "300," and may be associated with a vertex that is independent of any other vertex. The second parameter "500" and the third parameter "600" may be used by a second and third conditional statement, respectively, where the second conditional statement is associated with a second vertex, and where the third conditional statement is associated with a third vertex. Some embodiments may determine that the second and third vertices are mutually exclusive (e.g., satisfying either the second vertex or third vertex will cancel the other vertex) and select the third vertex based on the third vertex being associated with a greater parameter. Some embodiments may then sum the quantitative parameters of the non-exclusive vertices ("300" and "600") to determine the aggregated parameter "900."

The third UI element 3720 may display a first value 100, a second value 300, and a third value 150. In some embodiments, each of the displayed values may be aggregated parameter values, where each respective value may be based on a plurality of vertices. Alternatively, some or all of the displayed values may be based on a single respective vertex. In some embodiments, the third UI element 3720 may be interacted with to display a set of tasks based on one or more private conditional statements associated with an entity. For example, interaction with the box text 3724 may cause the display of a set of private tasks 3732, as further discussed below.

Some embodiments, the UI 3700 may display the set of private tasks 3732, where the set of private tasks may be determined from an internal entity workflow and implemented using a set of private conditional statements or other set of private logic. For example, an entity may use or be associated with a private set of conditional statements that determine whether the entity is obligated to transfer or allocate an amount of a resource. In response to a determination that the entity is obligated to transfer or allocate an amount of a resource, some embodiments may send a request for a plurality of confirmation keys from a set of designated entity representatives. Some embodiments may then transfer a UI or data interpretable by a UI that causes the UI to update a set of private tasks to indicate that the set of confirmation key has been requested and that the set of confirmation keys should be sent.

Some embodiments may send a UI or send data to a UI to update a directed graph or directed graph portion to visually indicate effects of receiving an event message. For example, after receiving an event message indicating the satisfaction of the first vertex 3742, some embodiments may send data to the UI 3700 to cause the UI to change a color of the first vertex 3722, and change a color of the second vertex 3744. In some embodiments, the color change of the first vertex 3742 may indicate that the first vertex is triggered by the event message. Alternatively, or in addition, the color change of the second vertex 3744 may indicate that the second vertex 3744 has been made active in response to a most recent event message. Additionally, some embodiments may indicate a future program state that may be caused by an entity and may be associated with one or more private tasks that the entity must perform. For example, some embodiments may link the set of private tasks 3732 to the third vertex 3746, where the selection of the third vertex 3746 may cause the display of the set of private tasks 3732. By directly linking private tasks to a possible outcome vertex, the UI provided by some embodiments may provide more intuitive and efficient decision-making for an entity.

As described above, some embodiments may determine aggregated parameters or perform other operations when detecting possible states that may cause one or more entities to be notified. In response to an entity receiving a notification, some embodiments may perform querying operations to determine an event record for an event causing the notification. Some embodiments may perform operations, such as those described further below, to query a graph-based model and obtain event records based on the query with greater efficiency.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The term "set" may indicate a single item or a plurality of items, e.g., "set of widgets" may indicate only one widget or may indicate multiple widgets. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A-1. A tangible, non-transitory, machine-readable medium storing instructions that when executed by one or more processors effectuate operations comprising: determining, with a computer system, that an event has occurred; selecting, with the computer system, a self-executing protocol among a plurality of self-executing protocols based on the event, wherein: the self-executing protocol comprises a set of conditions, a set of entities, a set of vertices, and a set of directed graph edges connecting the set of vertices, the set of vertices comprise different respective subsets of the conditions, the set of entities are encoded in an associative array, the set of conditions are encoded in an associative array, the set of vertices are encoded as a serialized array of vertices, wherein the serialized array of vertices is in a serialized data format in persistent storage, selecting is based on whether the event satisfies any of the set of conditions; deserializing, with the computer system, the serialized array of vertices to generate a directed graph in a non-persistent memory, wherein the directed graph encodes the set of conditions, set of vertices, set of entities, and set of directed edges; determining, with the computer system, a set of triggerable vertices from the vertices of the directed graph in the non-persistent memory; determining, with the computer system, a set of triggered vertices from the set of triggerable vertices based on which of the set of triggerable vertices are associated with the set of conditions satisfied by the event; updating, with the computer system, the directed graph in the non-persistent memory based on the set of triggered vertices, wherein updating the directed graph comprises, for each respective triggered vertex of the set of triggered vertices: updating a first value associated with the respective triggered vertex based on the event, where the first value indicates whether the respective triggered vertex is triggerable; updating a respective adjacent vertex to indicate that the respective adjacent vertex is triggerable, wherein the respective adjacent vertex is associated with a directed graph edge of the respective triggered vertex; updating, with the computer system, the serialized array of vertices by serializing the directed graph in the non-persistent memory after updating the directed graph in the non-persistent memory based on the set of triggered vertices; and persisting, with the computer system, the serialized array of vertices to the persistent storage after the serialized array of vertices is updated by serialization.

A-2. The medium of embodiment A-1, wherein: a first vertex in the set of vertices is indicated to not be triggerable by a first set of values, wherein each of the first set of values indicate whether a vertex in the set of vertices is triggerable; and the directed graph in the non-persistent memory does not include the first vertex of the serialized array of vertices.

A-3. The medium of any of embodiments A-1 to A-2, wherein the serialized array of vertices comprises an array of subarrays, wherein each subarray comprises a head vertex of a directed graph edge of the set of directed graph edges, a tail vertex of the directed graph edge, a label associated with the directed graph edge, and a valence value indicating a number of other edges associated with the directed graph edge.

A-4. The medium of any of embodiments A-1 to A-3, wherein determining that an event occurred further comprises: receiving an event message from a publisher, wherein the publisher is identified by a publisher identifier; determining whether the publisher is associated with one of a set of authorized publishers based on the publisher identifier; and authorizing the event message based on a determination that the publisher identifier is associated with one of the set of authorized publishers.

A-5. The medium of any of embodiments A-1 to A-4, wherein the operations further comprise: receiving an event message from a publisher, wherein the event message is associated with a signature value and a publisher identifier; retrieving a cryptographic certificate based on the publisher identifier; computing a cryptographic hash value based on the signature value; and authenticating the event message based on the cryptographic hash value and the cryptographic certificate.

A-6. The medium of any of embodiments A-1 to A-5, wherein determining the set of triggered vertices comprises: determining a first set of vertices in the directed graph in the non-persistent memory, wherein each respective vertex of the first set of vertices is indicated as a head vertex by one of the set of directed graph edges; and determining the set of triggerable vertices based on the first set of vertices by filtering out a set of tail vertices from the first set of vertices, wherein each of the set of tail vertices is indicated as a tail vertex by one of the set of directed graph edges.

A-7. The medium of any of embodiments A-1 to A-6, wherein the serialized array of vertices is stored in a tamper-evident data store being executed by a set of peer nodes, wherein the tamper-evident data store comprises a directed acyclic graph of cryptographic hash pointers, and wherein deserializing the serialized array of vertices comprises using a first node of the set of peer nodes to deserialize the serialized array of vertices, and wherein the operations further comprising transmitting the serialized array of vertices from the first node to another node of the set of peer nodes after updating the serialized array of vertices.

A-8. The medium of any of embodiments A-1 to A-7, the operations further comprising receiving an event message, wherein receiving the event message comprises receiving a request that comprises the event message, and wherein the request comprises a method identifier and a host identifier, wherein the method identifier indicates that the request comprises an amount of data to modify data stored by the system, and wherein the host identifier indicates a host of the self-executing protocol.

A-9. The medium of any of embodiments A-1 to A-8, the operations further comprising receiving an event message, wherein the event message comprises a routing key, and wherein a data broker stores the event message in a queue, and wherein a protocol broker transmits the event message to an API associated with the self-executing protocol based on the routing key.

A-10. The medium of any of embodiments A-1 to A-9, wherein determining the set of triggered vertices comprises determining the set of triggered vertices based on a second set of values, wherein each of the second set of values is associated with one of a set of vertices of the directed graph in the non-persistent memory, and wherein one of the second set of values indicate that one of the set of vertices of the directed graph in the non-persistent memory is triggerable.

A-11. The medium of any of embodiments A-1 to A-10, wherein determining that the event has occurred comprises determining that a condition expiration threshold has been satisfied, and wherein the condition expiration threshold is associated with a first condition of a first triggerable vertex, and wherein the event does not satisfy the first condition.

A-12. The medium of any of embodiments A-1 to A-11, the operations further comprising updating an array of previously-triggered vertices based on a vertex identifier associated with the respective triggered vertex.

A-13. The medium of any of embodiments A-1 to A-12, the operations further comprising generating an initial directed graph based on an initial set of vertices, wherein the initial set of vertices is different from the serialized array of vertices.

A-14. The medium of any of embodiments A-1 to A-13, wherein a vertex of the directed graph stored in the non-persistent memory comprises a condition of the set of conditions.

A-15. The medium of any of embodiments A-1 to A-14, the operations further comprising updating a third set of values associated with the serialized array of vertices, wherein the third set of values indicate that the respective triggered vertex is not triggerable.

A-16. The medium of any of embodiments A-1 to A-15, wherein updating the respective adjacent vertex comprises setting a plurality of statuses associated with a plurality of vertices other than the respective triggered vertex as not triggerable.

A-17. The medium of any of embodiments A-1 to A-16, wherein updating the first value comprises updating the first value to indicate that the respective triggered vertex remains triggerable after updating the serialized array of vertices.

A-18. The medium of embodiment A-17, wherein updating the respective adjacent vertex comprises decreasing a second value, wherein the second value indicates a state of the self-executing protocol.

A-19. The medium of any of embodiments A-1 to A-18, the operations further comprising updating a set of previous events based on the event, wherein the set of previous events comprises a plurality of previous events that caused a state change in the self-executing protocol, wherein the set of previous events comprises a time during which the event occurred.

A-20. A tangible, non-transitory, machine-readable medium storing instructions that when executed by one or more processors effectuate operations comprising: determining, with a computer system, that an event has occurred; selecting, with the computer system, a self-executing protocol among a plurality of self-executing protocols based on the event, wherein: the self-executing protocol comprises a set of conditions, a set of entities, a set of vertices, and a set of directed graph edges connecting the set of vertices, the set of vertices comprise different respective subsets of the conditions, the set of entities are encoded in an associative array, the set of conditions are encoded in an associative array, the set of vertices are encoded as a serialized array of vertices, wherein the serialized array of vertices is in a serialized data format in persistent storage, selecting is based on whether the event satisfies any of the set of conditions; deserializing, with the computer system, the serialized array of vertices to generate a directed graph in a non-persistent memory, wherein the directed graph encodes the set of conditions, set of vertices, set of entities, and set of directed edges; determining, with the computer system, a set of triggerable vertices from the vertices of the directed graph in the non-persistent memory; determining, with the computer system, a set of triggered vertices from the set of triggerable vertices based on which of the set of triggerable vertices are associated with the set of conditions satisfied by the event; updating, with the computer system, the directed graph in the non-persistent memory based on the set of triggered vertices, wherein updating the directed graph comprises, for each respective triggered vertex of the set of triggered vertices: updating a first value associated with the respective triggered vertex based on the event, where the first value indicates whether the respective triggered vertex is triggerable; updating a respective adjacent vertex to indicate that the respective adjacent vertex is triggerable, wherein the respective adjacent vertex is associated with a directed graph edge of the respective triggered vertex; updating, with the computer system, the serialized array of vertices by serializing the directed graph in the non-persistent memory after updating the directed graph in the non-persistent memory based on the set of triggered vertices; and persisting, with the computer system, the serialized array of vertices to the persistent storage after the serialized array of vertices is updated by serialization.

A-21. A method to perform the operations of any of the embodiments A-1 to A-19.

A-22. A system, comprising: one or more processors; and memory storing instructions that when executed by the processors cause the processors to effectuate operations comprising: the operations of any one of embodiments A-1 to A-19.

B-1. A tangible, non-transitory, machine-readable medium storing instructions that when executed by one or more processors effectuate operations comprising: obtaining, with a computer system, a set of conditional statements, wherein: a conditional statement of the set of conditional statements is associated with an outcome subroutine that specifies operations in each of one or more branches of the conditional statement, a set of index values index the set of conditional statements, and a first outcome subroutine of a first conditional statement of the set of conditional statements uses a first index value of the set of index values, wherein the first index value is associated with a second conditional statement of the set of conditional statements; executing, with the computer system, a program instance of an application based on the set of conditional statements, wherein program state data of the program instance comprises: a set of vertices and a set of directed graph edges, wherein each of the set of vertices comprises a identifier value and is associated with one of the set of conditional statements, and wherein each of the set of directed graph edges associates a pair of the set of vertices and a direction from a tail vertex of the pair to a head vertex of the pair, a set of statuses, wherein each of the set of statuses is associated with one of the set of vertices, a set of vertex categories, wherein each of the set of vertex categories is a category value and is associated with a respective vertex of the set of vertices and is determined based a respective conditional statement of the respective vertex, and a set of scores, wherein each respective score of the set of scores is associated with a respective vertex and is based a respective conditional statement of the respective vertex; updating, with the computer system, the program state data based on a set of inputs comprising a first input, wherein updating the program state data comprises: modifying a status of a first vertex of the set of vertices based on the first input, updating a vertex adjacent to the first vertex; and determining, with the computer system, an outcome score based on the set of scores after updating the program state data.

B-2. The medium of embodiment B-1, wherein the status is a first status, and wherein updating the program state data comprises updating the program state data based on the first status, and wherein the operations further comprise: modifying a second status of a second vertex of the set of vertices based on a second input; updating a third vertex adjacent to the second vertex, wherein determining the outcome score comprises determining the outcome score after updating the third vertex.

B-3. The medium of embodiment B-2, wherein the operations further comprise determining the first input based on a probability value associated with one of the set of vertex categories.

B-4. The medium of any of embodiments B-2 to B-3, wherein the outcome score is a first outcome score, and wherein the program state data is in a first state before modifying the program state data, and wherein the operations further comprise: updating a neural network parameter after updating the third vertex based on the first outcome score, wherein the neural network parameter comprises a set of probability values assigned to each of a subset of vertices of the set of vertices; determining a third input based on the neural network parameter; updating the program state data that is in the first state based on the third input; and determining a second outcome score after updating the program state data based on the third input.

B-5. The medium of any of embodiments B-1 to B-4, wherein executing the program instance comprises executing the program instance during a first iteration, and wherein the set of inputs is a first set of inputs, and wherein the outcome score is a first outcome score, and wherein the program state data is in a first state before modifying the program state data, and wherein the operations further comprise: executing the program instance during a second iteration by updating the program state data based on a second set of inputs, wherein the program state data is in the first state before updating the program state data based on the second set of inputs; determining a second outcome score based on the second set of inputs; and determining a multi-iteration score based on the first outcome score and the second outcome score.

B-6. The medium of embodiment B-5, wherein the operations further comprise: acquiring a third score; and determining a possible event based the third score using a probability distribution, wherein the probability distribution is based on the multi-iteration score.

B-7. The medium of embodiment B-6, wherein determining the possible event comprises using a neural network that is trained using inputs based on the first outcome score and the second outcome score, and wherein the neural network is trained using a training output based on the first set of inputs and the second set of inputs.

B-8. The medium of any of embodiments B-5 to B-7, wherein: the first set of inputs is associated with a first weighting value; the second set of inputs is associated with a second weighting value; and determining the multi-iteration score is based on the first weighting value and the second weighting value.

B-9. The medium of any of embodiments B-5 to B-8, the operations further comprising determining a probability distribution function based on the multi-iteration score.

B-10. The medium of any of embodiments B-1 to B-9, wherein modifying the status of the first vertex comprises determining a set of events, wherein each of the set of events satisfies a condition of the set of conditional statements.

B-11. The medium of any of embodiments B-1 to B-10, wherein acquiring the set of conditional statements comprises: acquiring an event; for a respective self-executing protocol of a plurality of self-executing protocols, determining whether the event satisfies a condition associated with the respective self-executing protocol; and acquiring the set of conditional statements associated with the respective self-executing protocol in response to the event satisfying the condition associated with the respective self-executing protocol.

B-12. The medium of any of embodiments B-1 to B-11, wherein acquiring the set of conditional statements comprises: acquiring an entity identifier; for a respective self-executing protocol of a plurality of self-executing protocols, determining whether the entity identifier is in a respective set of entities associated with the respective self-executing protocol; and acquiring the set of conditional statements associated with the respective self-executing protocol in response to the entity identifier being in the respective set of entities associated with the respective self-executing protocol.

B-13. The medium of any of embodiments B-1 to B-12, the operations further comprising: acquiring a first entity identifier and a second entity identifier; selecting a first set of self-executing protocols from a plurality of self-executing protocols, wherein each of the first set of self-executing protocols comprises a first set of entities that comprises the first entity identifier; determining a second set of self-executing protocols from the plurality of self-executing protocols, wherein each of the second set of self-executing protocols comprises a second set of entities that comprises the second entity identifier; and determining a set of intermediary entities, wherein each of the set of intermediary entities is in a set of entities of the first set of self-executing protocols, and wherein each of the set of intermediary entities is in a set of entities of the second set of self-executing protocols.

B-14. The medium of any of embodiments B-1 to B-13, wherein modifying the status of the first vertex comprises setting a first status to indicate that a first entity fails to transfer a score to a second entity.

B-15. The medium of any of embodiments B-1 to B-14, the operations further comprising: detecting a pattern based on a plurality of the set of vertices and a plurality of the set of directed graph edges; and sending a message indicating that the pattern is detected.

B-16. The medium of any of embodiments B-1 to B-15, the operations further comprising determining a measure of central tendency based on the outcome score.

B-17. The medium of any of embodiments B-1 to B-16, the operations further comprising determining a kurtosis value based on the outcome score, wherein the kurtosis value correlates with a ratio of a first value and a second value, wherein the first value is based on a measure of central tendency, and wherein the second value is based on a measure of dispersion.

B-18. The medium of any of embodiments B-1 to B-17, the operations further comprising: acquiring an event message via an application protocol interface; determining a first set of events based on the event message, wherein the set of inputs does not include the first set of events; and updating the program state data based on the first set of events, wherein the program state data is updated based on the set of inputs after the program state data is updated with the first set of events.

B-19. The medium of any of embodiments B-1 to B-18, the operations further comprising: modifying a first status of a first vertex of the set of vertices to indicate that the first vertex is triggered; modifying a second status of a second vertex of the set of vertices to indicate that the second vertex is triggered; and in response to the first status and the second status being modified to indicate they are triggered, triggering a third vertex that is adjacent to the first vertex and the second vertex.

B-20. A method comprising: acquiring a set of conditional statements, wherein: a conditional statement of the set of conditional statements is associated with an outcome subroutine and an index value of a set of index values, and a first outcome subroutine of a first conditional statement of the set of conditional statements uses a first index value of the set of index values, wherein the first index value is associated with a second conditional statement of the set of conditional statements; executing a program instance of an application based on the set of conditional statements, wherein program state data of the program instance comprises: a set of vertices and a set of directed graph edges, wherein each of the set of vertices comprises a identifier value and is associated with one of the set of conditional statements, and wherein each of the set of directed graph edges associates a pair of the set of vertices and a direction from a tail vertex of the pair to a head vertex of the pair, a set of statuses, wherein each of the set of statuses is associated with one of the set of vertices, and a set of vertex categories, wherein each of the set of vertex categories is a category value and is associated with a respective vertex of the set of vertices and is determined based a respective conditional statement of the respective vertex, a set of scores, wherein each respective score of the set of scores is associated with a respective vertex and is based a respective conditional statement of the respective vertex; updating the program state data based on a set of inputs comprising a first input, wherein updating the program state data comprises: modifying a status of a first vertex of the set of vertices based on the first input, updating a vertex adjacent to the first vertex; and determining an outcome score based on the set of scores after updating the program state data.

B-21. A tangible, non-transitory, machine-readable medium storing instructions that when executed by one or more processors effectuate operations comprising: obtaining, with one or more processors, identifiers of a plurality of entities; obtaining, with one or more processors, a plurality of symbolic artificial intelligence (AI) models, wherein: each of the plurality of symbolic AI models is configured to produce outputs responsive to inputs based on events caused by at least one of the plurality of entities, at least some of the plurality of entities are associated with outputs of respective symbolic AI models, and at least some of the plurality of entities have respective scores corresponding to the respective outputs of the symbolic AI models; obtaining, with one or more processors, a plurality of scenarios, wherein: each scenario comprises simulated inputs corresponding to one or more simulated events, and at least some scenarios comprise a plurality of simulated inputs; determining, with one or more processors, a population of scores of a given entity among the plurality of entities, wherein respective members of the population of scores correspond to respective outputs of the plurality of symbolic AI models, and wherein the respective outputs correspond to respective scenarios among the plurality of scenarios; and storing, with one or more processors, the population of scores in memory.

B-22. The medium of embodiment B-21, wherein at least one of the plurality of symbolic AI models comprises: a set of vertices and a set of directed graph edges, wherein each of the set of vertices comprises a identifier value and is associated with one of a set of conditional statements, and wherein each of the set of directed graph edges associates a pair of the set of vertices and a direction from a tail vertex of the pair to a head vertex of the pair; a set of statuses, wherein each of the set of statuses is associated with one of the set of vertices; a set of vertex categories, wherein each of the set of vertex categories is a category value and is associated with a respective vertex of the set of vertices and is determined based a respective conditional statement of the respective vertex; and a set of scores, wherein each respective score of the set of scores is associated with a respective vertex and is based a respective conditional statement of the respective vertex.

B-23. The medium of any of embodiments B-21 to B-22, wherein obtaining the plurality of scenarios comprises: determining a first simulated input for a first model of the plurality of symbolic AI models based on a multi-iteration score associated with the first model, wherein the first model is in a first state before updating the first model based on the first simulated input; update the first model based on the first simulated input to advance the first model to a second state, wherein the second state is different from the first state; determine a second input, wherein the second input may be selected based on scores associated with each of a set of possible states associated with the first state; update the first model when it is in the second state based on the second input to advance the second model to a third state, wherein the third state is different from the first state and the second state, and wherein the third state satisfies a terminal state criterion, and wherein a terminal state value is associated with the third state; and update the score associated with the first model based on the terminal state value; and determining a scenario of the plurality of scenarios based on the score.

B-24. The medium of embodiment B-23, wherein determining a first set of simulated inputs comprises determining the first set of inputs based on a first term and a second term, wherein the first term is based on a count of simulations executed that started from the first state and the second term is based on a score value associated with the third state.

B-25. The medium of any of embodiments B-21 to B-24, wherein determining the population of scores comprises using a convolutional neural network to determine a respective score based on values in a respective model of the symbolic AI models.

B-26. The medium of any of embodiments B-21 to B-25, the operations further comprising: fuzzifying the population of scores to provide a set of fuzzified inputs, wherein fuzzifying the outputs comprises using a membership function to determine a degree of membership, and wherein the fuzzified inputs comprises the degree of membership; determine a fuzzified outcome score based on the degree of membership using an inference engine, wherein the inference comprises a set of executable rules that may be matched to the fuzzified inputs; and determine a label associated with a smart contract based on the fuzzified outcome score.

B-27. The medium of any of embodiments B-21 to B-26, wherein obtaining the plurality of scenarios comprises: determining a first scenario for a first symbolic AI model of the plurality of AI models based on a first set of weights corresponding to each of a set of categories, wherein the first symbolic AI model comprises a first plurality of the set of categories; and determining a second scenario for a second symbolic AI model of the plurality of AI models based on the first set of weights, wherein the second symbolic AI model comprises a second plurality of the set of categories.

B-28. The medium of any of embodiments B-21 to B-27, wherein determining the simulated input comprises using a decision tree, wherein the decision tree comprises a first tree node and a second tree node, and wherein the first tree node is associated with a first score, and wherein the first tree node is associated with a second score and wherein the operations further comprise: determining whether the first score is greater than a second score; and in response to the first score being greater than the second score, determining the simulated input based on a value associated with the first tree node.

B-29. The medium of any of embodiments B-21 to B-28, the operations further comprising updating a set of parameters of a neural network based on the population of scores, wherein the neural network provides a weighting value associated with a decision to cancel a self-executing protocol.

B-30. The medium of embodiment B-29, wherein determining the population of scores of a given entity among the plurality of entities comprises determining a sum of the scores.

B-31. A method to perform any of the operations of embodiments B-21 to B-30.

B-32. A method to perform any of the operations of embodiments B-1 to B-19.

B-33. A system, comprising: one or more processors; and memory storing instructions that when executed by the processors cause the processors to effectuate operations comprising: the operations of any one of embodiments B-1 to B-19.

B-34. A system, comprising: one or more processors; and memory storing instructions that when executed by the processors cause the processors to effectuate operations comprising: the operations of any one of embodiments B-21 to B-30.

E-1. A tangible, non-transitory, machine-readable medium storing instructions that, when executed by a computing system, effectuate operations comprising: obtaining, with a computing system, program state of a self-executing protocol, wherein the program state encodes: a set of conditional statements; a set of entities, wherein the set of entities comprises a first entity; a directed graph, the directed graph comprising: a set of vertices, wherein each respective vertex of the set of vertices is associated with a respective category label of a set of mutually exclusive categories; a set of directed edges connecting respective pairs of vertices among the set of vertices; obtaining, with the computing system, an entity profile of the first entity, wherein: the entity profile comprises a first graph portion template, the first graph portion template comprises a first vertex template and an edge template, the first vertex template is associated in memory with a first category label of the set of mutually exclusive category labels, and the edge template specifies an edge direction to or from a vertex matching the first vertex template; determining, with the computing system, whether the first graph portion template matches a graph portion in the directed graph based on a first vertex of the directed graph matching the first vertex template and a first directed edge of the directed graph matching the edge template; determining, with the computing system, an outcome score based on the first graph portion template matching the graph portion in the directed graph; determining, with the computing system, whether the outcome score satisfies an outcome score threshold; and in response to the outcome score satisfying the outcome score threshold, storing, with the computing system, a value indicating that the outcome score satisfies the outcome score threshold.

E-2. The medium of embodiment E-1, wherein: the set of vertices are a set of norm vertices; the first vertex is a first norm vertex; the set of entities include parties to the self-executing protocol; the operations further comprising: obtaining a plurality of self-executing protocol programs comprising a plurality of directed graphs, wherein each respective directed graph of the plurality of directed graphs is associated with a respective set of entities that comprises the first entity; determining the first graph portion template based on the plurality of directed graphs, wherein a second norm vertex of the plurality of directed graphs matches the first norm vertex template of the first graph portion template, and wherein a condition of the second norm vertex is indicated to have been failed by the first entity based on an event message; and determining an outcome determination parameter based on a number of times that the first graph portion template matches with a respective graph portion in the plurality of self-executing protocol programs, wherein determining the outcome score comprises determining the outcome score based on the outcome determination parameter.

E-3. The medium of any of embodiments E-1 to E-2, the operations further comprising: obtaining a plurality of self-executing protocol programs comprising a plurality of directed graphs, wherein each respective self-executing protocol program of the plurality of self-executing protocol programs comprises a respective directed graph of the plurality of directed graphs; determining the first graph portion template based on the plurality of self-executing protocol programs, wherein a second vertex of a second directed graph of the plurality of directed graphs matches the first vertex template, and wherein a third vertex of the plurality of directed graphs matches a second vertex template, and wherein a condition of the third vertex is indicated as having been satisfied based on an event message; and determining an outcome determination parameter based on a number of times that the first graph portion template matches with a respective graph portion in the plurality of self-executing protocol programs, wherein determining the outcome score comprises determining the outcome score based on the outcome determination parameter.

E-4. The medium of any of embodiments E-1 to E-3, wherein the entity profile is a first entity profile, and wherein the operations further comprise: determining a transaction score based on the directed graph, wherein the transaction score is associated with a transaction between the first entity and a second entity; and updating an association between the first entity profile and a second entity profile based on the transaction score, wherein the second entity profile is associated with the second entity.

E-5. The medium of any of embodiments E-1 to E-4, the operations further comprising: determining whether the first entity has failed a conditional statement associated with a second vertex of the directed graph; and in response to a determination that the first entity has failed the conditional statement, updating an entity score of an entity graph, wherein the entity score is associated with the first entity, and wherein the entity graph comprises a plurality of entity vertices, and wherein each respective entity vertex of the plurality of entity vertices is associated with a respective entity profile.

E-6. The medium of embodiment E-5, wherein the entity graph is stored on a distributed, tamper-evident ledger, and wherein updating the entity score comprises: obtaining an encryption key associated with the first entity; obtaining a previous entity score from the distributed, tamper-evident ledger based on the encryption key; and updating the entity score based on the previous entity score.

E-7. The medium of any of embodiments E-5 to E-6, wherein the entity graph is stored on a distributed, tamper-evident ledger, and wherein the operations further comprise: determining whether the entity score satisfies an entity score threshold of a verification entity; and in response to the entity score satisfying the entity score threshold, storing an indicator that the first entity satisfies the entity score threshold of the verification entity.

E-8. The medium of any of embodiments E-5 to E-7, the operations further comprising: determining whether the entity score satisfies an entity score threshold of a verification entity; and sending a message to an application program interface, wherein the message indicates that the first entity satisfies the entity score threshold of the verification entity.

E-9. The medium of any of embodiments E-5 to E-8, wherein the entity profile is a first entity profile, and wherein the operations further comprise: determining a second entity score associated with the first entity, wherein the first entity profile does not comprise the second entity score; obtaining a passkey value; and in response to receiving the passkey value, sending a message comprising the second entity score.

E-10. The medium of any of embodiments E-1 to E-9, wherein determining the outcome score comprises determining the outcome score using a neural network based on a feature set, wherein: determining the feature set, wherein determining the feature set comprises determining whether the first graph portion template matches a graph portion in the directed graph; and the neural network is trained on a plurality of directed graphs of a plurality of a self-executing protocol programs, wherein the first graph portion template matches a graph portion of a subset of the plurality of directed graphs.

E-11. The medium of any of embodiments E-1 to E-10, wherein determining the outcome score comprises: generating a set of embeddings based on a set of vertices of the directed graph, wherein each vertex of the set of vertices is associated with an embedding of the set of embeddings, and wherein each embedding comprises a vector; determining a feature set based on the set of embeddings; and determining the outcome score using a neural network based on the feature set.

E-12. The medium of any of embodiments E-1 to E-11, wherein the entity profile is a first entity profile and the outcome score is a first outcome score, and wherein the operations further comprise: obtaining a second entity profile, wherein the second entity profile is associated with a second entity, and wherein the second entity profile comprises the first graph portion template, and wherein a second outcome determination parameter is determined based on the first graph portion template; determining a second outcome score associated with the second entity profile based on the second outcome determination parameter; and selecting the first entity based on the first outcome score and the second outcome score.

E-13. The medium of any of embodiments E-1 to E-12, the operations further comprising: sampling the directed graph to determine a set of subgraphs; determining a vector based on the set of subgraphs using a skip-gram model; and determining the outcome score using a neural network based on the vector.

E-14. The medium of any of embodiments E-1 to E-13, wherein the first graph portion template further comprises a second vertex template, wherein the second vertex template is associated with a second category label of the set of mutually exclusive category labels, and wherein the second category label is different from the first category label.

E-15. The medium of any of embodiments E-1 to E-14, the operations further comprising: updating the entity profile based a history of the first entity; storing the entity profile on a centralized computing platform, wherein the entity profile is associated with an entity identifier; and updating a value associated with the entity identifier, wherein the value is stored on a distributed, tamper-evident ledger operating on a distributed computing platform.

E-16. The medium of any of embodiments E-1 to E-15, wherein the entity profile is a first entity profile, and wherein the operations further comprising: obtaining a second entity profile; determining whether a set of entity similarity criteria is satisfied based on the first entity profile and the second entity profile; and storing value indicating that the first entity profile and the second entity profile satisfy the set of entity similarity criteria.

E-17. The medium of any of embodiments E-1 to E-16, wherein the first graph portion template further comprises a second vertex template, wherein the second vertex template is not connected to the first vertex template in the first graph portion template by any edge templates.

E-18. The medium of any of embodiments E-1 to E-17, wherein the directed graph is a first self-executing protocol directed graph, and wherein the operations further comprise: determining a first transaction amount between the first entity and a second entity based on the first self-executing protocol directed graph; determining a second transaction amount between the second entity and a third entity based on a second self-executing protocol directed graph; updating a first association between the first entity and the second entity of an entity graph based on the first transaction amount; updating a second association between the second entity and the third entity of the entity graph based on the second transaction amount; and determining whether the first entity is associated with the third entity based on the first association, the first transaction amount, the second association, and the second transaction amount.

E-19. The medium of embodiment 18, the operations further comprising: determining whether the first entity has failed a conditional statement associated with the first vertex; in response to a determination that the first entity has failed the conditional statement, updating an entity score is associated with the first entity; and sending a message to the third entity in response to the updating of the entity score associated with the first entity.

E-20. A method to perform the operations of any of the embodiments E-1 to E-19.

E-21. A system comprising: one or more processors; and memory storing instructions that, when executed by at least one of the one or more processors, causes at least one of the one or more processors to effectuate any of the operations of embodiments E-1 to E-19.

F-1. A tangible, non-transitory, machine-readable medium storing instructions that, when executed by a computing system, effectuate operations comprising: obtaining, with a computing system, a set of conditions; obtaining, with the computing system, a first cross-program entity identifier of a first entity, wherein the first cross-program entity identifier is unique amongst a set of cross-program entity identifiers of a decentralized computing platform; obtaining, with the computing system, a set of directed graphs of a set of self-executing protocols comprising a first self-executing protocol and a second self-executing protocol that are executed on the decentralized computing platform, wherein: each respective self-executing protocol of the set of self-executing protocols comprises data of a respective directed graph of the respective self-executing protocol, and the first cross-program entity identifier is associated with a first program-specific entity identifier of the first self-executing protocol and a second program-specific entity identifier of the second self-executing protocol; determining, with the computing system, that the set of conditions is applicable to the first entity based on the first cross-program entity identifier; determining, with the computing system, whether the set of conditions are satisfied based on whether a graph portion associated with the set of directed graphs corresponds to a graph portion template of the set of conditions; and in response to a determination that the graph portion corresponds to the graph portion template, storing, with the computing system, an indication that the first entity violated the set of conditions in a profile of the first entity using the first cross-program entity identifier.

F-2. The medium of embodiment F-1, the operations further comprising: determining a first set of geographic locations associated with the first entity based on the first cross-program entity identifier; and determining whether the first set of geographic locations satisfies a first condition of the set of conditions based on whether the first set of geographic locations is within a geofence indicated by the first condition, wherein the indication indicates that the first entity violated the set of conditions based on whether the first set of geographic locations satisfies the first condition.

F-3. The medium of any of embodiments F-1 to F-2, the operations further comprising determining a second set of counterparty entities based on the set of self-executing protocols, wherein each counterparty entity of the set of counterparty entities is associated with a transaction with the first entity.

F-4. The medium of any of embodiments F-1 to F-3, wherein obtaining the set of conditions comprises: obtaining a governing document; determining a set of entity categories using a natural language processing model based on governing document; and determining a condition of the set of conditions based on the set of entity categories.

F-5. The medium of any of embodiments F-1 to F-4, the operations further comprising: obtaining a governing document; selecting a section of the governing document based on a text header indicated by a set of text sizes or text spacings; and determining a condition of the set of conditions based on the section of the governing document.

F-6. The medium of any of embodiments F-1 to F-5, the operations further comprising: obtaining a first profile associated with the first cross-program entity identifier; obtaining a natural language document, wherein the natural language document comprises a verifying agent identifier and an entity name associated with the first cross-program entity identifier; using a natural language processing model to parse the natural language document to determine the verifying agent identifier and the entity name; sending a first message comprising the entity name to an application program interface (API) of a third-party entity based on the verifying agent identifier; and obtaining a second message from the third-party entity indicating that the entity name is valid and, in response, setting the first profile associated with the first cross-program entity identifier as a verified profile.

F-7. The medium of any of embodiments F-1 to F-6, the operations further comprising sending a notification message to a second entity indicating that the first entity failed the set of conditions.

F-8. The medium of any of embodiments F-1 to F-7, the operations further comprising: sending a first message comprising data of a pending transaction to a third entity, wherein a participant of the pending transaction is associated with the first cross-program entity identifier; obtaining a second message from the third entity, wherein the second message indicates that the third entity has verified the pending transaction; and in response to receiving the second message, storing a value indicating that the transaction was verified by the third entity on a distributed, tamper-evident data structure.

F-9. The medium of any of embodiments F-1 to F-8, the operations further comprising: determining, after a threshold duration of time after determining whether the set of conditions are satisfied, whether the set of conditions are satisfied a second time; and in response to a determination that the set of conditions are satisfied, setting a value to indicate that a resource transfer or allocation of a pending transaction is permitted, wherein a participant of the pending transaction is associated with the first cross-program entity identifier.

F-10. The medium of any of embodiments F-1 to F-9, the operations further comprising: determining that a variable of the set of conditions is not stored in data of a smart self-executing protocol; compute a value for the variable using a function encoded in the set of conditions; determining whether a the value satisfies a threshold value of a first condition; and in response to a determination that the value satisfies the threshold value, storing a value indicating that the first entity satisfies the first condition to a persistent storage.

F-11. The medium of any of embodiments F-1 to F-10, the operations further comprising: obtaining an additional governing document; updating the set of conditions based on the additional governing document; and determining whether the updated set of conditions is satisfied.

F-12. The medium of any of embodiments F-1 to F-11, wherein determining whether the set of conditions is satisfied further comprises: determining a first score change of the first self-executing protocol; determining that the first score change is associated with the first entity based on an association between the first program-specific entity identifier and the first cross-program entity identifier; determining a second score change of the second self-executing protocol; determining that the second score change is associated with the first entity based on an association between the second program-specific entity identifier and the first cross-program entity identifier; and determining whether the first entity satisfies the set of conditions based on the first score change and the second score change.

F-13. The medium of any of embodiments F-1 to F-12, the operations further comprising: determine a summation based on the first score change and the second score change, wherein determining whether the set of conditions is satisfied comprises determining whether the summation satisfies a threshold value.

F-14. The medium of any of embodiments F-1 to F-13, wherein a set of entities participating in the first self-executing protocol do not have permission to view the first cross-program entity identifier and the computer system prevents such viewing responsive to the lack of permission.

F-15. The medium of any of embodiments F-1 to F-14, the operations further comprising: determining whether a first value of a transaction satisfies a warning threshold, wherein the warning threshold is based on a condition of the set of conditions; and sending a message indicating that the warning threshold has been satisfied to the first entity.

F-16. The medium of any of embodiments F-1 to F-15, the operations further comprising: determining a hierarchy of conditions based on a set of precedence values associated with the set of conditions; determining a pair of conflicting conditions based on the set of conditions and a difference in labels between category labels of the set of conditions, wherein each category label of a respective condition of the set of conditions is one of a set of mutually exclusive category labels; and determining an overriding condition based on the hierarchy of governing conditions, wherein the overriding condition is one of the pair of conflicting conditions, and wherein the overriding condition is indicated to take precedence over the other condition of the pair of conflicting conditions.

F-17. The medium of any of embodiments F-1 to F-16, the operations further comprising: determining that a second cross-program entity identifier is associated with the first entity; determining that a condition is associated with the second cross-program entity identifier; generating an association between the first cross-program entity identifier and the second cross-program entity identifier in a database of cross-program entity identifiers; and persisting the database of cross-program entity identifiers to a persistent storage of the computing system.

F-18. The medium of embodiment F-17, the operations further comprising steps for obtaining the set of conditions.

F-19. The medium of any of embodiments F-1 to F-18, the operations further comprising steps for determining whether the set of conditions is violated.

F-20. A method to perform the operations of any of the embodiments F-1 to F-19.

F-21. A system, comprising: one or more processors; and memory storing instructions that when executed by the processors cause the processors to effectuate operations comprising: the operations of any one of embodiments F-1 to F-19.

J-1. A tangible, non-transitory, machine-readable medium storing instructions that, when executed by a computer system, effectuate operations comprising: obtaining, with a computer system, program state of a self-executing protocol, wherein the program state comprises: a set of conditional statements; a first identifier of a first entity; and a directed graph, the directed graph comprising a set of vertices and a set of directed edges connecting respective pairs of vertices among the set of vertices, wherein each respective vertex of the set of vertices is associated with a respective category label of a set of mutually exclusive categories; receiving, at an application program interface of the computer system, an event message comprising a set of parameters; selecting, with the computer system, a first subset of vertices triggered by the event message based on the set of parameters; selecting, with the computer system, a second subset of vertices based on the first subset of vertices, wherein the second subset of vertices is associated with the first subset of vertices via the set of directed edges; determining, with the computer system, an aggregated parameter based on a subset of conditional statements, wherein each respective conditional statement of the subset of conditional statements is associated with a respective vertex of the second subset of vertices, and wherein the respective vertex is associated with a first category label of the set of mutually exclusive categories that is associated to each of the other vertices associated with the subset of conditional statements; and storing, with the computer system, the aggregated parameter in memory.

J-2. The medium of embodiment J-1, the operations further comprising: determining whether the event message is valid using a set of validator nodes of a peer-to-peer network, wherein each node of the peer-to-peer network is communicatively coupled to at least one other node of the peer-to-peer network; in response to a determination that the event message is valid, distributing a validation message indicating that the event message is valid; and storing a value based on the event message on a tamper-evident, distributed ledger encoding records of a plurality of previous values in a directed acyclic graph of cryptographic hash pointers, wherein the tamper-evident, distributed ledger is stored on the peer-to-peer network.

J-3. The medium of embodiment J-2, wherein determining the first subset of vertices comprises determining the first subset of vertices at a first node of the peer-to-peer network before the validation message is received by the first node.

J-4. The medium of any of embodiments J-1 to J-3, wherein the program state further comprises a first identifier of a first entity, the operations further comprising: determining whether the event message is valid using a set of validator nodes of a peer-to-peer network; based on a determination that the event message is not valid, sending an issue notification to a node of the peer-to-peer network associated with the first entity, wherein the issue notification comprises an identifier of the event message.

J-5. The medium of any of embodiments J-1 to J-4, wherein the program state further comprises a first identifier of a first entity, the operations further comprising: determining a network path from a first node of a peer-to-peer network to a second node of the peer-to-peer network using a breadth first search, wherein: the first node received the event message before the second node, the second node is associated with the first entity, and the network path comprises a plurality of nodes of the peer-to-peer network; and sending data of the event message to the second node from the first node via the network path.

J-6. The medium of any of embodiments J-1 to J-5, wherein the event message is a first event message, the operations further comprising: receiving a second event message within a duration threshold before or after receiving the first event message; determining whether the second event message causes a vertex of the first subset of vertices to trigger; in response to a determination that the second event message causes the vertex of the first subset of vertices to trigger, obtaining a set of triggering parameters of the second event message, wherein the set of triggering parameters comprise values that satisfy a condition of the vertex; determining whether a first value of the first event message and a second value of the second event message differ with respect to the set of triggering parameters; and based on a determination that the first value matches the second value, updating a parameter associated with the second event message to indicate that the second event message is a duplicate event message.

J-7. The medium of any of embodiments J-1 to J-6, wherein the program state further comprises a first identifier of a first entity and an second identifier of a second entity, the operations further comprising: retrieving a private conditional statement associated with the first entity, wherein the private conditional statement is not stored in program state accessible to the second entity; and determining whether the private conditional statement is satisfied based on the first subset of vertices or the second subset of vertices.

J-8. The medium of any of embodiments J-1 to J-7, wherein a first stored value of the self-executing protocol is stored on a peer-to-peer network, and wherein a first node of the peer-to-peer network is permitted to access the first stored value of the program state, and wherein a second node of the peer-to-peer network is not permitted to access the first stored value.

J-9. The medium of any of embodiments J-1 to J-8, wherein determining the aggregated parameter comprises: determining that triggering a first vertex of a pair of vertices of the directed graph causes the cancellation of a second vertex of the pair of vertices of the directed graph, wherein the first vertex is associated with a first conditional statement and the second vertex is associated with a second conditional statement; selecting one of the pair parameters, the pair of parameters comprising a first parameter of the first conditional statement and a second parameter of the second conditional statement; and determining the aggregated parameter based on the first parameter.

J-10. The medium of any of embodiments J-1 to J-9, wherein the program state further comprises a first identifier of a first entity, and wherein the first entity is associated with an entity role, the operations further comprising selecting the first entity, wherein selecting the first entity comprises: selecting a vertex of the first subset of vertices based on the set of parameters; and selecting the first entity based on the entity role being associated with the vertex.

J-11. The medium of embodiment J-10, wherein a second entity is associated the entity role, the operations further comprising sending a second message to the second entity based on the second entity being associated with the entity role.

J-12. The medium of any of embodiments J-1 to J-11, wherein the program state further comprises a first identifier of a first entity, the operations further comprising: determining that the first entity is associated with an entity role; in response to a determination that the first entity is associated with the entity role, selecting a previous message from a history of messages based on the entity role; and sending the previous message to the first entity.

J-13. The medium of any of embodiments J-1 to J-12, the operations further comprising providing a user interface (UI), wherein vertices displayed in the UI are colored based on color associations with category labels associated with the vertices, and wherein each respective category label of the set of mutually exclusive categories is associated with a different color.

J-14. The medium of any of embodiments J-1 to J-13, wherein the program state further comprises a first identifier of a first entity, the operations further comprising: determining whether a first confirmation key associated with a first representative of the first entity is received; determining whether a second confirmation key associated with a second representative the first entity is received; and in response to a determination that the first confirmation key and the second confirmation key is received, storing the first confirmation key and the second confirmation key in data storage in association with a record of a transaction between a pair entities comprising the first entity.

J-15. The medium of any of embodiments J-1 to J-14, wherein the program state further comprises a first identifier of a first entity, the operations further comprising; obtaining a score associated with the first entity, wherein the score is associated with a resource type; and updating the score based on the set of parameters, wherein the set of parameters comprises the resource type.

J-16. The medium of any of embodiments J-1 to J-15, wherein determining the aggregated parameter comprises determining a sum of values, wherein each respective value used to determine the sum of values is encoded in a respective conditional statement of the subset of conditional statements.

J-17. The medium of any of embodiments J-1 to J-16, the operations further comprising providing a user interface (UI), wherein the UI visually indicates the second subset of vertices based on a difference in color, difference in size, or difference in animation between the second subset of vertices and other vertices of the set of vertices.

J-18. The medium of any of embodiments J-1 to J-17, wherein determining the first subset of vertices comprises steps for determining the first subset of vertices.

J-19. The medium of any of embodiments J-1 to J-18, wherein determining the aggregated parameter comprises steps for determining the aggregated parameter.

J-20. A method to perform the operations of any of the embodiments J-1 to J-19.

J-21. A system comprising: one or more processors; and memory storing instructions that, when executed by at least one of the one or more processors, causes at least one of the one or more processors to effectuate any of the operations of embodiments J-1 to J-19.

What is claimed is:

1. A tangible, non-transitory, machine-readable medium storing instructions that, when executed by a computing system, effectuate operations comprising:
  obtaining, with a computing system, program state of a self-executing protocol, wherein the program state encodes:
    a set of conditional statements;
    a set of entities, wherein the set of entities comprises a first entity;
    a directed graph, the directed graph comprising:
      a set of vertices, wherein each respective vertex of the set of vertices is associated with a respective category label of a set of mutually exclusive categories;
      a set of directed edges connecting respective pairs of vertices among the set of vertices;
  obtaining, with the computing system, an entity profile of the first entity, wherein:

the entity profile comprises a first graph portion template, the first graph portion template comprises a first vertex template and an edge template, the first vertex template is associated in memory with a first category label of the set of mutually exclusive category labels, and the edge template specifies an edge direction to or from a vertex matching the first vertex template;

determining, with the computing system, whether the first graph portion template matches a graph portion in the directed graph based on a first vertex of the directed graph matching the first vertex template and a first directed edge of the directed graph matching the edge template;

determining, with the computing system, an outcome score based on the first graph portion template matching the graph portion in the directed graph;

determining, with the computing system, whether the outcome score satisfies an outcome score threshold; and in response to the outcome score satisfying the outcome score threshold, storing, with the computing system, a value indicating that the outcome score satisfies the outcome score threshold.

2. The medium of claim 1, wherein:

the set of vertices are a set of norm vertices;

the first vertex is a first norm vertex;

the set of entities include parties to the self-executing protocol;

the operations further comprising:

obtaining a plurality of self-executing protocols comprising a plurality of directed graphs, wherein each respective directed graph of the plurality of directed graphs is associated with a respective set of entities that comprises the first entity;

determining the first graph portion template based on the plurality of directed graphs, wherein a second norm vertex of the plurality of directed graphs matches the first norm vertex template of the first graph portion template, and wherein a condition of the second norm vertex is indicated to have been failed by the first entity based on an event message; and determining an outcome determination parameter based on a number of times that the first graph portion template matches with a respective graph portion in the plurality of self-executing protocols, wherein determining the outcome score comprises determining the outcome score based on the outcome determination parameter.

3. The medium of claim 1, the operations further comprising:

obtaining a plurality of self-executing protocols comprising a plurality of directed graphs, wherein each respective self-executing protocol of the plurality of self-executing protocols comprises a respective directed graph of the plurality of directed graphs;

determining the first graph portion template based on the plurality of self-executing protocols, wherein a second vertex of a second directed graph of the plurality of directed graphs matches the first vertex template, and wherein a third vertex of the plurality of directed graphs matches a second vertex template, and wherein a condition of the third vertex is indicated as having been satisfied based on an event message; and determining an outcome determination parameter based on a number of times that the first graph portion template matches with a respective graph portion in the plurality of self-executing protocols, wherein determining the outcome score comprises determining the outcome score based on the outcome determination parameter.

4. The medium of claim 1, wherein the entity profile is a first entity profile, and wherein the operations further comprise:

determining a transaction score based on the directed graph, wherein the transaction score is associated with a transaction between the first entity and a second entity; and updating an association between the first entity profile and a second entity profile based on the transaction score, wherein the second entity profile is associated with the second entity.

5. The medium of claim 1, the operations further comprising:

determining whether the first entity has failed a conditional statement associated with a second vertex of the directed graph; and in response to a determination that the first entity has failed the conditional statement, updating an entity score of an entity graph, wherein the entity score is associated with the first entity, and wherein the entity graph comprises a plurality of entity vertices, and wherein each respective entity vertex of the plurality of entity vertices is associated with a respective entity profile.

6. The medium of claim 5, wherein the entity graph is stored on a distributed, tamper-evident ledger, and wherein updating the entity score comprises:

obtaining an encryption key associated with the first entity;

obtaining a previous entity score from the distributed, tamper-evident ledger based on the encryption key; and updating the entity score based on the previous entity score.

7. The medium of claim 5, wherein the entity graph is stored on a distributed, tamper-evident ledger, and wherein the operations further comprise:

determining whether the entity score satisfies an entity score threshold of a verification entity; and in response to the entity score satisfying the entity score threshold, storing an indicator that the first entity satisfies the entity score threshold of the verification entity.

8. The medium of claim 5, the operations further comprising:

determining whether the entity score satisfies an entity score threshold of a verification entity; and sending a message to an application program interface, wherein the message indicates that the first entity satisfies the entity score threshold of the verification entity.

9. The medium of claim 5, wherein the entity profile is a first entity profile, and wherein the operations further comprise:

determining a second entity score associated with the first entity, wherein the first entity profile does not comprise the second entity score;

obtaining a passkey value; and in response to receiving the passkey value, sending a message comprising the second entity score.

10. The medium of claim 1, wherein determining the outcome score comprises determining the outcome score using a neural network based on a feature set, wherein:

determining the feature set, wherein determining the feature set comprises determining whether the first graph portion template matches a graph portion in the directed graph; and the neural network is trained on a plurality of directed graphs of a plurality of a self-executing protocols, wherein the first graph portion template matches a graph portion of a subset of the plurality of directed graphs.

11. The medium of claim 1, wherein determining the outcome score comprises:

generating a set of embeddings based on a set of vertices of the directed graph, wherein each vertex of the set of vertices is associated with an embedding of the set of embeddings, and wherein each embedding comprises a vector;

determining a feature set based on the set of embeddings; and determining the outcome score using a neural network based on the feature set.

12. The medium of claim 1, wherein the entity profile is a first entity profile and the outcome score is a first outcome score, and wherein the operations further comprise:

obtaining a second entity profile, wherein the second entity profile is associated with a second entity, and wherein the second entity profile comprises the first graph portion template, and wherein a second outcome determination parameter is determined based on the first graph portion template;

determining a second outcome score associated with the second entity profile based on the second outcome determination parameter; and selecting the first entity based on the first outcome score and the second outcome score.

13. The medium of claim 1, the operations further comprising:

sampling the directed graph to determine a set of subgraphs;

determining a vector based on the set of subgraphs using a skip-gram model; and determining the outcome score using a neural network based on the vector.

14. The medium of claim 1, wherein the first graph portion template further comprises a second vertex template, wherein the second vertex template is associated with a second category label of the set of mutually exclusive category labels, and wherein the second category label is different from the first category label.

15. The medium of claim 1, the operations further comprising:

updating the entity profile based a history of the first entity;

storing the entity profile on a centralized computing platform, wherein the entity profile is associated with an entity identifier; and updating a value associated with the entity identifier, wherein the value is stored on a distributed, tamper-evident ledger operating on a distributed computing platform.

16. The medium of claim 1, wherein the entity profile is a first entity profile, and wherein the operations further comprising:

obtaining a second entity profile;

determining whether a set of entity similarity criteria is satisfied based on the first entity profile and the second entity profile; and storing value indicating that the first entity profile and the second entity profile satisfy the set of entity similarity criteria.

17. The medium of claim 1, wherein the first graph portion template further comprises a second vertex template, wherein the second vertex template is not connected to the first vertex template in the first graph portion template by any edge templates.

18. The medium of claim 1, wherein the directed graph is a first self-executing protocol directed graph, and wherein the operations further comprise:

determining a first transaction amount between the first entity and a second entity based on the first self-executing protocol directed graph;

determining a second transaction amount between the second entity and a third entity based on a second self-executing protocol directed graph;

updating a first association between the first entity and the second entity of an entity graph based on the first transaction amount;

updating a second association between the second entity and the third entity of the entity graph based on the second transaction amount; and determining whether the first entity is associated with the third entity based on the first association, the first transaction amount, the second association, and the second transaction amount.

19. The medium of claim 18, the operations further comprising:

determining whether the first entity has failed a conditional statement associated with the first vertex;

in response to a determination that the first entity has failed the conditional statement, updating an entity score is associated with the first entity; and sending a message to the third entity in response to the updating of the entity score associated with the first entity.

20. A method comprising:

obtaining, with a computing system, program state of a self-executing protocol, wherein the program state encodes:

a set of conditional statements;

a set of entities, wherein the set of entities comprises a first entity;

a directed graph, the directed graph comprising:

a set of vertices, wherein each respective vertex of the set of vertices is associated with a respective category label of a set of mutually exclusive categories;

a set of directed edges connecting respective pairs of vertices among the set of vertices;

obtaining, with the computing system, an entity profile of the first entity, wherein:

the entity profile comprises a first graph portion template, the first graph portion template comprises a first vertex template and an edge template, the first vertex template is associated in memory with a first category label of the set of mutually exclusive category labels, and the edge template specifies an edge direction to or from a vertex matching the first vertex template;

determining, with the computing system, whether the first graph portion template matches a graph portion in the directed graph based on a first vertex of the directed graph matching the first vertex template and a first directed edge of the directed graph matching the edge template;

determining, with the computing system, an outcome score based on the first graph portion template matching the graph portion in the directed graph;

determining, with the computing system, whether the outcome score satisfies an outcome score threshold; and in response to the outcome score satisfying the outcome score threshold, storing, with the computing system, a value indicating that the outcome score satisfies the outcome score threshold.

\* \* \* \* \*